(12) United States Patent
Ueki

(10) Patent No.: US 6,870,799 B2
(45) Date of Patent: Mar. 22, 2005

(54) INFORMATION-SIGNAL RECORDING AND REPRODUCING APPARATUS

(75) Inventor: Yasuhiro Ueki, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 10/778,137

(22) Filed: Feb. 17, 2004

(65) Prior Publication Data

US 2004/0160872 A1 Aug. 19, 2004

Related U.S. Application Data

(62) Division of application No. 10/431,466, filed on May 8, 2003, now Pat. No. 6,728,170, which is a division of application No. 09/924,522, filed on Aug. 9, 2001, now Pat. No. 6,594,203, which is a division of application No. 09/665,926, filed on Sep. 20, 2000, now Pat. No. 6,285,632.

(30) Foreign Application Priority Data

| Sep. 27, 1999 | (JP) | 11-272021 |
| Oct. 26, 1999 | (JP) | 11-303920 |
| Nov. 17, 1999 | (JP) | 11-326519 |
| Jan. 27, 2000 | (JP) | 2000-18436 |
| Mar. 31, 2000 | (JP) | 2000-97418 |

(51) Int. Cl.$^7$ ............................................. G11B 21/08
(52) U.S. Cl. ............................... 369/32.01; 369/53.11; 369/30.23; 369/60.01
(58) Field of Search ..................... 369/32.01, 53.11, 369/30.23, 60.01, 47.33, 47.16, 47.15, 47.1, 275.3, 275.1, 53.37, 124.01, 124.06

(56) References Cited

U.S. PATENT DOCUMENTS

| 5,359,504 A | 10/1994 | Ohmi et al. |
| 5,436,875 A | 7/1995 | Shinada |
| 5,936,926 A | 8/1999 | Yokouchi et al. |
| 6,141,299 A | 10/2000 | Utsumi |
| 6,178,147 B1 | 1/2001 | Fujinami |
| 6,219,311 B1 | 4/2001 | Mitsuno |
| 6,295,409 B1 | 9/2001 | Ikeda |
| 6,597,641 B2 | 7/2003 | Ueki |
| 6,741,531 B2 * | 5/2004 | Ueki ....................... 369/32.01 |

FOREIGN PATENT DOCUMENTS

EP        0 544 299 A2    6/1993

(List continued on next page.)

*Primary Examiner*—Ali Neyzari
(74) *Attorney, Agent, or Firm*—Louis Woo

(57) ABSTRACT

A recording medium has first and second areas on which first and second information signals are recorded respectively. The first information signal has a size Ya. The second information signal has a size Yb. A head operates for reproducing the first and second information signals from the first and second areas of the recording medium and transmitting the reproduced first and second information signals on a time sharing basis and at a predetermined constant transfer rate Rp while moving between the first and second areas of the recording medium. A buffer memory operates for receiving the first and second information signals from the head at the predetermined constant transfer rate Rp, for temporarily storing the first and second information signals, and for outputting the first and second information signals at first and second transfer rates Ra and Rb respectively. The first and second transfer rates Ra and Rb are lower than the predetermined constant transfer rate Rp. The predetermined constant transfer rate Rp, the first transfer rate Ra, the second transfer rate Rb, the size Ya of the first information signal, the size Yb of the second information signal, a seek time Tab taken by the head to move from the first area to the second area of the recording medium, and a seek time Tba taken by the head to move from the second area to the first area of the recording medium are in a relation as follows:

$$(Ya+Yb) \geq Rp \cdot (Ra+Rb) \cdot (Tab+Tba)/(Rp-Ra-Rb).$$

3 Claims, 31 Drawing Sheets

FOREIGN PATENT DOCUMENTS

| | | |
|---|---|---|
| EP | 0 866 446 A2 | 9/1998 |
| EP | 0 905 699 A2 | 3/1999 |
| EP | 0 971 349 A2 | 1/2000 |
| JP | 1-21764 | 1/1989 |
| JP | 3-296976 | 12/1991 |
| JP | 6-139696 | 5/1994 |
| JP | 10-92158 | 4/1998 |
| JP | 10-334596 | 12/1998 |
| JP | 11-126427 | 5/1999 |
| WO | 99/13469 | 3/1999 |

\* cited by examiner

*FIG. 4*

| A1 | A2 | A3 | A4 | A5 | A6 | A7 | A8 |
| A9 | A10 | A11 | A12 | A13 | A14 | A15 | A16 |
A17  A18

FIRST AREAS 13a

*FIG. 5*

| B1 | B2 | B3 | B4 | B5 | B6 | B7 | B8 |
B9  B10  B11

SECOND AREAS 13b

FIG. 19

| A1 | A2 | A3 | A4 | A5 | A6 | A7 | A8 |
|----|----|----|----|----|----|----|----|
| A9 | A10 | A11 | A12 | A13 | A14 | A15 | A16 |

| N1 | N2 | N3 | N4 | N5 | N6 | N7 | N8 |
|----|----|----|----|----|----|----|----|
| N9 | N10 | N11 | | | | | |

TOTAL UNOCCUPIED CAPACITY: 2 GB

| TRANSFER RATE Ra | RECORD TIME | EFFECTIVE UNOCCUPIED CAPACITY | EFFICIENCY |
|---|---|---|---|
| 8 Mbps | 7.5 MIN | (1.0 GB) | 50% |
| 4 Mbps | 22.5 MIN | (1.5 GB) | 75% |
| 2 Mbps | 60 MIN | (2.0 GB) | 100% |

FIG. 34

TRANSFER RATE Ra: 8 Mbps
TOTAL UNOCCUPIED CAPACITY: 2 GB

| TRANSFER RATE Rb | RECORD TIME | EFFECTIVE UNOCCUPIED CAPACITY | EFFICIENCY |
|---|---|---|---|
| 17 Mbps | RECORD IMPOSSIBLE | | |
| 8 Mbps | 3.7 | (0.5 GB) | 25% |
| 4 Mbps | 11 | (0.7 GB) | 37% |
| 2 Mbps | 30 | (1.0 GB) | 50% |

FIG. 35

TRANSFER RATE Ra: 8 Mbps
TOTAL UNOCCUPIED CAPACITY: 2 GB

| TRANSFER RATE Rb | RECORD TIME | EFFECTIVE UNOCCUPIED CAPACITY | EFFICIENCY |
|---|---|---|---|
| 17 Mbps | RECORD IMPOSSIBLE | | |
| 8 Mbps | 3.7 | (0.5 GB) | 25% |
| 4 Mbps | 11 | (0.7 GB) | 37% |
| 2 Mbps | 30 | (1.0 GB) | 50% |

INFORMATION-SIGNAL RECORDING AND REPRODUCING APPARATUS

This application is a division of Ser. No. 10/431,466, filed May 8, 2003, U.S. Pat. No. 6,728,170, which is a division of Ser. No. 09/924,522, filed Aug. 9, 2001, U.S. Pat. No. 6,594,203, which is a division of Ser. No. 09/665,926, filed Sep. 20, 2000, U.S. Pat. No. 6,285,632.

BACKGROUND OF THE INVENTION

1. Field of the Invention

This invention relates to an information-signal recording apparatus and an information-signal reproducing apparatus. Also, this invention relates to an information-signal recording and reproducing apparatus. In addition, this invention relates to an information-signal communication apparatus. Furthermore, this invention relates to an information-signal recording medium.

2. Description of the Related Art

A typical optical-disc recorder/player operates as follows. During a recording mode of operation of the recorder/player, a signal representing at least one of video information and audio information is compressed into a compression-resultant information signal. An optical head in the recorder/player records the compression-resultant information signal on an optical disc. During a playback mode of operation of the recorder/player, the optical head reproduces a recorded signal from an optical disc. The reproduced signal is expanded into an original information signal.

It is known to provide such an optical-disc recorder/player with a buffer memory having a capacity of about 4 Mbits. A recorded signal is reproduced from an optical disc at a transfer rate of 10.08 Mbps. The reproduced signal is converted into an information signal having a variable transfer rate lower than 10.08 Mbps. The buffer memory absorbs the difference in transfer rate between the before-conversion signal and the after-conversion signal.

Japanese published unexamined patent application 10-92158 discloses a disc reproducing apparatus designed as follows. Discontinuation and disturbance of an image are prevented by dividing a cell into a plurality of cells, time-division-multiplexing the cells in each scene and arranging and recording the cells to be reproduced continuously within the distance of the particular amount of codes to shorten the physical moving distance during the reproducing operation. In Japanese application 10-92158, a video program has a preceding front trunk scene A, a plurality of branch scenes B0 to B3, and a successive rear trunk scene C. In the case of recording a plurality of branch scenes on a recording medium, any branch scene is arranged in such a manner that a scene cell appears in the same rate for the summed total scene length. Arrangement should be done so that when the time for jumping the distance for the amount of particular codes is defined as Ts, the relationship Tc−[Tc×Pr/Rr]>Ts can be set for the amount of readout data Rr, amount of codes consumed Pr and image reproducing time Tc. When arrangement for recording is performed, a physical moving distance during the reproducing operation can be shortened and generation of discontinuation and disturbance of image can be prevented. The branch scenes B0 to B3 are multiple scenes. Each of the branch scenes B0 to B3 has a sequence of cells. The cells of the branch scenes B0 to B3 are shuffled before being recorded on a disc (a recording medium). Thus, the recorded cells of the branch scenes B0 to B3 are on non-successive separate positions on the disc. Accordingly, during the reproduction of the sequence of cells of one branch scene, a pickup head reproduces the cells and repetitively jumps between non-successive separate positions on the disc. In the apparatus of Japanese application 10-92158 includes a buffer memory capable of absorbing a time interval during which a pickup head jumps between non-successive separate positions on the disc so that reproduced data continue to be absent. Japanese application 10-92158 indicates the relation between the capacity of the buffer memory and a seek time of the pickup head which enables the buffer memory to continuously output data under conditions where the pickup head reproduces a sequence of cells of one branch scene and repetitively jumps between non-successive separate positions on the disc.

Japanese published unexamined patent application 6-139696 discloses a recording and reproducing apparatus which includes a buffer memory for absorbing a difference between transfer rates. In Japanese application 6-139696, during a recording mode of operation of the apparatus, first digital data having a lower transfer rate and being derived from an information signal to be recorded is converted into second digital data with a higher transfer rate. The second digital data are recorded on a disc at the higher transfer rate. During a playback mode of operation of the apparatus, third digital data are reproduced from the disc at the higher transfer rate, and the reproduced digital data are converted into fourth digital data related to the lower transfer rate. The fourth digital signal is converted into a reproduced information signal. The recording mode of operation and the playback mode of operation are implemented on a time sharing basis so that the information signal to be recorded and the reproduced information signal can simultaneously occur.

SUMMARY OF THE INVENTION

It is a first object of this invention to provide an improved information-signal recording apparatus.

It is a second object of this invention to provide an improved information-signal reproducing apparatus.

It is a third object of this invention to provide an improved information-signal recording and reproducing apparatus.

It is a fourth object of this invention to provide an improved information-signal communication apparatus.

It is a fifth object of this invention to provide an improved information-signal recording medium.

A first aspect of this invention provides an apparatus for reproducing information from a recording medium having first and second areas on which first and second information signals are recorded respectively, the first information signal having a size Ya, the second information signal having a size Yb. The apparatus comprises a head for reproducing the first and second information signals from the first and second areas of the recording medium and transmitting the reproduced first and second information signals on a time sharing basis and at a predetermined constant transfer rate Rp while moving between the first and second areas of the recording medium; and a buffer memory for receiving the first and second information signals from the head at the predetermined constant transfer rate Rp, for temporarily storing the first and second information signals, and for outputting the first and second information signals at first and second transfer rates Ra and Rb respectively, the first and second transfer rates Ra and Rb being lower than the predetermined constant transfer rate Rp; wherein the predetermined constant transfer rate Rp, the first transfer rate Ra for the first information signal, the second transfer rate Rb for the second information signal, the size Ya of the first information signal, the size Yb of the second information signal, a seek time Tab taken by the head to move from the first area to the second area of the recording medium, and a seek time Tba taken by the head to move from the second area to the first area of the recording medium are in a relation as follows:

$$(Ya+Yb) \geq Rp \cdot (Ra+Rb) \cdot (Tab+Tba)/(Rp-Ra-Rb)$$

A second aspect of this invention provides an apparatus for recording information on a recording medium having first and second areas. The apparatus comprises a buffer memory for receiving first and second information signals at first and second transfer rates Ra and Rb respectively, for temporarily storing the first and second information signals, and for outputting the first and second information signals at a predetermined constant transfer rate Rp higher than the first and second transfer rates Ra and Rb, the first information signal having a size Ya, the second information signal having a size Yb; and a head for receiving the first and second information signals from the buffer memory, and for recording the first and second information signals on the first and second areas of the recording medium respectively on a time sharing basis and at the predetermined constant transfer rate Rp while moving between the first and second areas of the recording medium; wherein the predetermined constant transfer rate Rp, the first transfer rate Ra for the first information signal, the second transfer rate Rb for the second information signal, the size Ya of the first information signal, the size Yb of the second information signal, a seek time Tab taken by the head to move from the first area to the second area of the recording medium, and a seek time Tba taken by the head to move from the second area to the first area of the recording medium are in a relation as follows:

$$(Ya+Yb) \geq Rp \cdot (Ra+Rb) \cdot (Tab+Tba)/(Rp-Ra-Rb)$$

A third aspect of this invention provides an apparatus for recording and reproducing information on and from a recording medium having first and second areas, the first area being loaded with a first information signal having a size Ya. The apparatus comprises a head for reproducing the first information signal from the first area of the recording medium and transmitting the reproduced first information signal at a predetermined constant transfer rate Rp; and a buffer memory for receiving the first information signal from the head at the predetermined constant transfer rate Rp, for temporarily storing the first information signal, and for outputting the first information signal at a first transfer rate Ra lower than the predetermined constant transfer rate Rp; the buffer memory being for receiving a second information signal at a second transfer rate Rb lower than the predetermined constant transfer rate Rp, for temporarily storing the second information signal, and for outputting the second information signal at the predetermined constant transfer rate Rp, the second information signal having a size Yb; the head being for receiving the second information signal from the buffer memory, and for recording the second information signal on the second area of the recording medium at the predetermined constant transfer rate Rp; wherein the head implements reproduction of the first information signal from the first area of the recording medium and recording of the second information signal on the second area of the recording medium on a time sharing basis while moving between the first and second areas of the recording medium; and wherein the predetermined constant transfer rate Rp, the first transfer rate Ra for the first information signal, the second transfer rate Rb for the second information signal, the size Ya of the first information signal, the size Yb of the second information signal, a seek time Tab taken by the head to move from the first area to the second area of the recording medium, and a seek time Tba taken by the head to move from the second area to the first area of the recording medium are in a relation as follows:

$$(Ya+Yb) \geq Rp \cdot (Ra+Rb) \cdot (Tab+Tba)/(Rp-Ra-Rb)$$

A fourth aspect of this invention provides an apparatus for reproducing information from a recording medium having first and second areas on which first and second information signals are recorded respectively. The apparatus comprises a head for reproducing the first and second information signals from the first and second areas of the recording medium and transmitting the reproduced first and second information signals on a time sharing basis and at a predetermined constant transfer rate Rp while moving between the first and second areas of the recording medium; and a buffer memory for receiving the first and second information signals from the head at the predetermined constant transfer rate Rp, for temporarily storing the first and second information signals, and for outputting the first and second information signals at first and second transfer rates Ra and Rb respectively, the first and second transfer rates Ra and Rb being lower than the predetermined constant transfer rate Rp, the buffer memory having a capacity Ym; wherein the predetermined constant transfer rate Rp, the first transfer rate Ra for the first information signal, the second transfer rate Rb for the second information signal, the capacity Ym of the buffer memory, a seek time Tab taken by the head to move from the first area to the second area of the recording medium, and a seek time Tba taken by the head to move from the second area to the first area of the recording medium are in a relation as follows:

$$Ym > \{(Rp-Ra) \cdot Ra + (Rp-Rb) \cdot Rb\} \cdot (Tab+Tba)/(Rp-Ra-Rb)$$

A fifth aspect of this invention provides an apparatus for recording information on a recording medium having first and second areas. The apparatus comprises a buffer memory for receiving first and second information signals at first and second transfer rates Ra and Rb respectively, for temporarily storing the first and second information signals, and for outputting the first and second information signals at a predetermined constant transfer rate Rp higher than the first and second transfer rates Ra and Rb, the buffer memory having a capacity Ym; and a head for receiving the first and second information signals from the buffer memory, and for recording the first and second information signals on the first and second areas of the recording medium respectively on a time sharing basis and at the predetermined constant transfer rate Rp while moving between the first and second areas of the recording medium; wherein the predetermined constant transfer rate Rp, the first transfer rate Ra for the first information signal, the second transfer rate Rb for the second information signal, the capacity Ym of the buffer memory, a seek time Tab taken by the head to move from the first area to the second area of the recording medium, and a seek time Tba taken by the head to move from the second area to the first area of the recording medium are in a relation as follows:

$$Ym > \{(Rp-Ra) \cdot Ra + (Rp-Rb) \cdot Rb\} \cdot (Tab+Tba)/(Rp-Ra-Rb)$$

A sixth aspect of this invention provides an apparatus for recording and reproducing information on and from a recording medium having first and second areas, the first area being loaded with a first information signal. The apparatus comprises a head for reproducing the first information signal from the first area of the recording medium and transmitting the reproduced first information signal at a predetermined constant transfer rate Rp; and a buffer memory for receiving the first information signal from the head at the predetermined constant transfer rate Rp, for temporarily storing the first information signal, and for outputting the first information signal at a first transfer rate Ra lower than the predetermined constant transfer rate Rp, the buffer memory having a capacity Ym; the buffer memory being for receiving a second information signal at a second transfer rate Rb lower than the predetermined constant transfer rate Rp, for temporarily storing the second information signal, and for outputting the second information signal at the predetermined constant transfer rate Rp; the head being for receiving the second information signal from the buffer memory, and for recording the second information signal on the second area of the recording medium at the predetermined constant transfer rate Rp; wherein the head implements reproduction of the first information signal from the first area of the recording medium and recording of the second information signal on the second area of the recording medium on a time sharing basis while moving between the first and second areas of the recording medium; and wherein the predetermined constant transfer rate Rp, the first transfer rate Ra for the first information signal, the second transfer rate Rb for the second information signal, the capacity Ym of the buffer memory, a seek time Tab taken by the head to move from the first area to the second area of the recording medium, and a seek time Tba taken by the head to move from the second area to the first area of the recording medium are in a relation as follows:

$$Ym > \{(Rp-Ra) \cdot Ra + (Rp-Rb) \cdot Rb\} \cdot (Tab+Tba)/(Rp-Ra-Rb)$$

A seventh aspect of this invention is based on the first aspect thereof, and provides an apparatus further comprising means for partitioning the buffer memory into first and second areas in accordance with values of the first and second transfer rates Ra and Rb, wherein the first and second areas in the buffer memory are assigned to the first and second information signals respectively.

An eighth aspect of this invention is based on the first aspect thereof, and provides an apparatus further comprising means for partitioning the buffer memory into first and second areas in accordance with an operation mode, wherein the first and second areas in the buffer memory are assigned to the first and second information signals respectively.

A ninth aspect of this invention is based on the first aspect thereof, and provides an apparatus further comprising a first unit containing the head, and a second unit detachably connected with the first unit and containing the buffer memory.

A tenth aspect of this invention provides an apparatus comprising a head for reproducing an information signal from a recording medium and transmitting the reproduced information signal at a predetermined constant transfer rate; a buffer memory for receiving the information signal from the head at the predetermined constant transfer rate, for temporarily storing the information signal, and for outputting the information signal at a transfer rate lower than the predetermined constant transfer rate; a processor for receiving the information signal from the buffer memory and subjecting the information signal to a reproducing process; a first unit containing the head; and a second unit detachably connected with the first unit and containing the buffer memory and the processor.

An eleventh aspect of this invention provides an information-signal communication apparatus comprising the apparatus of the fist aspect of this invention and an interface connected with the buffer memory for communication with an external.

A twelfth aspect of this invention is based on the eleventh aspect thereof, and provides an information-signal communication apparatus further comprising a first unit containing the head, and a second unit detachably connected with the first unit and the interface and containing the buffer memory.

A thirteenth aspect of this invention provides an information-signal recording medium having first and second areas on which first and second information signals are recorded respectively, the first information signal having a size Ya, the second information signal having a size Yb, wherein the first and second information signals can be reproduced from the first and second areas and can be transmitted by a head on a time sharing basis and at a predetermined constant transfer rate Rp while the head moves between the first and second areas of the recording medium, wherein the first and second information signals outputted from the head can be received by a buffer memory at the predetermined constant transfer rate Rp and can be temporarily stored in the buffer memory before being outputted from the buffer memory at first and second transfer rates Ra and Rb respectively, the first and second transfer rates Ra and Rb being lower than the predetermined constant transfer rate Rp, wherein the predetermined constant transfer rate Rp, the first transfer rate Ra for the first information signal, the second transfer rate Rb for the second information signal, the size Ya of the first information signal, the size Yb of the second information signal, a seek time Tab taken by the head to move from the first area to the second area of the recording medium, and a seek time Tba taken by the head to move from the second area to the first area of the recording medium are in a relation as follows:

$$(Ya+Yb) \geq Rp \cdot (Ra+Rb) \cdot (Tab+Tba)/(Rp-Ra-Rb)$$

A fourteenth aspect of this invention provides an apparatus for reproducing information from a recording medium having "n" areas on which "n" information signals are recorded respectively, where "n" denotes a predetermined natural number equal to or greater than 2. The apparatus comprises a head for reproducing the "n" information signals from the "n" areas of the recording medium and transmitting the reproduced "n" information signals on a time sharing basis and at a predetermined constant transfer rate Rp while moving among the "n" areas of the recording medium; and a buffer memory for receiving the "n" information signals from the head at the predetermined constant transfer rate Rp, for temporarily storing the "n" information signals, and for outputting the "n" information signals at transfer rates R1, R2, ..., Rn respectively, the transfer rates R1, R2, ..., Rn being lower than the predetermined constant transfer rate Rp; wherein the predetermined constant transfer rate Rp, a sum ΣRn of the transfer rates R1, R2, ..., Rn, a sum ΣYn of sizes of the "n" information signals, and a sum ΣSn of seek times taken by the head to move from present ones to next ones of the "n" areas of the recording medium are in a relation as follows:

$$\Sigma Yn \geq Rp \cdot \Sigma Rn \cdot \Sigma Sn/(Rp-\Sigma Rn)$$

A fifteenth aspect of this invention provides an apparatus for recording information on a recording medium having "n" areas, where "n" denotes a predetermined natural number equal to or greater than 2. The apparatus comprises a buffer memory for receiving "n" information signals at transfer rates R1, R2, . . . , Rn respectively, for temporarily storing the "n" information signals, and for outputting the "n" information signals at a predetermined constant transfer rate Rp higher than the transfer rates R1, R2, . . . , Rn; and a head for receiving the "n" information signals from the buffer memory, and for recording the "n" information signals on the "n" areas of the recording medium respectively on a time sharing basis and at the predetermined constant transfer rate Rp while moving among the "n" areas of the recording medium; wherein the predetermined constant transfer rate Rp, a sum $\Sigma Rn$ of the transfer rates R1, R2, . . . , Rn, a sum $\Sigma Yn$ of sizes of the "n" information signals, and a sum $\Sigma Sn$ of seek times taken by the head to move from present ones to next ones of the "n" areas of the recording medium are in a relation as follows:

$$\Sigma Yn \geq Rp \cdot \Sigma Rn \cdot \Sigma Sn/(Rp - \Sigma Rn)$$

A sixteenth aspect of this invention provides an apparatus for recording and reproducing information on and from a recording medium having "n" areas, where "n" denotes a predetermined natural number equal to or greater than 2, wherein at least a first area among the "n" areas is loaded with a first information signal among "n" information signals. The apparatus comprises a head for reproducing the first information signal from the first area of the recording medium and transmitting the reproduced first information signal at a predetermined constant transfer rate Rp; and a buffer memory for receiving the first information signal from the head at the predetermined constant transfer rate Rp, for temporarily storing the first information signal, and for outputting the first information signal at a first transfer rate R1 lower than the predetermined constant transfer rate Rp; the buffer memory being for receiving the "n" information signals except the first information signal at transfer rates R2, R3, . . . , Rn respectively, for temporarily storing the "n" information signals except the first information signal, and for outputting the "n" information signals except the first information signal at the predetermined constant transfer rate Rp, the transfer rates R2, R3, . . . , Rn being lower than the predetermined constant transfer rate Rp; the head being for receiving the "n" information signals except the first information signal from the buffer memory, and for recording the "n" information signals except the first information signal on the "n" areas of the recording medium except the first area at the predetermined constant transfer rate Rp; wherein the head implements reproduction of the first information signal from the first area of the recording medium and recording of the "n" information signals except the first information signal on the "n" areas of the recording medium except the first area on a time sharing basis while moving among the "n" areas of the recording medium; and wherein the predetermined constant transfer rate Rp, a sum $\Sigma Rn$ of the transfer rates R1, R2, . . . , Rn, a sum $\Sigma Yn$ of sizes of the "n" information signals, and a sum $\Sigma Sn$ of seek times taken by the head to move from present ones to next ones of the "n" areas of the recording medium are in a relation as follows:

$$\Sigma Yn \geq Rp \cdot \Sigma Rn \cdot Sn/(Rp - \Sigma Rn)$$

A seventeenth aspect of this invention provides an apparatus for reproducing information from a recording medium having "n" areas on which "n" information signals are recorded respectively, where "n" denotes a predetermined natural number equal to or greater than 2. The apparatus comprises a head for reproducing the "n" information signals from the "n" areas of the recording medium and transmitting the reproduced "n" information signals on a time sharing basis and at a predetermined constant transfer rate Rp while moving among the "n" areas of the recording medium; and a buffer memory for receiving the "n" information signals from the head at the predetermined constant transfer rate Rp, for temporarily storing the "n" information signals, and for outputting the "n" information signals at transfer rates R1, R2, . . . , Rn respectively, the transfer rates R1, R2, . . . , Rn being lower than the predetermined constant transfer rate Rp; wherein the predetermined constant transfer rate Rp, a sum $\Sigma Rn$ of the transfer rates R1, R2, . . . , Rn, a sum $\Sigma Yn$ of sizes of the "n" information signals, and an allowable seek time S taken by the head to move from present one to next one of the "n" areas of the recording medium are in a relation as follows:

$$\Sigma Yn \geq Rp \cdot \Sigma Rn \cdot n \cdot S/(Rp - \Sigma Rn)$$

An eighteenth aspect of this invention provides an apparatus for recording information on a recording medium having "n" areas, where "n" denotes a predetermined natural number equal to or greater than 2. The apparatus comprises a buffer memory for receiving "n" information signals at transfer rates R1, R2, . . . , Rn respectively, for temporarily storing the "n" information signals, and for outputting the "n" information signals at a predetermined constant transfer rate Rp higher than the transfer rates R1, R2, . . . , Rn; and a head for receiving the "n" information signals from the buffer memory, and for recording the "n" information signals on the "n" areas of the recording medium respectively on a time sharing basis and at the predetermined constant transfer rate Rp while moving among the "n" areas of the recording medium; wherein the predetermined constant transfer rate Rp, a sum $\Sigma Rn$ of the transfer rates R1, R2, . . . , Rn, a sum $\Sigma Yn$ of sizes of the "n" information signals, and an allowable seek time S taken by the head to move from present one to next one of the "n" areas of the recording medium are in a relation as follows:

$$\Sigma Yn \geq Rp \cdot \Sigma Rn \cdot n \cdot S/(Rp - \Sigma Rn)$$

A nineteenth aspect of this invention provides an apparatus for recording and reproducing information on and from a recording medium having "n" areas, where "n" denotes a predetermined natural number equal to or greater than 2, wherein at least a first area among the "n" areas is loaded with a first information signal among "n" information signals. The apparatus comprises a head for reproducing the first information signal from the first area of the recording medium and transmitting the reproduced first information signal at a predetermined constant transfer rate Rp; and a buffer memory for receiving the first information signal from the head at the predetermined constant transfer rate Rp, for temporarily storing the first information signal, and for outputting the first information signal at a first transfer rate R1 lower than the predetermined constant transfer rate Rp; the buffer memory being for receiving the "n" information signals except the first information signal at transfer rates R2, R3, . . . , Rn respectively, for temporarily storing the "n" information signals except the first information signal, and for outputting the "n" information signals except the first information signal at the predetermined constant transfer rate Rp, the transfer rates R2, R3, . . . , Rn being lower than the predetermined constant transfer rate Rp; the head being for receiving the "n" information signals except the first information signal from the buffer memory, and for recording the "n" information signals except the first information signal on the "n" areas of the recording medium except the first area at the predetermined constant transfer rate Rp; wherein the head implements reproduction of the first information signal from the first area of the recording medium and recording of the "n" information signals except the first information signal on the "n" areas of the recording medium except the first area on a time sharing basis while moving among the "n" areas of the recording medium; and wherein the predetermined constant transfer rate Rp, a sum ΣRn of the transfer rates R1, R2, . . . , Rn, a sum ΣYn of sizes of the "n" information signals, and an allowable seek time S taken by the head to move from present one to next one of the "n" areas of the recording medium are in a relation as follows:

$$\Sigma Yn \geq Rp \cdot \Sigma Rn \cdot n \cdot S / (Rp - \Sigma Rn)$$

A twentieth aspect of this invention provides an apparatus for reproducing information from a recording medium having "n" areas on which "n" information signals are recorded respectively, where "n" denotes a predetermined natural number equal to or greater than 2. The apparatus comprises a head for reproducing the "n" information signals from the "n" areas of the recording medium and transmitting the reproduced "n" information signals on a time sharing basis and at a predetermined constant transfer rate Rp while moving among the "n" areas of the recording medium; and a buffer memory for receiving the "n" information signals from the head at the predetermined constant transfer rate Rp, for temporarily storing the "n" information signals, and for outputting the "n" information signals at transfer rates R1, R2, . . . , Rn respectively, the transfer rates R1, R2, . . . , Rn being lower than the predetermined constant transfer rate Rp, the buffer memory having a capacity Ym; wherein the predetermined constant transfer rate Rp, a sum ΣRn of the transfer rates R1, R2, . . . , Rn, the capacity Ym of the buffer memory, and a sum ΣSn of seek times taken by the head to move from present ones to next ones of the "n" areas of the recording medium are in a relation as follows:

$$Ym > Rp \cdot \Sigma Rn \cdot \Sigma Sn / (Rp - \Sigma Rn)$$

A twenty-first aspect of this invention provides an apparatus for recording information on a recording medium having "n" areas, where "n" denotes a predetermined natural number equal to or greater than 2. The apparatus comprises a buffer memory for receiving "n" information signals at transfer rates R1, R2, . . . , Rn respectively, for temporarily storing the "n" information signals, and for outputting the "n" information signals at a predetermined constant transfer rate Rp higher than the transfer rates R1, R2, . . . , Rn, the buffer memory having a capacity Ym; and a head for receiving the "n" information signals from the buffer memory, and for recording the "n" information signals on the "n" areas of the recording medium respectively on a time sharing basis and at the predetermined constant transfer rate Rp while moving among the "n" areas of the recording medium; wherein the predetermined constant transfer rate Rp, a sum ΣRn of the transfer rates R1, R2, . . . , Rn, the capacity Ym of the buffer memory, and a sum ΣSn of seek times taken by the head to move from present ones to next ones of the "n" areas of the recording medium are in a relation as follows:

$$Ym > Rp \cdot \Sigma Rn \cdot \Sigma Sn / (Rp - \Sigma Rn)$$

A twenty-second aspect of this invention provides an apparatus for recording and reproducing information on and from a recording medium having "n" areas, where "n" denotes a predetermined natural number equal to or greater than 2, wherein at least a first area among the "n" areas is loaded with a first information signal among "n" information signals. The apparatus comprises a head for reproducing the first information signal from the first area of the recording medium and transmitting the reproduced first information signal at a predetermined constant transfer rate Rp; and a buffer memory for receiving the first information signal from the head at the predetermined constant transfer rate Rp, for temporarily storing the first information signal, and for outputting the first information signal at a first transfer rate R1 lower than the predetermined constant transfer rate Rp, the buffer memory having a capacity Ym; the buffer memory being for receiving the "n" information signals except the first information signal at transfer rates R2, R3, . . . , Rn respectively, for temporarily storing the "n" information signals except the first information signal, and for outputting the "n" information signals except the first information signal at the predetermined constant transfer rate Rp, the transfer rates R2, R3, . . . , Rn being lower than the predetermined constant transfer rate Rp; the head being for receiving the "n" information signals except the first information signal from the buffer memory, and for recording the "n" information signals except the first information signal on the "n" areas of the recording medium except the first area at the predetermined constant transfer rate Rp; wherein the head implements reproduction of the first information signal from the first area of the recording medium and recording of the "n" information signals except the first information signal on the "n" areas of the recording medium except the first area on a time sharing basis while moving among the "n" areas of the recording medium; and wherein the predetermined constant transfer rate Rp, a sum ΣRn of the transfer rates R1, R2, . . . , Rn, the capacity Ym of the buffer memory, and a sum ΣSn of seek times taken by the head to move from present ones to next ones of the "n" areas of the recording medium are in a relation as follows:

$$Ym > Rp \cdot \Sigma Rn \cdot \Sigma Sn / (Rp - \Sigma Rn)$$

A twenty-third aspect of this invention provides an apparatus for recording information on a recording medium having "n" areas, where "n" denotes a predetermined natural number equal to or greater than 2. The apparatus comprises a buffer memory for receiving "n" information signals at transfer rates R1, R2, . . . , Rn respectively, for temporarily storing the "n" information signals, and for outputting the "n" information signals at a predetermined constant transfer rate Rp higher than the transfer rates R1, R2, . . . , Rn; a head for receiving the "n" information signals from the buffer memory, and for recording the "n" information signals on the "n" areas of the recording medium respectively on a time sharing basis and at the predetermined constant transfer rate Rp while moving among the "n" areas of the recording medium; means for deciding whether or not parameters including the predetermined constant transfer rate Rp, a sum ΣRn of the transfer rates R1, R2, . . . , Rn, a sum ΣYn of sizes of the "n" information signals, and a sum ΣSn of seek times taken by the head to move from present ones to next ones of the "n" areas of the recording medium are in a relation as follows:

$$\Sigma Yn \geq Rp \cdot \Sigma Rn \cdot \Sigma Sn / (Rp - \Sigma Rn)$$

means for, in cases where it is decided that the parameters are in the relation, permitting the head to record the "n" information signals on the "n" areas of the recording medium respectively; means for, in cases where it is decided that the parameters are not in the relation, selecting "p"

information signals from among the "n" information signals, where "p" denotes a predetermined natural number smaller than "n"; means for deciding whether or not the parameters are in the relation regarding the "p" information signals; and means for, in cases where it is decided that the parameters are in the relation regarding the "p" information signals, permitting the head to record the "p" information signals on "p" areas of the recording medium respectively, the "p" areas being among the "n" areas of the recording medium.

A twenty-fourth aspect of this invention provides an apparatus for recording information on a recording medium having "n" areas, where "n" denotes a predetermined natural number equal to or greater than 2. The apparatus comprises a buffer memory for receiving "n" information signals at transfer rates R1, R2, ..., Rn respectively, for temporarily storing the "n" information signals, and for outputting the "n" information signals at a predetermined constant transfer rate Rp higher than the transfer rates R1, R2, ..., Rn; a head for receiving the "n" information signals from the buffer memory, and for recording the "n" information signals on the "n" areas of the recording medium respectively on a time sharing basis and at the predetermined constant transfer rate Rp while moving among the "n" areas of the recording medium; means for deciding whether or not parameters including the predetermined constant transfer rate Rp, a sum $\Sigma Rn$ of the transfer rates R1, R2, ..., Rn, a sum $\Sigma Yn$ of sizes of the "n" information signals, and a sum $\Sigma Sn$ of seek times taken by the head to move from present ones to next ones of the "n" areas of the recording medium are in a relation as follows:

$$\Sigma Yn \geq Rp \cdot \Sigma Rn \cdot \Sigma Sn/(Rp-\Sigma Rn)$$

means for, in cases where it is decided that the parameters are in the relation, permitting the head to record the "n" information signals on the "n" areas of the recording medium respectively; and means for, in cases where it is decided that the parameters are not in the relation, controlling the head to record the "n" information signals on a common area in the recording medium on a time sharing basis.

A twenty-fifth aspect of this invention is based on the twenty-fourth aspect thereof, and provides an apparatus further comprising means for rearranging the "n" information signals into "n" rearrangement-resultant information signals in the buffer memory, and for sequentially transmitting the "n" rearrangement-resultant information signals from the buffer memory to the head to sequentially record the "n" rearrangement-resultant signals.

A twenty-sixth aspect of this invention provides an apparatus for recording information on a recording medium. The apparatus comprises a buffer memory for receiving "n" information signals at transfer rates R1, R2, ..., Rn respectively, for temporarily storing the "n" information signals, and for outputting the "n" information signals at a predetermined constant transfer rate Rp higher than the transfer rates R1, R2, ..., Rn, where "n" denotes a predetermined natural number equal to or greater than 2; a head for receiving the "n" information signals from the buffer memory, and for recording the "n" information signals on the recording medium on a time sharing basis and at the predetermined constant transfer rate Rp; first means for causing the head to record the "n" information signals on at least two areas in the recording medium on a time sharing basis while moving the head among the areas in the recording medium under conditions where the predetermined constant transfer rate Rp, a sum $\Sigma Rn$ of the transfer rates R1, R2, ..., Rn, a sum $\Sigma Yn$ of sizes of the "n" information signals, and a sum $\Sigma Sn$ of seek times taken by the head to move from present ones to next ones of the areas in the recording medium are in a relation as follows:

$$\Sigma Yn \geq Rp \cdot \Sigma Rn \cdot \Sigma Sn/(Rp-\Sigma Rn)$$

second means for causing the head to record the "n" information signal on a common area in the recording medium on a time sharing basis; and third means for selecting and enabling one of the first and second means.

A twenty-seventh aspect of this invention is based on the twenty-sixth aspect thereof, and provides an apparatus wherein the third means comprises means for selecting and enabling one of the first and second means in response to one of types of the "n" information signals, user's requirement, apparatus specifications, a type of the recording medium, and a condition of a usable area in the recording medium.

A twenty-eighth aspect of this invention is based on the fourteenth aspect thereof, and provides an apparatus further comprising means for partitioning the buffer memory into "n" areas in accordance with values of the transfer rates R1, R2, ..., Rn, wherein the "n" areas in the buffer memory are assigned to the "n" information signals respectively.

A twenty-ninth aspect of this invention is based on the fourteenth aspect thereof, and provides an apparatus further comprising means for partitioning the buffer memory into "n" areas in accordance with an operation mode, wherein the "n" areas in the buffer memory are assigned to the "n" information signals respectively.

A thirtieth aspect of this invention provides an information-signal communication apparatus comprising the apparatus of the fourteenth aspect of this invention and an interface connected with the buffer memory for communication with an external.

A thirty-first aspect of this invention provides an information-signal recording medium having "n" areas on which "n" information signals are recorded respectively, where "n" denotes a predetermined natural number equal to or greater than 2, wherein the "n" information signals can be reproduced from the "n" areas and can be transmitted by a head on a time sharing basis and at a predetermined constant transfer rate Rp while the head moves among the "n" areas of the recording medium, wherein the "n" information signals outputted from the head can be received by a buffer memory at the predetermined constant transfer rate Rp and can be temporarily stored in the buffer memory before being outputted from the buffer memory at transfer rates R1, R2, ..., Rn respectively, the transfer rates R1, R2, ..., Rn being lower than the predetermined constant transfer rate Rp, wherein the predetermined constant transfer rate Rp, a sum $\Sigma Rn$ of the transfer rates R1, R2, ..., Rn, a sum $\Sigma Yn$ of sizes of the "n" information signals, and a sum $\Sigma Sn$ of seek times taken by the head to move from present ones to next ones of the "n" areas of the recording medium are in a relation as follows:

$$\Sigma Yn \geq Rp \cdot \Sigma Rn \cdot \Sigma Sn/(Rp-\Sigma Rn)$$

A thirty-second aspect of this invention provides an apparatus for recording and reproducing information on and from a recording medium having first and second areas and a management area, the management area storing management information representing addresses in the first and second areas. The apparatus comprises a first buffer memory for receiving a first information signal at a first transfer rate, for temporarily storing the first information signal, and for outputting the first information signal at a predetermined constant transfer rate higher than the first transfer rate; a second buffer memory for receiving a second information signal at a second transfer rate lower than the predetermined constant transfer rate, for temporarily storing the second information signal, and for outputting the second information signal at the predetermined constant transfer rate; a head for receiving the first and second information signals from the first and second buffer memories and recording the first and second information signals on the first and second areas of the recording medium respectively on a time sharing basis and at the predetermined constant transfer rate while moving between the first and second areas of the recording medium; means for controlling the head to reproduce the management information from the management area of the recording medium before the head records the first and second information signals; means for deriving the addresses from the reproduced management information; means for searching for unoccupied regions in the first and second areas of the recording medium in response to the derived addresses; and means for deciding whether or not the first and second information signals can be recorded on the unoccupied regions while recording continuities related to the first and second information signals are maintained.

A thirty-third aspect of this invention is based on the thirty-second aspect thereof, and provides an apparatus wherein the deciding means comprises means for deciding whether or not the first and second information signals can be recorded on the unoccupied regions while the predetermined constant transfer rate Rp, the first transfer rate Ra for the first information signal, the second transfer rate Rb for the second information signal, a size Ya of the first information signal, a size Yb of the second information signal, a seek time Tab taken by the head to move from the first area to the second area of the recording medium, and a seek time Tba taken by the head to move from the second area to the first area of the recording medium are in a relation as follows:

$$(Ya+Yb) \geq Rp \cdot (Ra+Rb) \cdot (Tab+Tba)/(Rp-Ra-Rb)$$

A thirty-fourth aspect of this invention is based on the thirty-second aspect thereof, and provides an apparatus wherein the deciding means comprises means for deciding whether or not the first and second information signals can be recorded on the unoccupied regions while the predetermined constant transfer rate Rp, the first transfer rate Ra for the first information signal, the second transfer rate Rb for the second information signal, a size Ya of the first information signal, a size Yb of the second information signal, and a maximum allowable seek time max taken by the head to move on the recording medium are in a relation as follows:

$$(Ya+Yb) \geq 2 \cdot Rp \cdot (Ra+Rb) \cdot Tmax/(Rp-Ra-Rb)$$

A thirty-fifth aspect of this invention provides an apparatus for recording and reproducing information on and from a recording medium having first and second areas and a management area, the first area being loaded with a first information signal, the management area storing management information representing addresses in the first and second areas. The apparatus comprises a head for reproducing the first information signal from the first area of the recording medium and transmitting the reproduced first information signal at a predetermined constant transfer rate; a first buffer memory for receiving the first information signal from the head at the predetermined constant transfer rate Rp, for temporarily storing the first information signal, and for outputting the first information signal at a first transfer rate lower than the predetermined constant transfer rate; a second buffer memory for receiving a second information signal at a second transfer rate lower than the predetermined constant transfer rate, for temporarily storing the second information signal, and for outputting the second information signal at the predetermined constant transfer rate; the head being for receiving the second information signal from the second buffer memory, and for recording the second information signal on the second area of the recording medium at the predetermined constant transfer rate; wherein the head implements reproduction of the first information signal from the first area of the recording medium and recording of the second information signal on the second area of the recording medium on a time sharing basis while moving between the first and second areas of the recording medium; means for controlling the head to reproduce the management information from the management area of the recording medium before the head records the second information signal; means for deriving the addresses from the reproduced management information; means for searching for an unoccupied region in the second area of the recording medium in response to the derived addresses; and means for deciding whether or not the second information signal can be recorded on the unoccupied region while a recording continuity related to the second information signal is maintained.

A thirty-sixth aspect of this invention is based on the thirty-fifth aspect thereof, and provides an apparatus wherein the deciding means comprises means for deciding whether or not the second information signal can be recorded on the unoccupied region while the predetermined constant transfer rate Rp, the first transfer rate Ra for the first information signal, the second transfer rate Rb for the second information signal, a size Ya of the first information signal, a size Yb of the second information signal, a seek time Tab taken by the head to move from the first area to the second area of the recording medium, and a seek time Tba taken by the head to move from the second area to the first area of the recording medium are in a relation as follows:

$$(Ya+Yb) \geq Rp \cdot (Ra+Rb) \cdot (Tab+Tba)/(Rp-Ra-Rb)$$

A thirty-seventh aspect of this invention is based on the thirty-fifth aspect thereof, and provides an apparatus wherein the deciding means comprises means for deciding whether or not the second information signal can be recorded on the unoccupied region while the predetermined constant transfer rate Rp, the first transfer rate Ra for the first information signal, the second transfer rate Rb for the second information signal, a size Ya of the first information signal, a size Yb of the second information signal, and a maximum allowable seek time Tmax taken by the head to move on the recording medium are in a relation as follows:

$$(Ya+Yb) \geq 2 \cdot Rp \cdot (Ra+Rb) \cdot Tmax/(Rp-Ra-Rb)$$

A thirty-eighth aspect of this invention is based on the thirty-second aspect thereof, and provides an apparatus further comprising means for indicating a result of the deciding by the deciding means.

A thirty-ninth aspect of this invention is based on the thirty-second aspect thereof, and provides an apparatus further comprising means for calculating a first total capacity of the unoccupied regions, means for calculating a second total capacity of usable portions of the unoccupied regions, means for calculating an recording efficiency equal to a ratio between the first total capacity and the second total capacity, and means for indicating the calculated recording efficiency.

According to the basic aspects of this invention, the signal transfer rate related to the recording and reproduction of information on and from a recording medium is preferably fixed to the predetermined constant transfer rate Rp.

Generally, this invention can operate on a recording medium such as a DVD-ROM, a DVD–RW, a DVD-RAM, a DVD+RW, and an HDD magnetic disc.

A DVD-ROM or a DVD–RW is subjected to CLV (constant linear velocity) control by a disc drive. Thus, the signal transfer rate is fixed throughout the whole area of the DVD-ROM or the DVD–RW.

A DVD-RAM is divided into zones. The DVD-RAM is subjected to zone CLV by a disc drive. The signal transfer rate varies from zone to zone by only several percent. This invention is adaptable to such a slightly-varying signal transfer rate.

Regarding a DVD+RW or an HDD magnetic disc, the signal transfer rate sometimes depends on a disc radial position. This invention can be applied to a disc area in which the signal transfer rate varies by several percent to several tens of percent.

In these case, it is preferable to calculate the signal transfer rate (Rp) regarding a recording medium as a minimum signal transfer rate which occurs when recording or reproduction is performed.

In this invention, information is recorded on and reproduced from two or more areas of a recording medium. The two or more areas of the recording medium may be a common area. In this case, this invention is designed to operate in one of the following modes. During a first mode of operation, first data are reproduced from an area of a recording medium and a portion of the reproduced first data is changed to form second data, and the second data are recorded on the same area of the recording medium. During a second mode of operation, data are recorded on an area of a recording medium, and then the data are reproduced therefrom and the reproduced data are analyzed to verify whether the data have been correctly recorded on the area of the recording medium.

BRIEF DESCRIPTION OF THE DRAWINGS

FIG. 4 is a diagram of first areas in an optical disc.

FIG. 5 is a diagram of second areas in the optical disc.

FIG. 19 is a diagram of sub-areas in a first area of an optical disc.

FIG. 20 is a diagram of sub-areas in a second area of the optical disc.

FIG. 21 is a diagram of sub-areas in an n-th area of the optical disc.

FIG. 22 is a diagram of sub-areas in a management area of the optical disc.

FIG. 34 is a diagram of a second example of indication on the display in FIG. 30.

FIG. 35 is a diagram of a third example of indication on the display in FIG. 30.

DESCRIPTION OF THE PREFERRED EMBODIMENTS

First Embodiment

Figure 1:
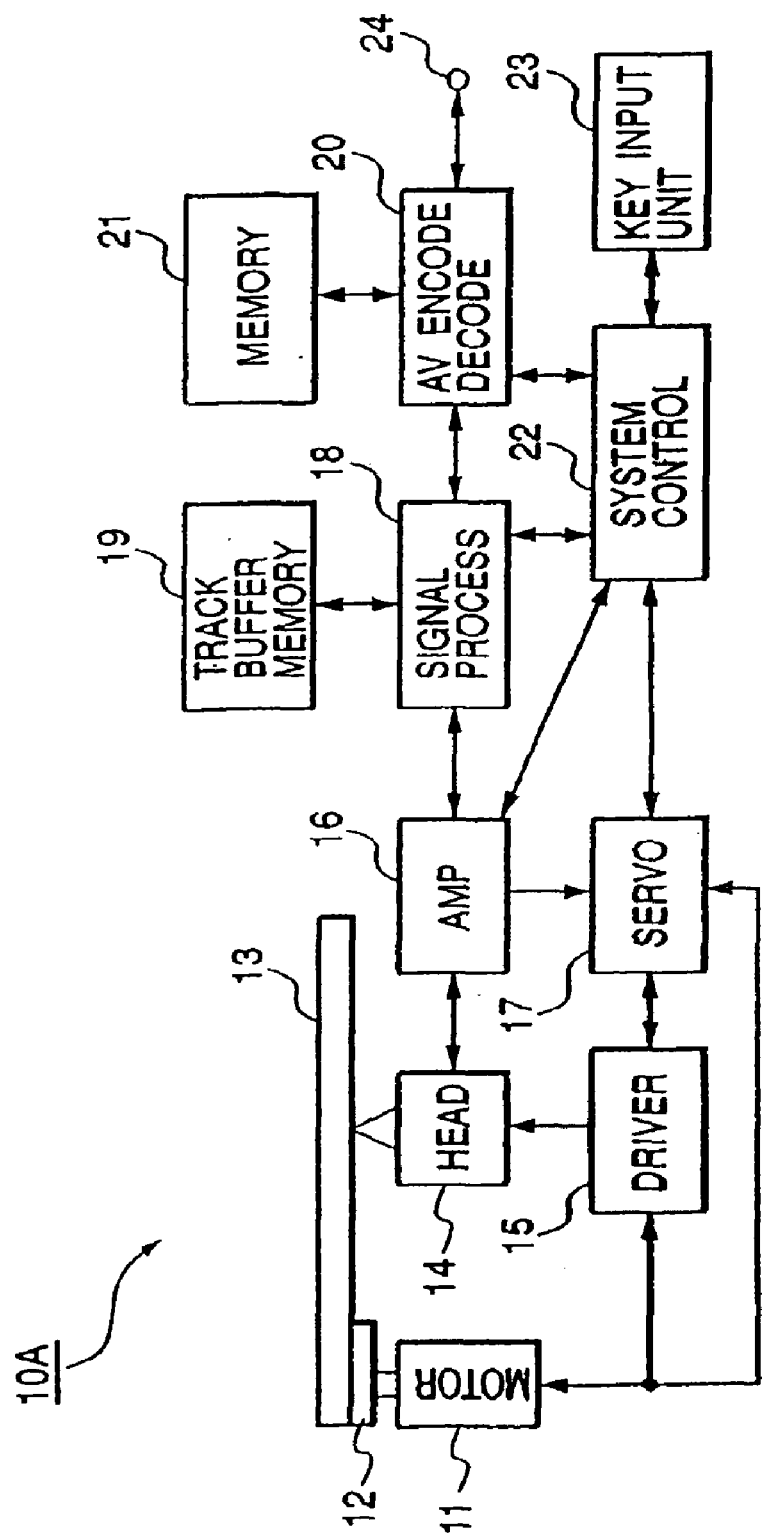
FIG. 1 is a block diagram of an information-signal recording and reproducing apparatus according to a first embodiment of this invention.

FIG. 1 shows an information-signal recording and reproducing apparatus 10A according to a first embodiment of this invention. The apparatus 10A operates on an information-signal recording medium including an optical disc. Examples of the optical disc are a DVD-ROM, a DVD-RAM, a DVD−RW, and a DVD+RW. Alternatively, the information recording medium may include a magnetic disc such as a hard disc or a floppy disc. The information recording medium may include a semiconductor memory.

As shown in FIG. 1, the apparatus 10A includes a spindle motor 11, and a turntable 12 connected to the shaft of the spindle motor 11. An optical disc (an information-signal recording medium) 13 can be placed on the turntable 12. The apparatus 10A further includes an optical head (an optical pickup) 14, a driver 15, an amplifier unit 16, a servo unit 17, a signal processor 18, a track buffer memory 19, an audio-video encoding and decoding unit 20, a memory 21, a system controller 22, a key input unit 23, and an input/output terminal 24.

When the optical disc 13 is placed on the turntable 12, the spindle motor 11 rotates the turntable 12 and the optical disc 13. In the case where the optical disc 13 is of a rewritable type, the optical head 14 writes and reads information thereon and therefrom. In the case where the optical disc 13 is designed exclusively for playback, the optical head 14 only reads information therefrom. The spindle motor 11 is connected to the driver 15 and the servo unit 17. The optical head 14 is connected to the amplifier unit 16 and the driver 15. The amplifier unit 16 is connected to the servo unit 17 and the signal processor 18. The driver 15 is connected to the servo unit 17. The signal processor 18 is connected to the track buffer memory 19 and the audio-video encoding and decoding unit 20. The audio-video encoding and decoding unit 20 is connected to the memory 21 and the input/output terminal 24. The system controller 22 is connected to the amplifier unit 16, the servo unit 17, the signal processor 18, the audio-video encoding and decoding unit 20, and the key input unit 23.

The spindle motor 11 is driven and controlled by the driver 15. The spindle motor 11 rotates the turntable 12 and the optical disc 13. The spindle motor 11 is provided with an FG generator and a rotational position sensor (an angular position sensor). The rotational position sensor includes, for example, a Hall element. The FG generator outputs an FG signal (a rotational speed signal). The Hall element outputs a rotational position signal. The FG signal and the rotational position signal are fed back to the driver 15 and the servo unit 17 as rotation servo signals.

The optical head 14 faces the optical disc 13 placed on the turntable 12. A feed motor (not shown) moves the optical head 14 radially with respect to the optical disc 13. The feed motor is driven by the driver 15. The optical head 14 includes a semiconductor laser, a collimator lens, and an objective lens. The semiconductor laser acts as a source for emitting a light beam (a laser beam). The emitted laser beam is focused into a laser spot on the optical disc 13 by the collimator lens and the objective lens. The optical head 14 includes a 2-axis actuator for driving the objective lens to implement focusing and tracking of the laser spot with respect to the optical disc 13. The semiconductor laser is driven by a laser drive circuit in the optical head 14. In the case where an information signal such as an audio signal or an audio-video signal is recorded, the information signal is subjected to waveform correction by a waveform correction circuit in the amplifier unit 16 before being fed to the laser drive circuit. The 2-axis actuator is driven by the driver 15.

The key input unit 23 includes a plurality of keys which can be operated by a user. The key input unit 23 generates command signals in accordance with its operation by the user. The command signals are transmitted from the key input unit 23 to the system controller 22. The command signals include a command signal for starting a recording mode of operation of the apparatus 10A, and a command signal for starting a playback mode of operation of the apparatus 10A. The key input unit 23 generates control data in accordance with its operation by the user. The control data are transmitted from the key input unit 23 to the system controller 22.

The system controller 22 includes, for example, a microcomputer or a similar device which operates in accordance with a program stored in its internal ROM. The system controller 22 controls the amplifier unit 16, the servo unit 17, the signal processor 18, and the audio-video encoding and decoding unit 20 in response to the command signals fed from the key input unit 23.

Control data can be fed to the system controller 22 via an input terminal (not shown). The control data fed to the system controller 22 via the input terminal, and the control data fed to the system controller 22 from the key input unit 23 include a signal for adjusting the resolution of pictures represented by contents information to be recorded, a signal for separating quickly-moving scenes such as car racing scenes represented by contents information, and a signal for giving priority to a recording time. The system controller 22 changes an actual recording time in accordance with the control data. The system controller 22 enables the setting of the actual recording time to be selected by the user.

When the apparatus 10A is required to start to operate in the playback mode, the key input unit 23 is actuated to generate the playback start command signal. The playback start command signal is transmitted from the key input unit 23 to the system controller 22. The system controller 22 controls the amplifier unit 16 and the servo unit 17 in response to the playback start command signal, thereby starting the playback mode of operation of the apparatus 10A. The control of the servo unit 17 includes steps of controlling the driver 15. Firstly, the system controller 22 starts rotation of the optical disc 13 and application of a laser spot thereon through the control of the driver 15. The optical head 14 is controlled by the driver 15, thereby reading out address information from the optical disc 13. For example, the address information is contained in management information stored in a management area of the optical disc 13. The read-out address information is transmitted from the optical head 14 to the system controller 22 via the amplifier unit 16. The system controller 22 finds or decides a target sector (a target track portion) to be played back by referring to the address information. The system controller 22 controls the optical head 14 via the servo unit 17, the driver 15, and the feed motor, thereby moving the optical head 14 radially with respect to the optical disc 13 and hence moving the laser spot to the target sector on the optical disc 13. When the movement of the laser spot to the target sector is completed, the system controller 22 operates to start the reproduction of a signal from the target sector on the optical disc 13. In this way, the playback mode of operation of the apparatus 10A is started. During the playback mode of operation of the apparatus 10A, the target sector is repetitively changed from one to another.

During the playback mode of operation of the apparatus 10A, the optical head 14 scans the optical disc 13 and generates an RF signal containing information read out therefrom. A unit of generation of the RF signal corresponds to one correction block of the information recorded on the optical disc 13. The optical head 14 outputs the RF signal to the amplifier unit 16. The amplifier unit 16 enlarges the RF signal. In addition, the amplifier unit 16 generates a main reproduced signal, and tracking and focusing servo signals (tracking error and focusing error signals) from the enlarged RF signal. The amplifier unit 16 includes an equalizer for optimizing the frequency aspect of the main reproduced signal. Also, the amplifier unit 16 includes a PLL (phase locked loop) circuit for extracting a bit clock signal from the equalized main reproduced signal, and for generating a speed servo signal from the equalized main reproduced signal. Furthermore, the amplifier unit 16 includes a jitter generator for comparing the time bases of the bit clock signal and the equalized main reproduced signal, and for detecting jitter components from the results of the time-base comparison. A signal of the detected jitter components is transmitted from the amplifier unit 16 to the system controller 22. The tracking and focusing servo signals and the speed servo signal are transmitted from the amplifier unit 16 to the servo unit 17. The equalized main reproduced signal is transmitted from the amplifier unit 16 to the signal processor 18.

The servo unit 17 receives the speed servo signal and the tracking and focusing servo signals from the amplifier unit 16. The servo unit 17 receives the rotation servo signals from the spindle motor 11. In response to these servo signals, the servo unit 17 implements corresponding servo control processes.

Specifically, the servo unit 17 generates a rotation control signal on the basis of the speed servo signal and the rotation servo signals. The rotation control signal is transmitted from the servo unit 17 to the spindle motor 11 via the driver 15. The spindle motor 11 rotates at a speed depending on the rotation control signal. The rotation control signal is designed to rotate the optical disc 13 at a given constant linear velocity.

In addition, the servo unit 17 generates servo control signals on the basis of the focusing and tracking servo signals. The servo control signals are transmitted from the servo unit 17 to the 2-axis actuator in the optical head 14 via the driver 15. The 2-axis actuator controls the laser spot on the optical disc 13 in response to the servo control signals, and thereby implements focusing and tracking of the laser spot with respect to the optical disc 13.

During the playback mode of operation of the apparatus 10A, the signal processor 18 receives the main reproduced signal from the amplifier unit 16. The signal processor 18 is controlled by the system controller 22, thereby converting the main reproduced signal into a corresponding reproduced digital signal. The signal processor 18 detects a sync signal from the reproduced digital signal. The signal processor 18 decodes an EFM+ signal (an 8–16 modulation signal) of the reproduced digital signal into NRZ data, that is, non-return-to-zero data. The signal processor 18 subjects the NRZ data to an error correction process for every correction block, thereby generating a sector address signal and first and second information signals. The sector address signal represents the address of a currently-accessed sector on the optical disc 13. The sync signal and the sector address signal are fed from the signal processor 18 to the system controller 22. It should be noted that the first and second information signals generated by the signal processor 18 correspond to first and second information signals resulting from compression at variable transfer rates (variable transmission rates) during a recording mode of operation.

During the playback mode of operation of the apparatus 10A, the signal processor 18 temporarily stores the first and second information signals in the track buffer memory 19. Thus, the signal processor 18 writes the first and second information signals into the track buffer memory 19, and reads the first and second information signals therefrom. Writing and reading the first and second information signals into and from the track buffer memory 19 are controlled to absorb a time-domain change in the transfer rates of the first and second information signals. The track buffer memory 19 includes, for example, a D-RAM having a capacity of 64 Mbytes. The signal processor 18 outputs the read-out signal (the first and second information signals read out from the track buffer memory 19) to the audio-video encoding and decoding unit 20.

In the case where the first and second information signals fed from the track buffer memory 19 via the signal processor 18 are compressed MPEG2 data in which audio data and video data are multiplexed, the audio-video encoding and decoding unit 20 separates the first and second information signals into compressed audio data and compressed video data. The audio-video encoding and decoding unit 20 expands and decodes the compressed audio data into non-compressed audio data. In addition, the audio-vide encoding and decoding unit 20 expands and decodes the compressed video data into non-compressed video data. During the expansively decoding process, the audio-video encoding and decoding unit 20 temporarily stores signals and data in the memory 21. The memory 21 includes, for example, a D-RAM having a capacity of 64 Mbytes. The audio-video encoding and decoding unit 20 converts the non-compressed audio data into a corresponding analog audio signal through digital-to-analog conversion. Also, the audio-video encoding and decoding unit 20 converts the non-compressed video data into a corresponding analog video signal through digital-to-analog conversion. It should be noted that the conversion of the non-compressed audio and video data into the analog audio and video signals may be implemented by digital-to-analog converters provided externally of the audio-video encoding and decoding unit 20. The audio-video encoding and decoding unit 20 applies the analog audio signal and the analog video signal to the input/output terminal 24. The analog audio signal and the analog video signal are transmitted to an external via the input/output terminal 24.

The data rate of the expansively decoding process by the audio-video encoding and decoding unit 20, that is, the data transfer rate (the data transmission rate) in the expansively decoding process, is equalized to an expansion data rate which is set in accordance with the type of the related recording mode of operation of the apparatus 10A. Specifically, the audio-video encoding and decoding unit 20 can implement the expansively decoding process at a expansion data rate which can be changed among plural different expansion data rates. The audio-video encoding and decoding unit 20 selects one from among the plural different expansion data rates as a desired expansion data rate in accordance with the type of the related recording mode of operation of the apparatus 10A. The audio-video encoding and decoding unit 20 executes the expansively encoding process at the desired expansion data rate. Information of the type of the recording mode of operation of the apparatus 10A is recorded on the optical disc 13 as control data which may be contained in the management information. During an initial stage of the playback of the optical disc 13, the control data are read out therefrom before being transmitted to the system controller 22. The system controller 22 sets the expansion data rate in the audio-video encoding and decoding unit 20 in accordance with the control data.

When the apparatus 10A is required to start to operate in the recording mode, the key input unit 23 is actuated to generate the recording start command signal. The recording start command signal is transmitted from the key input unit 23 to the system controller 22. The system controller 22 controls the amplifier unit 16 and the servo unit 17 in response to the recording start command signal, thereby starting the recording mode of operation of the apparatus 10A. The control of the servo unit 17 includes steps of controlling the driver 15. Firstly, the system controller 22 starts rotation of the optical disc 13 and application of a laser spot thereon through the control of the driver 15. The optical head 14 is controlled by the driver 15, thereby reading out address information from the optical disc 13. For example, the address information is contained in the management information stored in the management area of the optical disc 13. The read-out address information is transmitted from the optical head 14 to the system controller 22 via the amplifier unit 16. The system controller 22 finds or decides a target sector (a target track portion), on which a signal is to be recorded, by referring to the address information. The system controller 22 controls the optical head 14 via the servo unit 17, the driver 15, and the feed motor, thereby moving the optical head 14 radially with respect to the optical disc 13 and hence moving the laser spot to the target sector on the optical disc 13. During the recording mode of operation of the apparatus 10A, the target sector is repetitively changed from one to another.

During the recording mode of operation of the apparatus 10A, an audio signal and a video signal to be recorded are fed via the input/output terminal 24 to the audio-video encoding and decoding unit 20. The audio-video encoding and decoding unit 20 converts the audio signal into corresponding audio data through analog-to-digital conversion. In addition, the audio-video encoding and decoding unit 20 converts the video signal into corresponding video data through analog-to-digital conversion. It should be noted that the conversion of the audio and video signals into the audio and video data may be implemented by analog-to-digital converters provided externally of the audio-video encoding and decoding unit 20. The audio-video encoding and decoding unit 20 compressively encodes the audio data and the video data into MPEG2 audio data and MPEG2 video data at a rate depending on the type of the recording mode. The audio-video encoding and decoding unit 20 multiplexes the MPEG2 audio data and the MPEG2 video data to form multiplexed MPEG2 data. The audio-video encoding and decoding unit 20 outputs the multiplexed MPEG2 data to the signal processor 18. The data rate of the compressively encoding process by the audio-video encoding and decoding unit 20, that is, the data transfer rate (the data transmission rate) in the compressively encoding process, is equalized to a compression data rate which is selected from among plural different rates in accordance with the type of the recording mode of operation of the apparatus 10A. During the compressively encoding process, the audio-video encoding and decoding unit 20 temporarily stores data in the memory 21.

It should be noted that the multiplexed MPEG2 data may be replaced by still-picture data or computer data such as program file data. In this case, the still-picture data or the computer data are transmitted to the system controller 22 via an interface (not shown). The system controller 22 transfers the still-picture data or the computer data to the signal processor 18.

During the recording mode of operation of the apparatus 10A, the signal processor 18 adds error correction code signals (ECC signals) to the multiplexed MPEG2 data, the still-picture data, or the computer data. The signal processor 18 subjects the ECC-added data to NRZ and EFM+ encoding processes. The signal processor 18 adds a sync signal to the encoding-resultant data to form sync-added data. The sync signal is fed from the system controller 22. The sync-added data are temporarily stored in the track buffer memory 19. The sync-added data are read out from the track buffer memory 19 at a data rate corresponding to a data rate of signal recording on the optical disc 13. The signal processor 18 subjects the read-out data to given modulation for record. The signal processor 18 outputs the modulation-resultant signal to the amplifier unit 16. The amplifier unit 16 corrects the waveform of the output signal of the signal processor 18. The amplifier unit 16 outputs the waveform-correction-resultant signal to the laser drive circuit in the optical head 14. The optical head 14 records the output signal of the amplifier unit 16 on the target sector (the target track portion) on the optical disc 13.

The amplifier unit 16 informs the system controller 22 of detected jitter components. The system controller 22 subjects the detected jitter components to analog-to-digital conversion to generate a measured jitter value. During the recording mode of operation of the apparatus 10A, the system controller 22 adjusts the degree or characteristic of the waveform correction by the amplifier unit 16 in response to the measured jitter value and an asymmetry value.

Operation of the apparatus 10A can be changed among various modes. During a first mode of operation which corresponds to the previously-mentioned playback mode of operation, the apparatus 10A reproduces an audio signal (audio signals) or an audio-video signal (audio-video signals) from the optical disc 13. During a second mode of operation which corresponds to the previously-mentioned recording mode of operation, the apparatus 10A records an audio signal or an audio-video signal on the optical disc 13. During a third mode of operation, the apparatus 10A records an audio signal or an audio-video signal on one area of the optical disc 13 while reproducing an audio signal or an audio-video signal from another area of the optical disc 13. During a fourth mode of operation, the apparatus 10A reproduces an audio signal or an audio-video signal from one area of the optical disc 13 while recording an audio signal or an audio-video signal on another area of the optical disc 13. During a fifth mode of operation, the apparatus 10A reproduces an audio signal or an audio-video signal from one area of the optical disc 13 while reproducing an audio signal or an audio-video signal from another area of the optical disc 13. During a sixth mode of operation, the apparatus 10A records an audio signal or an audio-video signal on one area of the optical disc 13 while recording an audio signal or an audio-video signal on another area of the optical disc 13. These various modes of operation of the apparatus 10A meet user's requests for the implementation of an after-recording process and a different-channel-program recording process.

The apparatus 10A can record first and second information signals on different areas of the optical disc 13, respectively, on a time sharing basis. The first and second information signals are first and second audio-video information signals respectively. Alternatively, the first and second information signals may be first and second audio information signals respectively. The apparatus 10A can record only one of the first and second information signals on the optical disc 13.

The apparatus 10A can reproduce first and second information signals from different areas of the optical disc 13, respectively, on a time sharing basis. The first and second information signals are first and second audio-video information signals respectively. Alternatively, the first and second information signals may be first and second audio information signals respectively. The apparatus 10A can reproduce only one of the first and second information signals from the optical disc 13.

Figure 2:
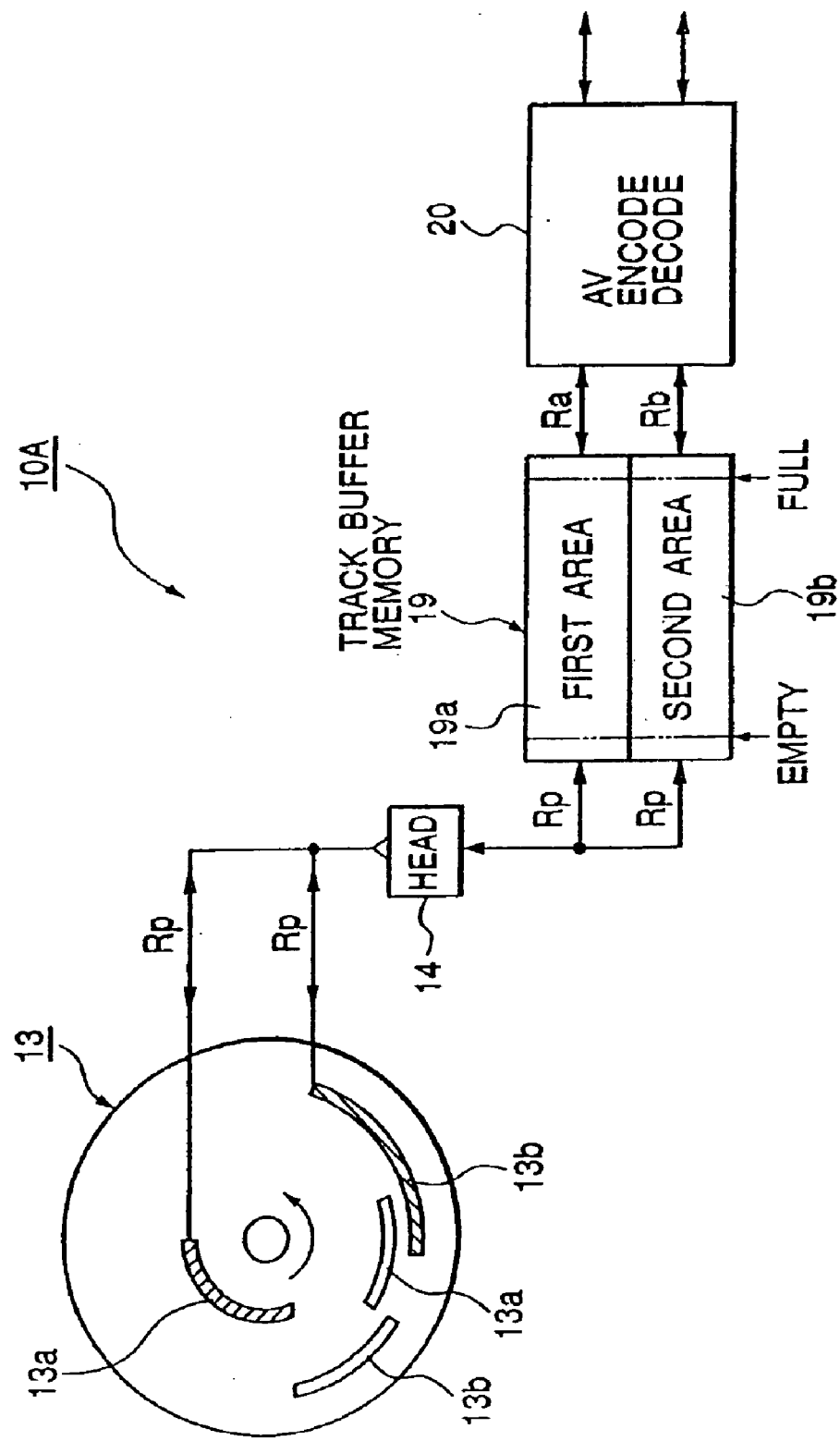
FIG. 2 is a diagram of a portion of the apparatus in FIG. 1.

FIG. 2 shows a portion of the apparatus 10A. The amplifier unit 16 and the signal processor 18 are omitted from FIG. 2 for a better understanding. As shown in FIG. 2, the optical disc 13 has first areas 13a assigned to a first information signal "A", and second areas 13b assigned to a second information signal "B". The first areas 13a have equal sizes, and are separate from each other. The second areas 13b have equal sizes, and are separate from each other. The second areas 13b are separate from the first areas 13a. The first information signal "A" is divided into blocks each having a predetermined size (a predetermined total number of bits) Ya. The predetermined size Ya is a unit (a unit capacity) for continuous reproduction (or continuous recording) of information, or a unit (a unit capacity) for reproduction (or recording) of continuous information. The first areas 13a are allocated to the blocks of the first information signal "A", respectively. The second information signal "B" is divided into blocks each having a predetermined size (a predetermined total number of bits) Yb equal to or different from the predetermined size Ya. The predetermined size Yb is a unit (a unit capacity) for continuous reproduction (or continuous recording) of information, or a unit (a unit capacity) for reproduction (or recording) of continuous information. The second areas 13b are allocated to the blocks of the second information signal "B", respectively. The first information signal "A" and the second information signal "B" are related or unrelated to each other. Each of the first and second information signals "A" and "B" represents audio data, video data, audio-video data, or computer data.

The track buffer memory 19 has a first area 19a assigned to the first information signal "A", and a second area 19b assigned to the second information signal "B".

With reference to FIG. 2, the optical head 14 transfers the first information signal "A" and the second information signal "B" between the optical disc 13 and the track buffer memory 19 on a time sharing basis and at a predetermined constant transfer rate Rp. The predetermined constant transfer rate Rp is equal to, for example, 25 Mbps.

The first information signal "A" is transferred between the track buffer memory 19 and the audio-video encoding and decoding unit 20 at a transfer rate Ra selected from among predetermined values. All the predetermined values are lower than the predetermined constant transfer rate Rp related to the optical head 14. The second information signal "B" is transferred between the track buffer memory 19 and the audio-video encoding and decoding unit 20 at a transfer rate Rb changeable among the predetermined values.

As will be mentioned later, the apparatus 10A can substantially continuously and simultaneously record or reproduce the first information signal "A" and the second information signal "B".

In more detail, each of the transfer rates Ra and Rb is selected from among a value of 8 Mbps which corresponds to a recording time of 2 hours and a high picture quality, a value of 4 Mbps which corresponds to a recording time of 4 hours and a slightly high picture quality, and a value of 2 Mbps which corresponds to a recording time of 8 hours and a normal picture quality. Ones of these values can be designated as desired values of the transfer rates Ra and Rb according to user's operation of the key input unit 23 (see FIG. 1). A value of 17 Mbps may be added to the candidate values. During the recording of the first information signal "A" and the second information signal "B" on the optical disc 13, the transfer rates Ra and Rb are set to the desired values designated by user's operation of the key input unit 23. During the reproduction of the first information signal "A" and the second information signal "B" from the optical disc 13, information of recording compression rates is derived from control data for the information signals "A" and "B", and the transfer rates Ra and Rb are set in response to the recording compression rates. Alternatively, during the reproduction of the first information signal "A" and the second information signal "B" from the optical disc 13, control data (management information) representative of transfer rates Ra and Rb used in the recording are reproduced from the optical disc 13, and the reproduction transfer rates Ra and Rb are set in accordance with the reproduced control data.

The system controller 22 (see FIG. 1) controls the track buffer memory 19 via the signal processor 18 (see FIG. 1). The system controller 22 virtually divides or partitions the track buffer memory 19 into the first and second areas 19a and 19b. Specifically, the system controller 22 sets the first and second areas 19a and 19b in the track buffer memory 19 in response to the values of the transfer rates Ra and Rb. The ratio in capacity between the first and second areas 19a and 19b depends on the ratio "Ra:Rb", that is, the ratio between the transfer rates Ra and Rb. Regarding the first area 19a in the track buffer memory 19, the system controller 22 sets an empty value and a full value in response to the value of the transfer rate Ra. The empty value corresponds to a slightly occupied state or a substantially empty state of the first area 19a. The full value corresponds to a fully occupied state of the first area 19a. Regarding the second area 19b in the track buffer memory 19, the system controller 22 sets an empty value and a full value in response to the value of the transfer rate Rb. The empty value corresponds to a slightly occupied state or a substantially empty state of the second area 19b. The full value corresponds to a fully occupied state of the second area 19b. The system controller 22 always monitors the degree of occupancy of each of the first and second areas 19a and 19b which varies between the related empty value and the related full value under normal conditions.

Alternatively, the division of the track buffer memory 19 into the first and second areas 19a and 19b may be responsive to the type of the mode of operation of the apparatus 10A. For example, in the case of the operation mode during which the apparatus 10A reproduces one of the information signals "A" and "B" and records the other information signal, greater one of the first and second areas 19a and 19b is assigned to the information signal to be recorded while smaller one is assigned to the reproduced information signal. This design reliably prevents the occurrence of an interruption of the continuously recording of the information signal. The system controller 22 implements the division of the track buffer memory 19 into the first and second areas 19a and 19b when receiving a recording start command signal or a playback start command signal. Preferably, the system controller 22 implements the division of the track buffer memory 19 after confirming the absence of data from the track buffer memory 19 which are being reproduced or recorded.

Two-signal Playback Mode

Figure 3:
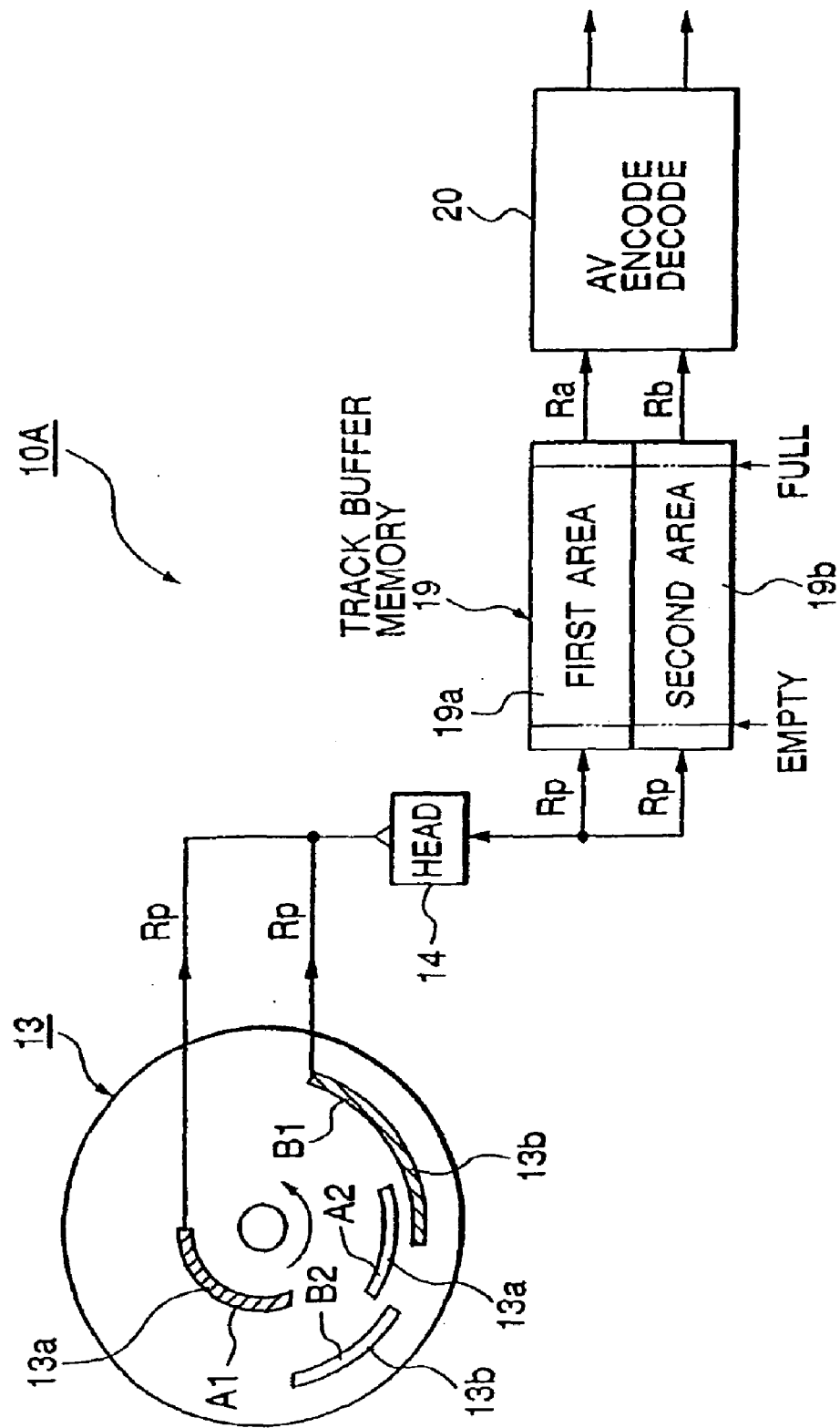
FIG. 3 is a diagram of a portion of the apparatus in FIG. 1 which is operating in a two-signal playback mode.

FIG. 3 shows a portion of the apparatus 10A which is operating in a two-signal playback mode. The amplifier unit 16 and the signal processor 18 are omitted from FIG. 3 for a better understanding. With reference to FIG. 3, the optical disc 13 is designed exclusively for playback. The optical disc 13 has the first areas 13a on which the blocks of the first information signal "A" are previously recorded respectively. In addition, the optical disc 13 has the second areas 13b on which the blocks of the second information signal "B" are previously recorded respectively. Each of the blocks of the first information signal "A" has a predetermined size (a predetermined total number of bits) Ya. Each of the blocks of the second information signal "B" has a predetermined size (a predetermined total number of bits) Yb equal to or different from the predetermined size Ya.

As shown in FIG. 4, the first areas 13a of the optical disc 13 are given addresses A1, A2, A3, . . . , respectively. Thus, the first areas 13a are also referred to as the first areas A1, A2, A3, . . . . The blocks of the first information signal "A" are recorded on the first areas A1, A2, A3, . . . , respectively. Preferably, the size Ya of the blocks of the first information signal "A" is equal to the size of the first areas A1, A2, A3, . . . . The placement of the first areas 13a is designed to meet requirements for a seek time. As shown in FIG. 5, the second areas 13b of the optical disc 13 are given addresses B1, B2, B3, . . . , respectively. Thus, the second areas 13b are also referred to as the second areas B1, B2, B3, . . . . The blocks of the second information signal "B" are recorded on the second areas B1, B2, B3, . . . , respectively. Preferably, the size Yb of the blocks of the second information signal "B" is equal to the size of the second areas B1, B2, B3, . . . . The placement of the second areas 13b is designed to meet requirements for a seek time. First, a block of the first information signal "A" is reproduced from first one A1 (the first area 13a given the address A1) of the first areas 13a. Second, a block of the second information signal "B" is reproduced from first one B1 (the second area 13b given the address B1) of the second areas 13b. The first area A1 and the second area B1 are located relative to each other so that the optical head 14 can move therebetween in a predetermined time (equal to, for example, 1.5 seconds). Therefore, the maximum seek time during which the optical head 14 moves between the first area 13a and the second area 13b is equal to the predetermined time (for example, 1.5 seconds).

During the two-signal playback mode of operation of the apparatus 10A, the optical head 14 moves to a position of a designated track on the optical disc 13 and waits for a start sector. Then, the optical head 14 meets the start sector, and the reproduction of the first information signal "A" and the second information signal "B" is started. The system controller 22 derives information of recording compression rates (information of transfer rates Ra and Rb) from control data for the reproduced information signals "A" and "B".

The system controller 22 divides or partitions the track buffer memory 19 into a first area 19a and a second area 19b, and sets capacities of the first and second areas 19a and 19b in response to the recording compression rates. In addition, the system controller 22 sets empty values and full values of the first and second areas 19a and 19b in response to the recording compression rates.

The optical head 14 alternately reproduces the first information signal "A" and the second information signal "B" from the first areas 13a and the second areas 13b of the optical disc 13 on a time sharing basis. The reproduced first information signal "A" is stored into the first area 19a of the track buffer memory 19 from the optical head 14 at a predetermined constant transfer rate Rp (equal to, for example, 25 Mbps). The reproduced second information signal "B" is stored into the second area 19b of the track buffer memory 19 from the optical head 14 at the predetermined constant transfer rate Rp. Storing the reproduced first information signal "A" into the first area 19a of the track buffer memory 19 alternates with storing the reproduced second information signal "B" into the second area 19b of the track buffer memory 19.

The system controller 22 sets transfer rates Ra and Rb for the first information signal "A" and the second information signal "B" on the basis of the recording compression rates. The transfer rates Ra and Rb are lower than the predetermined constant transfer rate Rp. The first information signal "A" is transmitted from the first area 19a of the track buffer memory 19 to the audio-video encoding and decoding unit 20 at the transfer rate Ra. The second information signal "B" is transmitted from the second area 19b of the track buffer memory 19 to the audio-video encoding and decoding unit 20 at the transfer rate Rb. Generally, the transmission of the first information signal "A" from the track buffer memory 19 and the transmission of the second information signal "B" from the track buffer memory 19 are implemented on a time sharing basis. The audio-video encoding and decoding unit 20 expands and decodes the first information signal "A" into a first non-compressed information signal "A". In addition, the audio-video encoding and decoding unit 20 expands and decodes the second information signal "B" into a second non-compressed information signal "B". The first non-compressed information signal "A" and the second non-compressed information signal "B" are transmitted from the audio-video encoding and decoding unit 20 to a display and a loudspeaker, being simultaneously converted into corresponding pictures and sounds.

Figure 6:
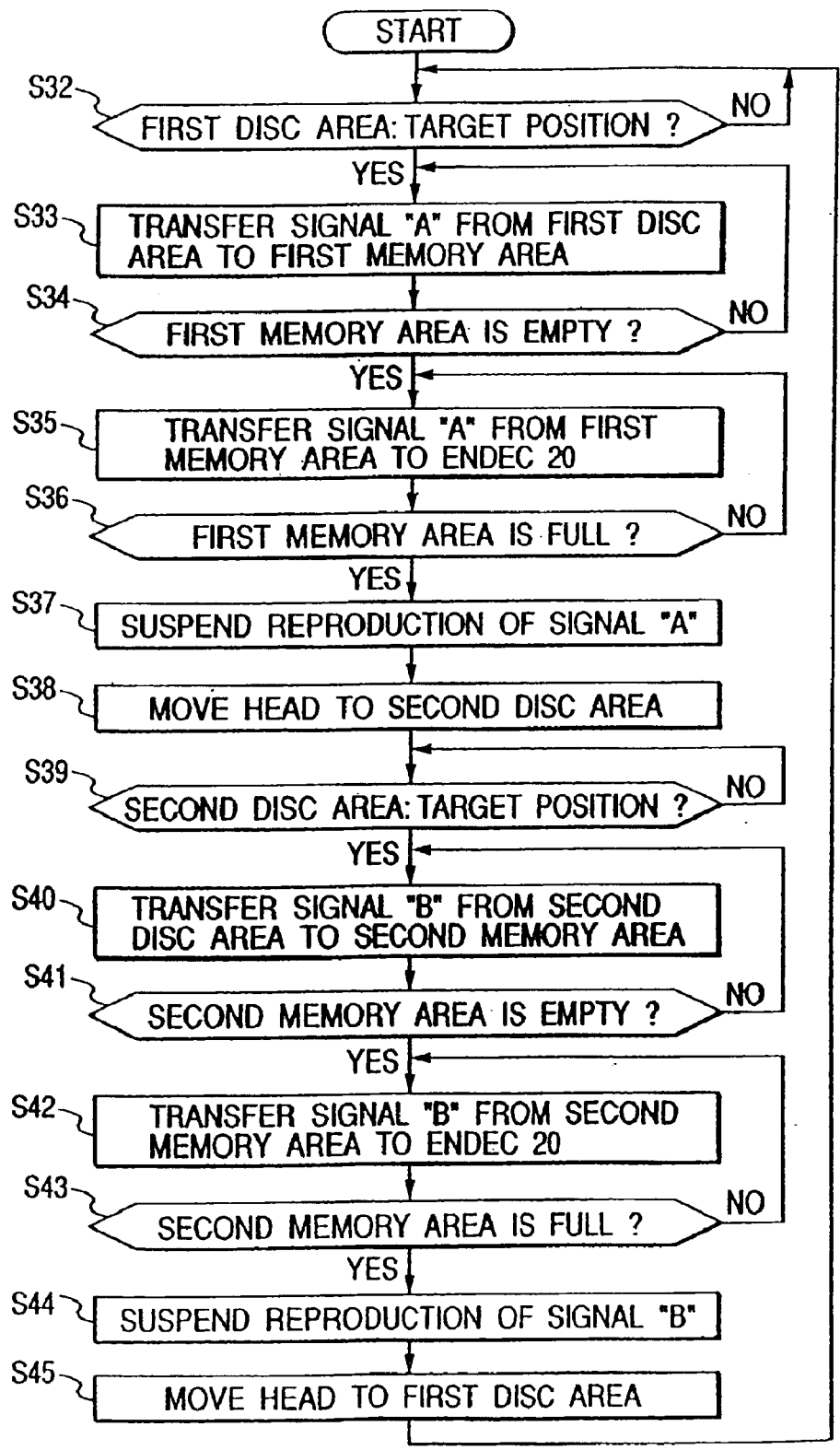
FIG. 6 is a flowchart of a segment of a program for a system controller in FIG. 1 which relates to the two-signal playback mode of operation.

The system controller 22 operates in accordance with a program stored in its internal ROM. FIG. 6 is a flowchart of a segment of the program which relates to the two-signal playback mode of operation of the apparatus 10A. The program segment in FIG. 6 is started in response to a two-signal-playback start command signal fed from the key input unit 23.

With reference to FIG. 6, a first step S32 of the program segment decides whether or not the optical head 14 has reached a target position on the optical disc 13. Initially, the target position corresponds to first one A1 of the first areas 13a in the optical disc 13. When the optical head 14 has not reached the target position yet, the step S32 is repeated. When the optical head 14 has reached the target position, the program advances from the step S32 to a step S33.

The step S33 enables the optical head 14 to reproduce the first information signal "A" from the present first area 13a in the optical disc 13. The step S33 stores the reproduced first information signal "A" into the first area 19a in the track buffer memory 19 at the predetermined constant transfer rate Rp.

A step S34 following the step S33 decides whether or not the degree of occupancy of the first area 19a in the track buffer memory 19 has reached the related empty value. When the degree of occupancy of the first area 19a in the track buffer memory 19 has not reached the related empty value yet, the program returns from the step S34 to the step S33. When the degree of occupancy of the first area 19a in the track buffer memory 19 has reached the related empty value, the program advances from the step S34 to a step S35.

The step S35 transfers the first information signal "A" from the first area 19a in the track buffer memory 19 to the audio-video encoding and decoding unit 20 at the transfer rate Ra.

A step S36 following the step S35 decides whether or not the degree of occupancy of the first area 19a in the track buffer memory 19 has reached the related full value. When the degree of occupancy of the first area 19a in the track buffer memory 19 has not reached the related full value yet, the program returns from the step S36 to the step S35. When the degree of occupancy of the first area 19a in the track buffer memory 19 has reached the related full value, the program advances from the step S36 to a step S37.

The step S37 forces the optical head 14 to suspend the reproduction of the first information signal "A" from the present first area 13a in the optical disc 13.

A step S38 subsequent to the step S37 moves the optical head 14 toward a next target position. The next target position corresponds to, for example, first one B1 of the second areas 13b in the optical disc 13. After the step S38, the program advances to a step S39.

The step S39 decides whether or not the optical head 14 has reached the target position on the optical disc 13. When the optical head 14 has not reached the target position yet, the step S39 is repeated. When the optical head 14 has reached the target position, the program advances from the step S39 to a step S40.

In this way, the optical head 14 moves from the first area 13a to the second area 13b in the optical disc 13. The seek time Tab related to this movement of the optical head 14 is equal to 1.5 seconds or shorter.

The step S40 enables the optical head 14 to reproduce the second information signal "B" from the present second area 13b in the optical disc 13. The step S40 stores the reproduced second information signal "B" into the second area 19b in the track buffer memory 19 at the predetermined constant transfer rate Rp.

A step S41 following the step S40 decides whether or not the degree of occupancy of the second area 19b in the track buffer memory 19 has reached the related empty value. When the degree of occupancy of the second area 19b in the track buffer memory 19 has not reached the related empty value yet, the program returns from the step S41 to the step S40. When the degree of occupancy of the second area 19b in the track buffer memory 19 has reached the related empty value, the program advances from the step S41 to a step S42.

The step S42 transfers the second information signal "B" from the second area 19b in the track buffer memory 19 to the audio-video encoding and decoding unit 20 at the transfer rate Rb.

A step S43 following the step S42 decides whether or not the degree of occupancy of the second area 19b in the track buffer memory 19 has reached the related full value. When the degree of occupancy of the second area 19b in the track buffer memory 19 has not reached the related full value yet, the program returns from the step S43 to the step S42. When the degree of occupancy of the second area 19b in the track buffer memory 19 has reached the related full value, the program advances from the step S43 to a step S44.

The step S44 forces the optical head 14 to suspend the reproduction of the second information signal "B" from the present second area 13b in the optical disc 13.

A step S45 subsequent to the step S44 moves the optical head 14 toward a next target position. The next target position corresponds to, for example, second one A2 of the first areas 13a in the optical disc 13. After the step S45, the program returns to the step S32.

Thus, the optical head 14 moves from the second area 13b to the first area 13a in the optical disc 13. The seek time Tba related to this movement of the optical head 14 is equal to 1.5 seconds or shorter.

During the repetitive execution of the program segment in FIG. 6, the target position of the optical head 14 is sequentially set into correspondence with the first and second areas A1, B1, A2, B2, A3, B3, . . . in the optical disc 13. Therefore, the optical head 14 alternately reproduces the first information signal "A" and the second information signal "B" from the first and second areas 13a and 13b of the optical disc 13 in the order as "A1, B1, A2, B2, A3, B3, . . . ".

Preferably, the step S37 or the step S44 is followed by a step which decides whether or not both the reproduction of the first information signal "A" from the optical disc 13 and the reproduction of the second information signal "B" therefrom are required to be suspended. In this case, when both the reproduction of the first information signal "A" from the optical disc 13 and the reproduction of the second information signal "B" therefrom are required to be suspended, the optical head 14 is controlled to implement the required suspension of reproduction.

Figure 7:
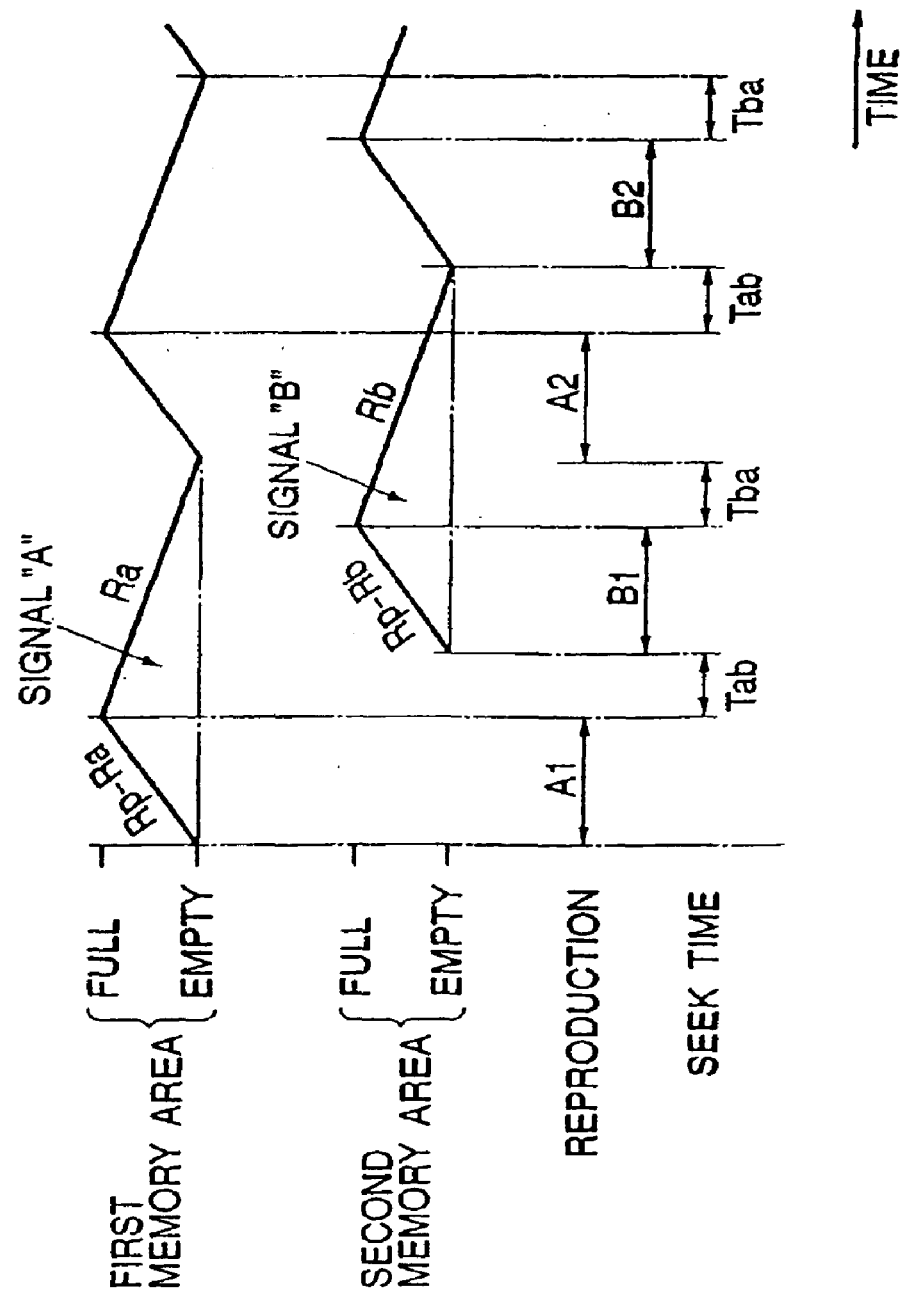
FIG. 7 is a time-domain diagram of the degrees of occupancy of first and second areas in a track buffer memory in FIG. 1 which occur in the two-signal playback mode of operation.

With reference to FIG. 7, after the degree of occupancy of the first area 19a in the track buffer memory 19 reaches the related empty value, the first information signal "A" is read out from the memory area 19a at the transfer rate Ra and the first information signal "A" is transmitted from the first area A1 in the optical disc 13 to the memory area 19a at the predetermined constant transfer rate Rp. Thus, during this stage, the degree of occupancy of the memory area 19a increases at a rate corresponding to "Rp–Ra".

When the degree of occupancy of the memory area 19a reaches the related full value, the transmission of the first information signal "A" from the first area A1 in the optical disc 13 to the memory area 19a is suspended. Then, the optical head 14 is moved to a position corresponding to the second area B1 in the optical disc 13. The seek time Tab related to this movement of the optical head 14 is equal to or shorter than 1.5 seconds. The optical head 14 transmits the second information signal "B" from the second area B1 in the optical disc 13 to the second area 19b of the track buffer memory 19 at the predetermined constant transfer rate Rp. Even after the degree of occupancy of the memory area 19a reaches the related full value, the first information signal "A" continues to be read out from the memory area 19a at the transfer rate Ra. Thus, during this stage, the degree of occupancy of the memory area 19a decreases at a rate corresponding to "Ra". The read-out of the first information signal "A" from the memory area 19a is completed before the optical head 14 accesses the first area A2 in the optical disc 13.

After the degree of occupancy of the second area 19b in the track buffer memory 19 reaches the related empty value, the second information signal "B" is read out from the memory area 19b at the transfer rate Rb and the second information signal "B" continues to be transmitted from the second area B1 in the optical disc 13 to the memory area 19b at the predetermined constant transfer rate Rp. Thus, during this stage, the degree of occupancy of the memory area 19b increases at a rate corresponding to "Rp–Rb".

When the degree of occupancy of the memory area 19b reaches the related full value, the transmission of the second information signal "B" from the second area B1 in the optical disc 13 to the memory area 19b is suspended. Then, the optical head 14 is moved to a position corresponding to the first area A2 in the optical disc 13. The seek time Tba related to this movement of the optical head 14 is equal to or shorter than 1.5 seconds. The optical head 14 transmits the first information signal "A" from the first area A2 in the optical disc 13 to the first area 19a of the track buffer memory 19 at the predetermined constant transfer rate Rp. Even after the degree of occupancy of the memory area 19b reaches the related full value, the second information signal "B" continues to be read out from the memory area 19b at the transfer rate Rb. Thus, during this stage, the degree of occupancy of the memory area 19b decreases at a rate corresponding to "Rb". The read-out of the second information signal "B" from the memory area 19b is completed before the optical head 14 accesses the second area B2 in the optical disc 13.

As previously indicated, the rate of the transfer of the first and second information signals "A" and "B" by the optical head 14 is denoted by "Rp" (Mbps). The rate of the transfer of the first information signal "A" from the track buffer memory 19 is denoted by "Ra" (Mbps). The rate of the transfer of the second information signal "B" from the track buffer memory 19 is denoted by "Rb" (Mbps). The minimum capacity of the track buffer memory 19 is denoted by "Ym" (Mbits). The size (the total number of bits) of the first information signal "A" recorded on each of the first areas A1, A2, A3, . . . in the optical disc 13 is denoted by "Ya" (Mbits). The size (the total number of bits) of the second information signal "B" recorded on each of the second areas B1, B2, B3, . . . in the optical disc 13 is denoted by "Yb" (Mbits). The seek time of movement of the optical head 14 from a first area 13a to a second area 13b in the optical disc 13 is denoted by "Tab" (s). The seek time of movement of the optical head 14 from a second area 13b to a first area 13a in the optical disc 13 is denoted by "Tba" (s).

The seek time Tab is equal to a first time interval plus a second time interval. The first time interval starts from the moment at which the optical head 14 reaches a reproduction end position and suspends the reproduction of the first information signal "A" from the first area 13a of the optical disc 13. The first time interval ends and the second time interval starts when the optical head 14 moves to the second area 13b of the optical disc 13. The second time interval continues until the optical head 14 starts reproducing the second information signal "B" from the second area 13b of the optical disc 13. During the second time interval, a target address of the second area 13b of the optical disc 13 is found, and preparations for the reproduction of the second information signal "B" therefrom have been made.

Similarly, the seek time Tba is equal to a first time interval plus a second time interval. The first time interval starts from the moment at which the optical head 14 reaches a reproduction end position and suspends the reproduction of the second information signal "B" from the second area 13b of the optical disc 13. The first time interval ends and the second time interval starts when the optical head 14 moves to the first area 13a of the optical disc 13. The second time interval continues until the optical head 14 starts reproducing the first information signal "A" from the first area 13a of the optical disc 13. During the second time interval, a target address of the first area 13a of the optical disc 13 is found, and preparations for the reproduction of the first information signal "A" therefrom have been made.

The mean value of the rate Ra of the transfer of the first information signal "A" from the first area 19a of the track buffer memory 19 plus the mean value of the rate Rb of the transfer of the second information signal "B" from the second area 19b of the track buffer memory 19 equals smaller than the rate Rp of the transfer of the first and second information signals "A" and "B" to the track buffer memory 19. Thus, the transfer rates Rp, Ra, and Rb are in the following relation.

$$Rp > Ra + Rb \tag{1}$$

The playback time Ta (S) for which the optical head 14 continuously reproduces the first information signal "A" from the optical disc 13 is given as follows.

$$Ta = Ya/Rp \tag{2}$$

The playback time Tb (S) for which the optical head 14 continuously reproduces the second information signal "B" from the optical disc 13 is given as follows.

$$Tb = Yb/Rp \tag{3}$$

Regarding the transfer rates Rp, Ra, and Rb, the following ratio is considered.

$$Rp/(Rp - Ra - Rb) \tag{4}$$

where "Rp" corresponds to a 1-cycle time during which the first and second information signals "A" and "B" are sequentially reproduced once, and "(Rp−Ra−Rb)" corresponds to a seek period in the 1-cycle time.

Regarding the times Ta, Tab, Tb, and Tba, the following ratio is considered.

$$(Ta + Tab + Tb + Tba)/(Tab + Tba) \tag{5}$$

where "(Ta+Tab+Tb+Tba)" corresponds to a 1-cycle time during which the first and second information signals "A" and "B" are sequentially reproduced once, and "(Tab+Tba)" corresponds to a total seek period in the 1-cycle time.

The ratio in the relation (4) and the ratio in the relation (5) are equal to each other, and the following equation is available.

$$Rp/(Rp - Ra - Rb) = (Ta + Tab + Tb + Tba)/(Tab + Tba) \tag{6}$$

The equation (6) is changed into the following version.

$$(Ta + Tb) = (Ra + Rb) \cdot (Tab + Tba)/(Rp - Ra - Rb) \tag{7}$$

Combining the equations (2) and (3) with the equation (7) results in the following equation.

$$(Ya + Yb) = Rp \cdot (Ra + Rb) \cdot (Tab + Tba)/(Rp - Ra - Rb) \tag{8}$$

The rate Rp of the transfer of the first and second information signals "A" and "B" from the optical disc 13 to the track buffer memory 19 is equal to the predetermined constant value. The rates Ra and Rb of the transfer of the first and second information signals "A" and "B" from the track buffer memory 19 are decided on the basis of the conditions of recording the first and second information signals "A" and "B" on the optical disc 13. The seek times Tab and Tba are decided according to the specifications of the apparatus 10A and the addresses on the optical disc 13. To implement continuous playback regarding both the first and second information signals "A" and "B", the size (the total number of bits) Ya of the first information signal "A" on each of the first areas 13a of the optical disc 13 and the size (the total number of bits) Yb of the second information signal "B" on each of the second areas 13b of the optical disc 13 are chosen to satisfy relations (9), (10), and (11) as follows.

$$(Ya+Yb) \geq Rp \cdot (Ra+Rb) \cdot (Tab+Tba)/(Rp-Ra-Rb) \quad (9)$$

$$Ya \geq Rp \cdot Ra \cdot (Tab+Tba)/(Rp-Ra-Rb) \quad (10)$$

$$Yb \geq Rp \cdot Rb \cdot (Tab+Tba)/(Rp-Ra-Rb) \quad (11)$$

During the two-signal playback mode of operation of the apparatus 10A, the first information signal "A" is continuously transferred from one of the first areas 13a of the optical disc 13 to the first area 19a of the track buffer memory 19 before the second information signal "B" is continuously transferred from one of the second areas 13b of the optical disc 13 to the second area 19b of the track buffer memory 19. The first and second information signals "A" and "B" are continuously transferred from the first and second areas 19a and 19b of the track buffer memory 19 to the audio-video encoding and decoding unit 20. To enable the audio-video encoding and decoding unit 20 to continuously recover the contents of the first and second information signals "A" and "B", the size (the total number of bits) Ya of the first information signal "A" on each of the first areas 13a of the optical disc 13 and the size (the total number of bits) Yb of the second information signal "B" on each of the second areas 13b of the optical disc 13 are chosen to satisfy the above-indicated relations (9), (10), and (11) while the relation among the transfer rates Ra and Rb and the seek times Tab and Tba is taken into consideration.

In addition, the maximum size of the track buffer memory 19, and the empty value and the full value related to each of the first and second areas 19a and 19b in the track buffer memory 19 are decided according to the relations (9), (10), and (11).

The minimum capacity Ym of the track buffer memory 19 satisfies one of the following relations (12) and (13).

$$Ym > (Tb+Tab+Tba) \cdot Ra + (Ta+Tab+Tba) \cdot Rb \quad (12)$$

$$Ym > Ta \cdot (Rp-Ra) + Tb \cdot (Rp-Rb) \quad (13)$$

Combining the equations and relations (2), (3), (10), and (11) with the relations (12) and (13) result in the following relation.

$$Ym > \{(Rp-Ra) \cdot Ra + (Rp-Rb) \cdot Rb\} \cdot (Tab+Tba)/(Rp-Ra-Rb) \quad (14)$$

The term "(Rp−Ra)·Ra·(Tab+Tba)/(Rp−Ra−Rb)" in the relation (14) means a first memory-size reference value for the first information signal "A". Similarly, the term "(Rp−Rb)·Rb·(Tab+Tba)/(Rp−Ra−Rb)" in the relation (14) means a second memory-size reference value for the second information signal "B". According to the relation (14), it is preferable that the size of the first area 19a of the track buffer memory 19 for the first information signal "A" is set greater than the first memory-size reference value, and that the related empty value and the related full value are decided in view of the setting of the size of the first memory area 19a. Similarly, it is preferable that the size of the second area 19b of the track buffer memory 19 for the second information signal "B" is set greater than the second memory-size reference value, and that the related empty value and the related full value are decided in view of the setting of the size of the second memory area 19b.

To provide a small margin for more reliably implementing continuous playback of the contents of the first and second information signals "A" and "B", the minimum capacity Ym of the track buffer memory 19 satisfies the following relation.

$$Ym > (Ta+Tb+Tab+Tba) \cdot (Ra+Rb) \quad (15)$$

In the case where the seek times Tab and Tba are set to a same fixed value T, the relation (15) is rewritten as follows.

$$Ym > (Ta+Tb+2T) \cdot (Ra+Rb) \quad (16)$$

To provide a system margin for allowing a retry process and a shock-proof memory function, it is preferable that the minimum capacity Ym of the track buffer memory 19 exceeds the value defined by the right-hand side of the relation (16).

Accordingly, it is more preferable that the size of the first area 19a of the track buffer memory 19 for the first information signal "A" is set greater than the value "(Ta+Tb+2T)·Ra", and that the related empty value and the related full value are decided in view of the setting of the size of the first memory area 19a. Similarly, it is more preferable that the size of the second area 19b of the track buffer memory 19 for the second information signal "B" is set greater than the value "(Ta+Tb+2T)·Rb", and that the related empty value and the related full value are decided in view of the setting of the size of the second memory area 19b.

Combining the equations (2) and (3) and the relation (9) with the relation (15) results in the following relation.

$$Ym > Rp \cdot (Ra+Rb) \cdot (Tab+Tba)/(Rp-Ra-Rb) \quad (17)$$

In the case where the seek times Tab and Tba are set to the same fixed value T, the relation (17) is rewritten as follows.

$$Ym > 2 \cdot Rp \cdot (Ra+Rb) \cdot T/(Rp-Ra-Rb) \quad (18)$$

To provide a system margin for allowing a retry process and a shock-proof memory function, it is preferable that the minimum capacity Ym of the track buffer memory 19 exceeds the value defined by the right-hand side of the relation (18).

Accordingly, it is more preferable that the size of the first area 19a of the track buffer memory 19 for the first information signal "A" is set greater than the value "Rp·Ra·(Tab+Tba)/(Rp−Ra−Rb)", and that the related empty value and the related full value are decided in view of the setting of the size of the first memory area 19a. Similarly, it is more preferable that the size of the second area 19b of the track buffer memory 19 for the second information signal "B" is set greater than the value "Rp·Rb·(Tab+Tba)/(Rp−Ra−Rb)", and that the related empty value and the related full value are decided in view of the setting of the size of the second memory area 19b.

It should be noted that a portion of the buffer memory 21 connected to the audio-video encoding and decoding unit 20 may be used as a track buffer memory substituting for the track buffer memory 19.

The track buffer memory 19 absorbs the differences between the predetermined constant transfer rate Rp and the transfer rates Ra and Rb, that is, the differences between the reproduced-signal transfer rate determined by the optical head 14 and the transfer rates related to the expansion-resultant information signals (the expansion-resultant audio-video signals). In a preferable way, two basic areas for the first information signal "A" and the second information signal "B" are provided in the track buffer memory 19, and the remaining area of the track buffer memory 19 is divided into two portions assigned to the first information signal "A" and the second information signal "B" respectively. The division-resultant two portions are referred to as additive areas. One basic area plus one additive area are assigned to the first information signal "A". Similarly, one basic area plus one additive area are assigned to the second information signal "B". The ratio in size between the additive areas is substantially equal to that between the basic areas. The additive areas provide margins to track buffers for the first and second information signals "A" and "B", respectively.

For example, the first area 19a and the second area 19b are provided in the track buffer memory 19 as follows. In the case where the transfer rate Ra for the first information signal "A" is set to 8 Mbps, a first basic area of 32 Mbits for the first information signal "A" is provided in the track buffer memory 19. In the case where the transfer rate Rb for the second information signal "B" is set to 4 Mbps, a second basic area of 16 Mbits for the second information signal "B" is provided in the track buffer memory 19. The remaining 16-Mbit area of the track buffer memory 19 is divided into a first portion (a first additive area) of about 10 Mbits and a second portion (a second additive area) of about 5 Mbits. The first basic area and the first additive area are combined into the first memory area 19a for the first information signal "A". The first memory area 19a has a size of about 42 Mbits. The second basic area and the second additive area are combined into the second memory area 19b for the second information signal "B". The second memory area 19b has a size of about 21 Mbits. This memory division enables the track buffer memory 19 to be efficiently used.

The system controller 22 provides the first and second areas 19a and 19b in the track buffer memory 19 in response to the two-signal-playback start command signal and the information of the transfer rates Ra and Rb. During a one-signal playback mode of operation of the apparatus 10A, the track buffer memory 19 is used as a non-partitioned 64-Mbit memory. Thus, during the one-signal playback mode of operation of the apparatus 10A, the playability including the retry performance can be enhanced. Preferably, the system controller 22 checks data in the track buffer memory 19 when receiving the two-signal-playback start command signal. The system controller 22 implements the division of the track buffer memory 19 into the first and second areas 19a and 19b after confirming the absence of data from the track buffer memory 19 which are being reproduced or recorded. During the two-signal playback mode of operation of the apparatus 10A, when the transfer rates Ra and Rb for the information signals "A" and "B" are changed, the system controller 22 checks data in the track buffer memory 19. In this case, the system controller 22 redivides the track buffer memory 19 after confirming the absence of data from the track buffer memory 19 which are being reproduced or recorded. Thus, the margins of the track buffer memory 19 remains optimized even when the transfer rates Ra and Rb for the information signals "A" and "B" are changed.

Preferably, the maximum values Tmax of the seek times Tab and Tba related to the optical head 14 are equal to each other. The maximum seek time Tmax is equal to, for example, 1.5 seconds. When the maximum seek time Tmax is used for the seek times Tab and Tba, the previously-indicated relation (9) is changed into the following version.

$$(Ya+Yb) \geq Rp \cdot (Ra+Rb) \cdot 2 \cdot Tmax/(Rp-Ra-Rb) \qquad (19)$$

When the maximum seek time Tmax is equal to 1.5 seconds, the relation (19) is rewritten as follows.

$$(Ya+Yb) \geq 3 \cdot Rp \cdot (Ra+Rb)/(Rp-Ra-Rb) \qquad (20)$$

Preferably, the size (the total number of bits) Ya of the first information signal "A" on each of the first areas 13a of the optical disc 13 and the size (the total number of bits) Yb of the second information signal "B" on each of the second areas 13b of the optical disc 13 are chosen to satisfy the relation (19) or (20).

Two-signal Recording Mode

Figure 8:
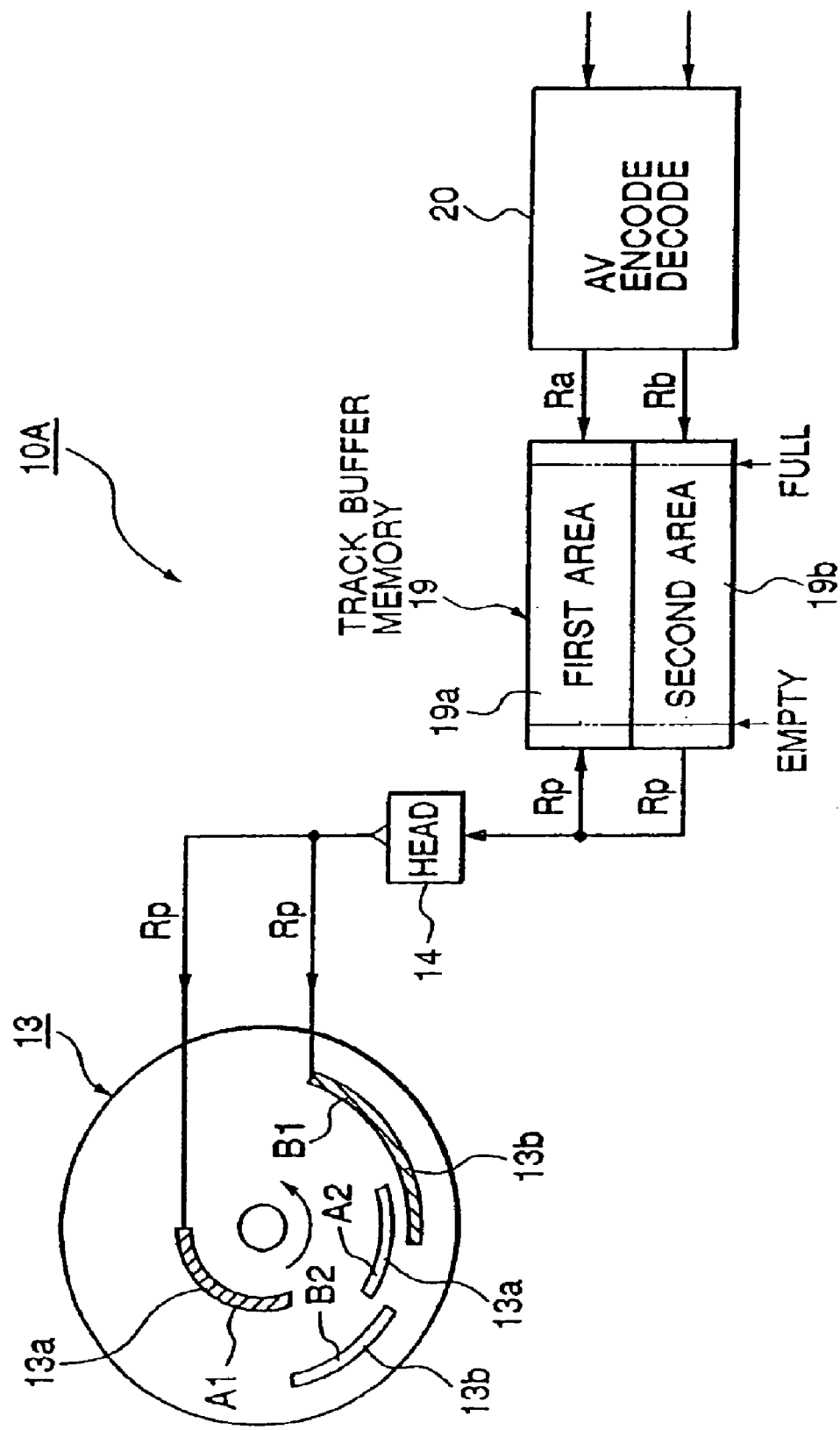
FIG. 8 is a diagram of a portion of the apparatus in FIG. 1 which is operating in a two-signal recording mode.

FIG. 8 shows a portion of the apparatus 10A which is operating in a two-signal recording mode. The amplifier unit 16 and the signal processor 18 are omitted from FIG. 8 for a better understanding. With reference to FIG. 8, the first information signal "A" is transmitted from the audio-video encoding and decoding unit 20 to the first area 19a in the track buffer memory 19 at the first transfer rate Ra. The second information signal "B" is transmitted from the audio-video encoding and decoding unit 20 to the second area 19b in the track buffer memory 19 at the second transfer rate Rb. Generally, the transmission of the first information signal "A" to the track buffer memory 19 and the transmission of the second information signal "B" to the track buffer memory 19 are implemented on a time sharing basis. The first information signal "A" is transmitted from the first area 19a in the track buffer memory 19 to the optical head 14 at the predetermined constant transfer rate Rp. The second information signal "B" is transmitted from the second area 19b in the track buffer memory 19 to the optical head 14 at the predetermined constant transfer rate Rp. The optical head 14 records the first information signal "A" and the second information signal "B" on the first area 13a and the second area 13b of the optical disc 13 respectively on a time sharing basis and at the predetermined constant transfer rate Rp. The predetermined constant transfer rate Rp is higher than the first and second transfer rates Ra and Rb.

The optical disc 13 is of the rewritable type. The optical disc 13 is previously provided with the first areas 13a for storing the respective blocks of the first information signal "A". In addition, the optical disc 13 is previously provided with the second areas 13b for storing the respective blocks of the second information signal "B". The second areas 13b are separate from the first areas 13a.

The first areas 13a in the optical disc 13 are given addresses A1, A2, A3, . . . , respectively (see FIG. 4). Thus, the first areas 13a are also referred to as the first areas A1, A2, A3, . . . . The blocks of the first information signal "A" are recorded on the first areas A1, A2, A3, . . . , respectively. Preferably, the size Ya of the blocks of the first information signal "A" is equal to the size of the first areas A1, A2, A3, . . . . The placement of the first areas 13a is designed to meet requirements for a seek time. The second areas 13b in the optical disc 13 are given addresses B1, B2, B3, . . . , respectively (see FIG. 5). Thus, the second areas 13b are also referred to as the second areas B1, B2, B3, . . . . The blocks of the second information signal "B" are recorded on the second areas B1, B2, B3, . . . , respectively. Preferably, the size Yb of the blocks of the second information signal "B" is equal to the size of the second areas B1, B2, B3, . . . . The placement of the second areas 13b is designed to meet the requirements for a seek time. First, a block of the first information signal "A" is recorded on the first area A1 (the first area 13a given the address A1). Second, a block of the second information signal "B" is recorded on the second area B1 (the second area 13b given the address B1). The first area A1 and the second area B1 are located relative to each other so that the optical head 14 can move therebetween in a predetermined time (equal to, for example, 1.5 seconds). Therefore, the maximum seek time during which the optical head 14 moves between the first area 13a and the second area 13b is equal to the predetermined time (for example, 1.5 seconds).

During the two-signal recording mode of operation of the apparatus 10A, the audio-video encoding and decoding unit 20 encodes original information signals into the first and second information signals "A" and "B" respectively. The first and second information signals "A" and "B" are transferred from the audio-video encoding and decoding unit 20 to the track buffer memory 19 at the rates Ra and Rb respectively. The rates Ra and Rb of the transfer of the first and second information signals "A" and "B" from the audio-video encoding and decoding unit 20 to the track buffer memory 19 can be selected from among different values according to user's operation of the key input unit 23 (see FIG. 1). The different values include a transfer rate of 8 Mbps which corresponds to a recording time of 2 hours and a high picture quality, a transfer rate of 4 Mbps which corresponds to a recording time of 4 hours and a slightly high picture quality, and a transfer rate of 2 Mbps which corresponds to a recording time of 8 hours and a normal picture quality. A transfer rate of 17 Mbps may be added to the candidate values. The first and second information signals "A" and "B" are temporarily stored in the first and second areas 19a and 19b of the track buffer memory 19. At an initial stage, the optical head 14 is in a stand-by state or a kick wait state while being located at a position corresponding to a target track on the optical disc 13. The system controller 22 always monitors the degree of occupancy of each of the first and second memory areas 19a and 19b which varies between the related empty value and the related full value under normal conditions. When the degrees of occupancy of the first and second memory areas 19a and 19b reach the related full values, the first and second information signals "A" and "B" start to be alternately read out from the first and second memory areas 19a and 19b on a time sharing basis and at the predetermined constant transfer rate Rp. The optical head 14 alternately records the read-out first information signal "A" and the read-out second information signal "B" on the first areas 13a and the second areas 13b of the optical disc 13 respectively on a time sharing basis and at the predetermined constant transfer rate Rp. In this way, the continuously and simultaneously recording of the original information signals is implemented.

Figure 9:
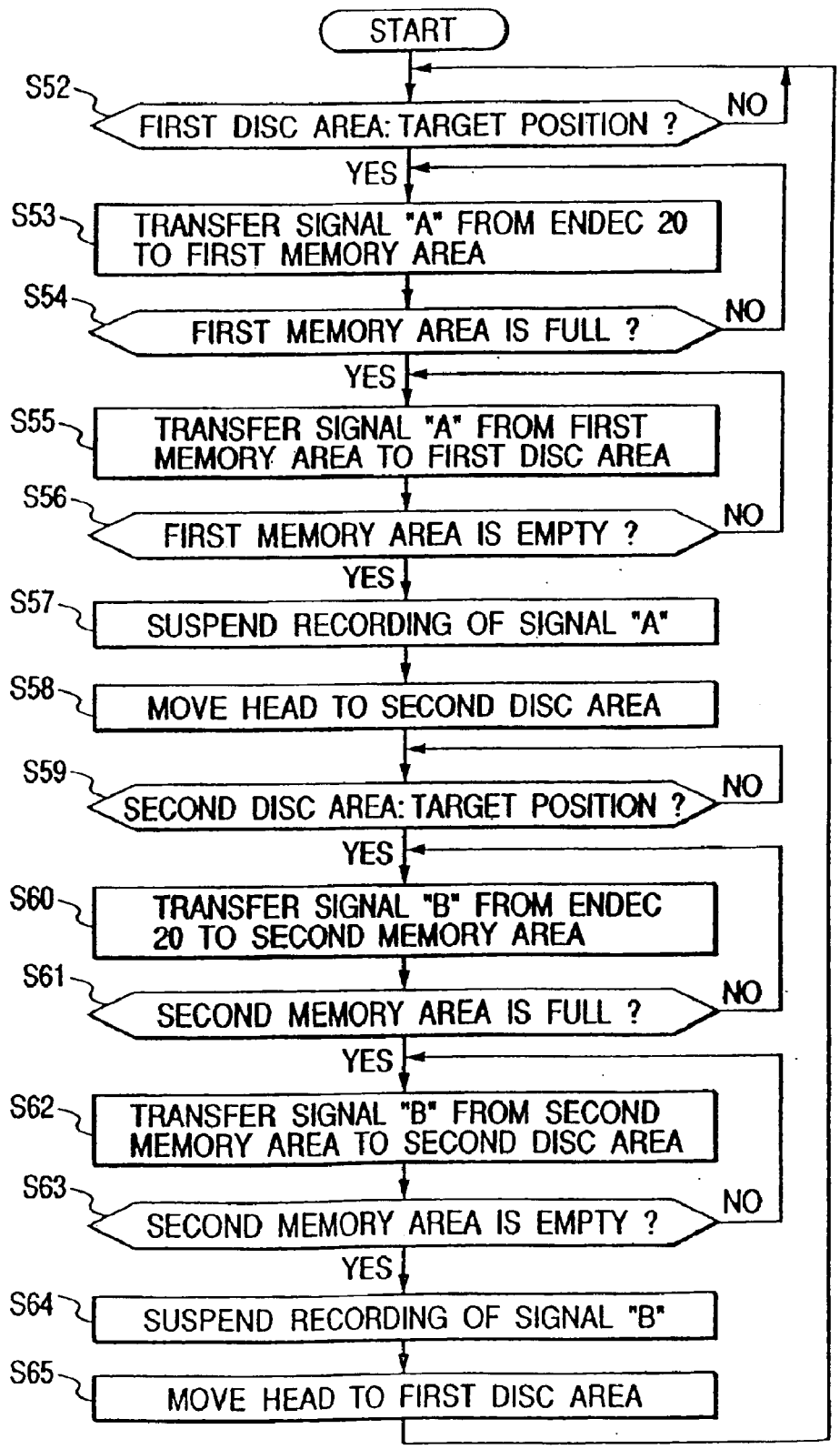
FIG. 9 is a flowchart of a segment of the program for the system controller in FIG. 1 which relates to the two-signal recording mode of operation.

The system controller 22 operates in accordance with the program stored in its internal ROM. FIG. 9 is a flowchart of a segment of the program which relates to the two-signal recording mode of operation of the apparatus 10A. The program segment in FIG. 9 is started in response to a two-signal-recording start command signal fed from the key input unit 23.

With reference to FIG. 9, a first step S52 of the program segment decides whether or not the optical head 14 has reached a target position on the optical disc 13. Initially, the target position corresponds to first one A1 of the first areas 13a in the optical disc 13. When the optical head 14 has not reached the target position yet, the step S52 is repeated. When the optical head 14 has reached the target position, the program advances from the step S52 to a step S53.

The step S53 stores the first information signal "A", which is outputted from the audio-video encoding and decoding unit 20, into the first area 19a in the track buffer memory 19 at the transfer rate Ra.

A step S54 following the step S53 decides whether or not the degree of occupancy of the first area 19a in the track buffer memory 19 has reached the related full value. When the degree of occupancy of the first area 19a in the track buffer memory 19 has not reached the related full value yet, the program returns from the step S54 to the step S53. When the degree of occupancy of the first area 19a in the track buffer memory 19 has reached the related full value, the program advances from the step S54 to a step S55.

The step S55 transfers the first information signal "A" from the first area 19a in the track buffer memory 19 to the optical head 14 at the predetermined constant transfer rate Rp. The step S55 enables the optical head 14 to record the first information signal "A" on the present first area 13a in the optical disc 13 at the predetermined constant transfer rate Rp.

A step S56 following the step S55 decides whether or not the degree of occupancy of the first area 19a in the track buffer memory 19 has reached the related empty value. When the degree of occupancy of the first area 19a in the track buffer memory 19 has not reached the related empty value yet, the program returns from the step S56 to the step S55. When the degree of occupancy of the first area 19a in the track buffer memory 19 has reached the related empty value, the program advances from the step S56 to a step S57.

The step S57 forces the optical head 14 to suspend the recording of the first information signal "A" on the present first area 13a in the optical disc 13.

A step S58 subsequent to the step S57 moves the optical head 14 toward a next target position. The next target position corresponds to, for example, first one B1 of the second areas 13b in the optical disc 13. After the step S58, the program advances to a step S59.

The step S59 decides whether or not the optical head 14 has reached the target position on the optical disc 13. When the optical head 14 has not reached the target position yet, the step S59 is repeated. When the optical head 14 has reached the target position, the program advances from the step S59 to a step S60.

In this way, the optical head 14 moves from the first area 13a to the second area 13b in the optical disc 13. The seek time Tab related to this movement of the optical head 14 is equal to 1.5 seconds or shorter.

The step S60 stores the second information signal "B", which is outputted from the audio-video encoding and decoding unit 20, into the second area 19b in the track buffer memory 19 at the transfer rate Rb.

A step S61 following the step S60 decides whether or not the degree of occupancy of the second area 19b in the track buffer memory 19 has reached the related full value. When the degree of occupancy of the second area 19b in the track buffer memory 19 has not reached the related full value yet, the program returns from the step S61 to the step S60. When the degree of occupancy of the second area 19b in the track buffer memory 19 has reached the related full value, the program advances from the step S61 to a step S62.

The step S62 transfers the second information signal "B" from the second area 19b in the track buffer memory 19 to the optical head 14 at the predetermined constant transfer rate Rp. The step S62 enables the optical head 14 to record the second information signal "B" on the present second area 13b in the optical disc 13 at the predetermined constant transfer rate Rp.

A step S63 following the step S62 decides whether or not the degree of occupancy of the second area 19b in the track buffer memory 19 has reached the related empty value. When the degree of occupancy of the second area 19b in the track buffer memory 19 has not reached the related empty value yet, the program returns from the step S63 to the step S62. When the degree of occupancy of the second area 19b in the track buffer memory 19 has reached the related empty value, the program advances from the step S63 to a step S64.

The step S64 forces the optical head 14 to suspend the recording of the second information signal "B" on the present second area 13b in the optical disc 13.

A step 865 subsequent to the step S64 moves the optical head 14 toward a next target position. The next target position corresponds to, for example, second one A2 of the first areas 13a in the optical disc 13. After the step S65, the program returns to the step S52.

Thus, the optical head 14 moves from the second area 13b to the first area 13a in the optical disc 13. The seek time Tba related to this movement of the optical head 14 is equal to 1.5 seconds or shorter.

During the repetitive execution of the program segment in FIG. 9, the target position of the optical head 14 is sequentially set into correspondence with the first and second areas A1, B1, A2, B2, A3, B3, . . . in the optical disc 13. Therefore, the optical head 14 alternately records the first information signal "A" and the second information signal "B" on the first and second areas 13a and 13b of the optical disc 13 in the order as "A1, B1, A2, B2, A3, B3, . . . ".

Preferably, the step S57 or the step S64 is followed by a step which decides whether or not both the recording of the first information signal "A" on the optical disc 13 and the recording of the second information signal "B" thereon are required to be suspended. In this case, when both the recording of the first information signal "A" on the optical disc 13 and the recording of the second information signal "B" thereon are required to be suspended, the optical head 14 is controlled to implement the required suspension of recording.

It is preferable to provide the optical disc 13 with a management area separate from the first and second areas 13a and 13b. For example, the management area extends in an innermost portion of the optical disc 13. After the recording of the first and second information signals "A" and "B" on the first and second areas 13a and 13b in the optical disc 13 has been completed, address information of the blocks of the first and second information signals "A" and "B" on the first and second areas 13a and 13b is recorded on the management area in the optical disc 13. Information of the first and second transfer rates Ra and Rb may also be recorded on the management area in the optical disc 13.

Figure 10:
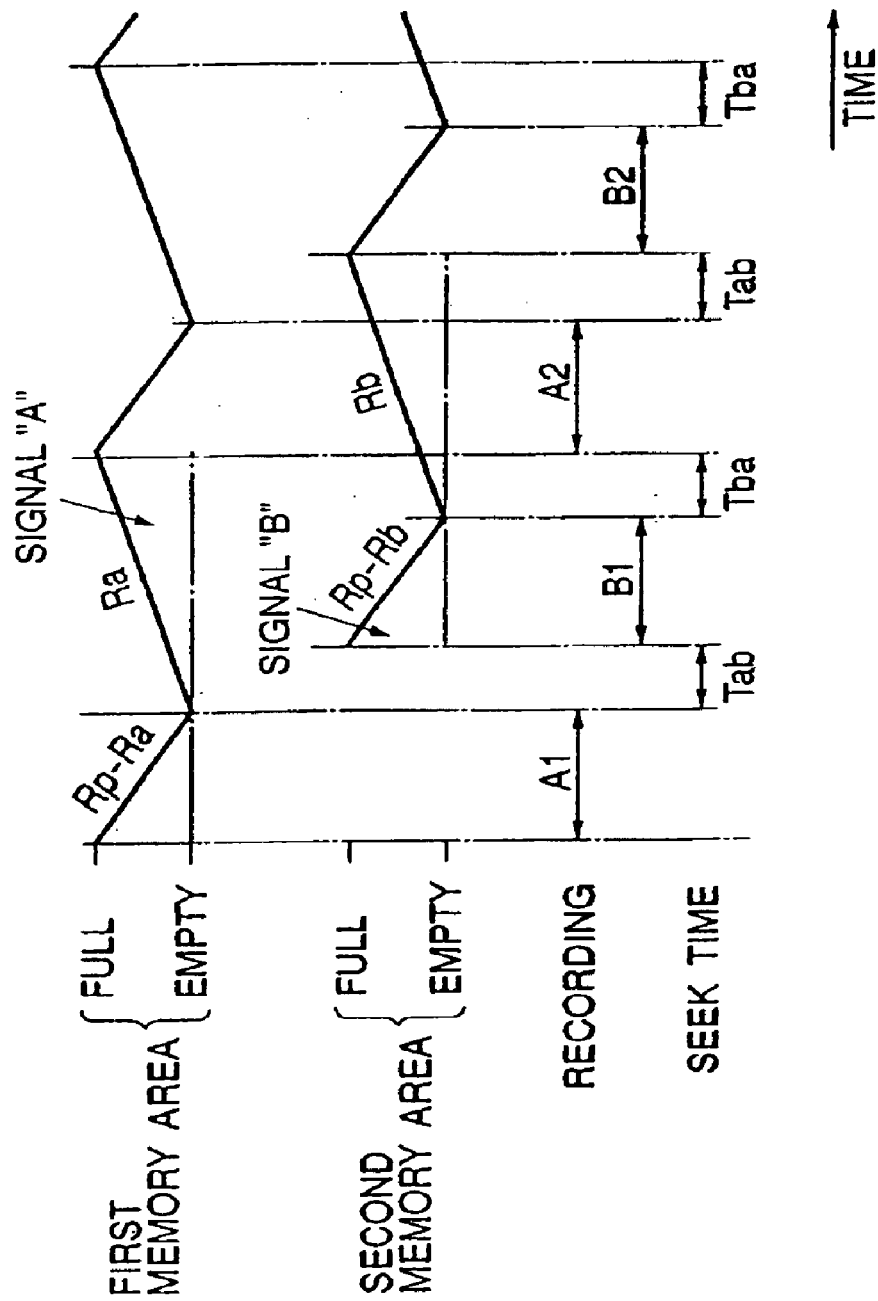
FIG. 10 is a time-domain diagram of the degrees of occupancy of the first and second areas in the track buffer memory in FIG. 1 which occur in the two-signal recording mode of operation.

With reference to FIG. 10, after the degree of occupancy of the first area 19a in the track buffer memory 19 reaches the related full value, the first information signal "A" is transmitted from the memory area 19a to the first area A1 in the optical disc 13 at the predetermined constant transfer rate Rp and the first information signal "A" is stored into the memory area 19a from the audio-video encoding and decoding unit 20 at the transfer rate Ra. Thus, during this stage, the degree of occupancy of the memory area 19a decreases at a rate corresponding to "Rp−Ra".

When the degree of occupancy of the memory area 19a reaches the related empty value, the transmission of the first information signal "A" from the memory area 19a to the first area A1 in the optical disc 13 is suspended. Then, the optical head 14 is moved to a position corresponding to the second area B1 in the optical disc 13. The seek time Tab related to this movement of the optical head 14 is equal to or shorter than 1.5 seconds. The second information signal "B" is stored into the second area 19b of the track buffer memory 19 from the audio-video encoding and decoding unit 20 at the transfer rate Rb. Even after the degree of occupancy of the memory area 19a reaches the related empty value, the first information signal "A" continues to be stored into the memory area 19a from the audio-video encoding and decoding unit 20 at the transfer rate Ra. Thus, during this stage, the degree of occupancy of the memory area 19a increases at a rate corresponding to "Ra". The degree of occupancy of the memory area 19a reaches the related full value before the optical head 14 accesses the first area A2 in the optical disc 13.

After the degree of occupancy of the second area 19b in the track buffer memory 19 reaches the related full value, the second information signal "B" is transmitted from the memory area 19b to the second area B1 in the optical disc 13 at the predetermined constant transfer rate Rp and the second information signal "B" continues to be stored into the memory area 19b from the audio-video encoding and decoding unit 20 at the transfer rate Rb. Thus, during this stage, the degree of occupancy of the memory area 19b decreases at a rate corresponding to "Rp−Rb".

When the degree of occupancy of the memory area 19b reaches the related empty value, the transmission of the second information signal "B" from the memory area 19b to the second area B1 in the optical disc 13 is suspended. Then, the optical head 14 is moved to a position corresponding to the first area A2 in the optical disc 13. The seek time Tba related to this movement of the optical head 14 is equal to or shorter than 1.5 seconds. Even after the degree of occupancy of the memory area 19b reaches the related empty value, the second information signal "B" continues to be stored into the memory area 19b from the audio-video encoding and decoding unit 20 at the transfer rate Rb. Thus, during this stage, the degree of occupancy of the memory area 19b increases at a rate corresponding to "Rb". The degree of occupancy of the memory area 19b reaches the related full value before the optical head 14 accesses the second area B2 in the optical disc 13.

Preferably, the transfer rate Ra, the transfer rate Rb, the size Ya of each block of the first information signal "A" on one first area 13a in the optical disc 13, the size Yb of each block of the second information signal "B" on one second area 13b in the optical disc 13, the seek time Tab related to the movement of the optical head 14 from the first area 13a to the second area 13b of the optical disc 13, the seek time Tba related to the movement of the optical head 14 from the second area 13b to the first area 13a of the optical disc 13, and the minimum capacity Ym of the track buffer memory 19 are chosen to satisfy the previously-indicated relations (1)–(18).

Signal Recording/Playback Mode

Figure 11:
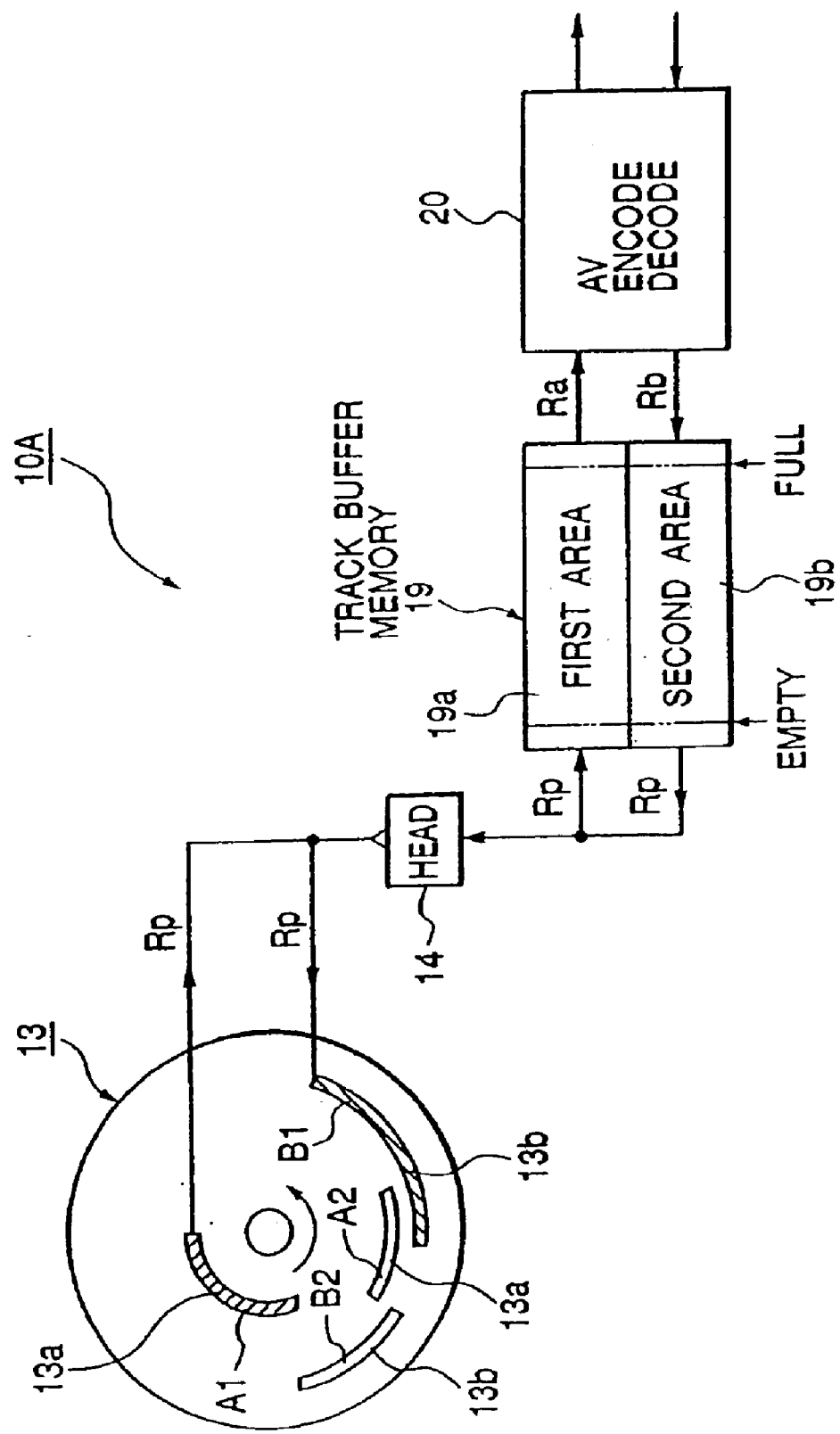
FIG. 11 is a diagram of a portion of the apparatus in FIG. 1 which is operating in a signal recording/playback mode.

FIG. 11 shows a portion of the apparatus 10A which is operating in a signal recording/playback mode. The amplifier unit 16 and the signal processor 18 are omitted from FIG. 11 for a better understanding. With reference to FIG. 11, the optical head 14 reproduces the first information signal "A" from the first areas 13a in the optical disc 13. The first information signal "A" is transmitted from the optical head 14 to the first area 19a of the track buffer memory 19 at the predetermined constant transfer rate Rp. The first information signal "A" is transmitted from the first area 19a of the track buffer memory 19 to the audio-video encoding and decoding unit 20 at the first transfer rate Ra. On the other hand, the second information signal "B" is transmitted from the audio-video encoding and decoding unit 20 to the second area 19b in the track buffer memory 19 at the second transfer rate Rb. The second information signal "B" is transmitted from the second area 19b in the track buffer memory 19 to the optical head 14 at the predetermined constant transfer rate Rp. The optical head 14 records the second information signal "B" on the second areas 13b in the optical disc 13. The optical head 14 alternately accesses the first and second areas 13a and 13b of the optical disc 13 on a time sharing basis so that the playback of the contents of the first information signal "A" and the recording of the contents of the second information signal "B" can be virtually simultaneously implemented.

The optical disc 13 is of the rewritable type. The optical disc 13 is previously provided with the first areas 13a for storing the first information signal "A". In addition, the optical disc 13 is previously provided with the second areas 13b for storing the second information signal "B". The second areas 13b are separate from the first areas 13a.

The first areas 13a in the optical disc 13 are given addresses A1, A2, A3, . . . , respectively (see FIG. 4). Thus, the first areas 13a are also referred to as the first areas A1, A2, A3, . . . . The blocks of the first information signal "A" are recorded on the first areas A1, A2, A3, . . . , respectively. Preferably, the size Ya of the blocks of the first information signal "A" is equal to the size of the first areas A1, A2, A3, . . . . The placement of the first areas 13a is designed to meet requirements for a seek time. The second areas 13b in the optical disc 13 are given addresses B1, B2, B3, . . . , respectively (see FIG. 5). Thus, the second areas 13b are also referred to as the second areas B1, B2, B3, . . . . The blocks of the second information signal "B" are recorded on the second areas B1, B2, B3, . . . , respectively. Preferably, the size Yb of the blocks of the second information signal "B" is equal to the size of the second areas B1, B2, B3, . . . . The placement of the second areas 13b is designed to meet the requirements for a seek time. First, a block of the information signal "A" is reproduced from the first area A1 (the first area 13a given the address A1). Second, a block of the information signal "B" is recorded on the second area B1 (the second area 13b given the address B1). The first area A1 and the second area B1 are located relative to each other so that the optical head 14 can move therebetween in a predetermined time (equal to, for example, 1.5 seconds). Therefore, the maximum seek time during which the optical head 14 moves between the first area 13a and the second area 13b is equal to the predetermined time (for example, 1.5 seconds).

Figure 12:
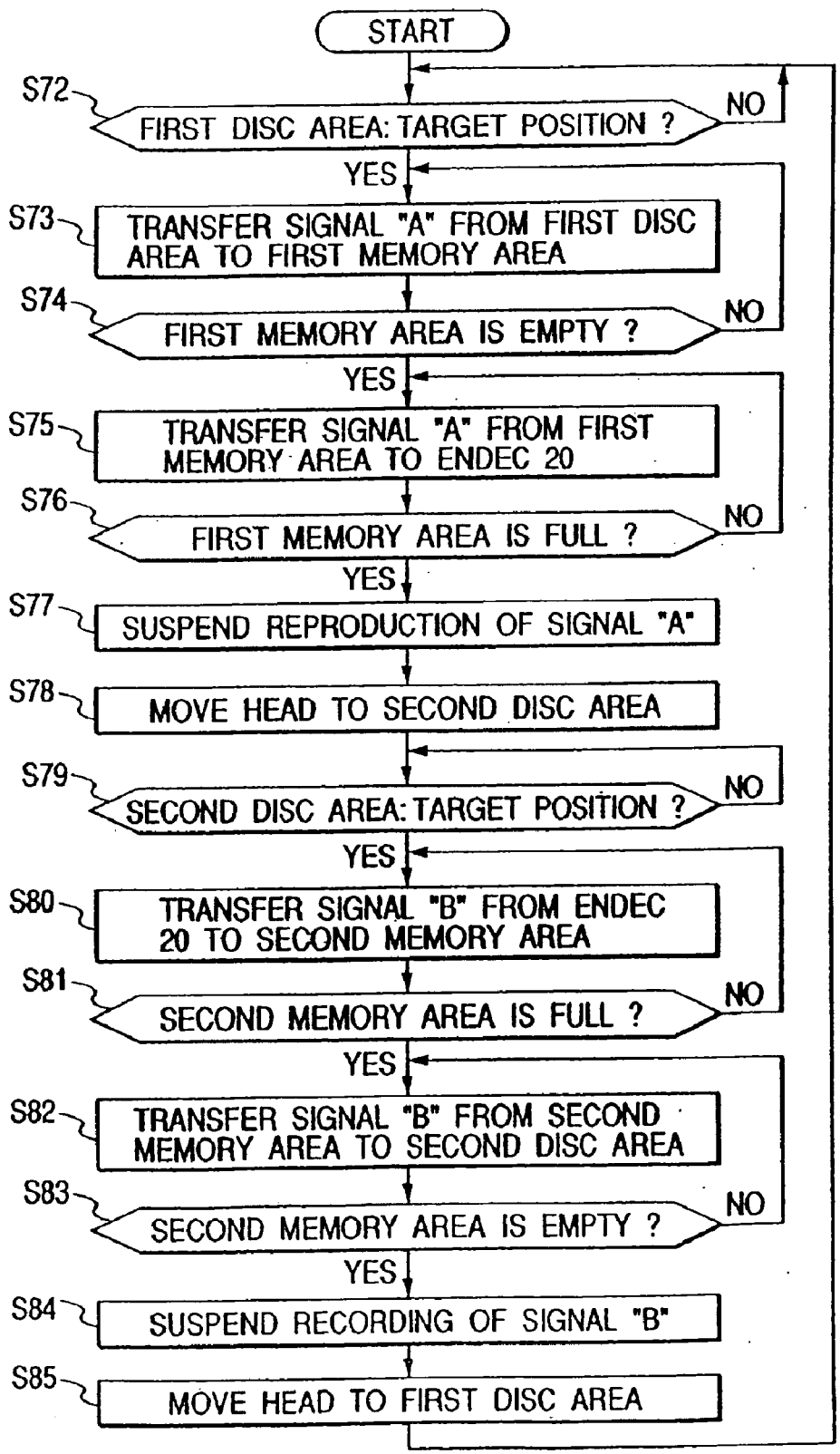
FIG. 12 is a flowchart of a segment of the program for the system controller in FIG. 1 which relates to the signal recording/playback mode of operation.

The system controller 22 operates in accordance with the program stored in its internal ROM. FIG. 12 is a flowchart of a segment of the program which relates to the signal recording/playback mode of operation of the apparatus 10A. The program segment in FIG. 12 is started in response to a signal-recording/playback start command signal fed from the key input unit 23.

With reference to FIG. 12, a first step S72 of the program segment decides whether or not the optical head 14 has reached a target position on the optical disc 13. Initially, the target position corresponds to first one A1 of the first areas 13a in the optical disc 13. When the optical head 14 has not reached the target position yet, the step S72 is repeated. When the optical head 14 has reached the target position, the program advances from the step S72 to a step S73.

The step S73 enables the optical head 14 to reproduce the first information signal "A" from the present first area 13a in the optical disc 13. The step S73 stores the reproduced first information signal "A" into the first area 19a in the track buffer memory 19 at the predetermined constant transfer rate Rp.

A step S74 following the step S73 decides whether or not the degree of occupancy of the first area 19a in the track buffer memory 19 has reached the related empty value. When the degree of occupancy of the first area 19a in the track buffer memory 19 has not reached the related empty value yet, the program returns from the step S74 to the step S73. When the degree of occupancy of the first area 19a in the track buffer memory 19 has reached the related empty value, the program advances from the step S74 to a step S75.

The step S75 transfers the first information signal "A" from the first area 19a in the track buffer memory 19 to the audio-video encoding and decoding unit 20 at the transfer rate Ra.

A step S76 following the step S75 decides whether or not the degree of occupancy of the first area 19a in the track buffer memory 19 has reached the related full value. When the degree of occupancy of the first area 19a in the track buffer memory 19 has not reached the related full value yet, the program returns from the step S76 to the step S75. When the degree of occupancy of the first area 19a in the track buffer memory 19 has reached the related full value, the program advances from the step S76 to a step S77.

The step S77 forces the optical head 14 to suspend the reproduction of the first information signal "A" from the present first area 13a in the optical disc 13.

A step S78 subsequent to the step S77 moves the optical head 14 toward a next target position. The next target position corresponds to, for example, first one B1 of the second areas 13b in the optical disc 13. After the step S78, the program advances to a step S79.

The step S79 decides whether or not the optical head 14 has reached the target position on the optical disc 13. When the optical head 14 has not reached the target position yet, the step S79 is repeated. When the optical head 14 has reached the target position, the program advances from the step S79 to a step S80.

In this way, the optical head 14 moves from the first area 13a to the second area 13b. The seek time Tab related to this movement of the optical head 14 is equal to 1.5 seconds or shorter.

The step S80 stores the second information signal "B", which is outputted from the audio-video encoding and decoding unit 20, into the second area 19b in the track buffer memory 19 at the transfer rate Rb.

A step S81 following the step S80 decides whether or not the degree of occupancy of the second area 19b in the track buffer memory 19 has reached the related full value. When the degree of occupancy of the second area 19b in the track buffer memory 19 has not reached the related full value yet, the program returns from the step S81 to the step S80. When the degree of occupancy of the second area 19b in the track buffer memory 19 has reached the related full value, the program advances from the step S81 to a step S82.

The step S82 transfers the second information signal "B" from the second area 19b in the track buffer memory 19 to the optical head 14 at the predetermined constant transfer rate Rp. The step S82 enables the optical head 14 to record the second information signal "B" on the present second area 13b in the optical disc 13 at the predetermined constant transfer rate Rp.

A step S83 following the step S82 decides whether or not the degree of occupancy of the second area 19b in the track buffer memory 19 has reached the related empty value. When the degree of occupancy of the second area 19b in the track buffer memory 19 has not reached the related empty value yet, the program returns from the step S83 to the step S82. When the degree of occupancy of the second area 19b in the track buffer memory 19 has reached the related empty value, the program advances from the step S83 to a step S84.

The step S84 forces the optical head 14 to suspend the recording of the second information signal "B" on the present second area 13b in the optical disc 13.

A step S85 subsequent to the step S84 moves the optical head 14 toward a next target position. The next target position corresponds to, for example, second one A2 of the first areas 13a in the optical disc 13. After the step S85, the program returns to the step S72.

Thus, the optical head 14 moves from the second area 13b to the first area 13a. The seek time Tba related to this movement of the optical head 14 is equal to 1.5 seconds or shorter.

During the repetitive execution of the program segment in FIG. 12, the target position of the optical head 14 is sequentially set into correspondence with the first and second areas A1, B1, A2, B2, A3, B3, . . . in the optical disc 13. Therefore, the optical head 14 alternately reproduces the first information signal "A" and records the second information signal "B" while accessing the first and second areas 13a and 13b of the optical disc 13 in the order as "A1, B1, A2, B2, A3, B3, . . . ".

Preferably, the step S77 or the step S84 is followed by a step which decides whether or not both the reproduction of the first information signal "A" from the optical disc 13 and the recording of the second information signal "B" thereon are required to be suspended. In this case, when both the reproduction of the first information signal "A" from the optical disc 13 and the recording of the second information signal "B" thereon are required to be suspended, the optical head 14 is controlled to implement the required suspension of reproduction and recording.

It is preferable to provide the optical disc 13 with a management area separate from the first and second areas 13a and 13b. For example, the management area extends in an innermost portion of the optical disc 13. After the recording of the second information signal "B" on the second areas 13b in the optical disc 13 has been completed, address information of the blocks of the second information signal "B" on the second areas 13b is recorded on the management area in the optical disc 13. Information of the second transfer rate Rb may also be recorded on the management area in the optical disc 13.

Figure 13:
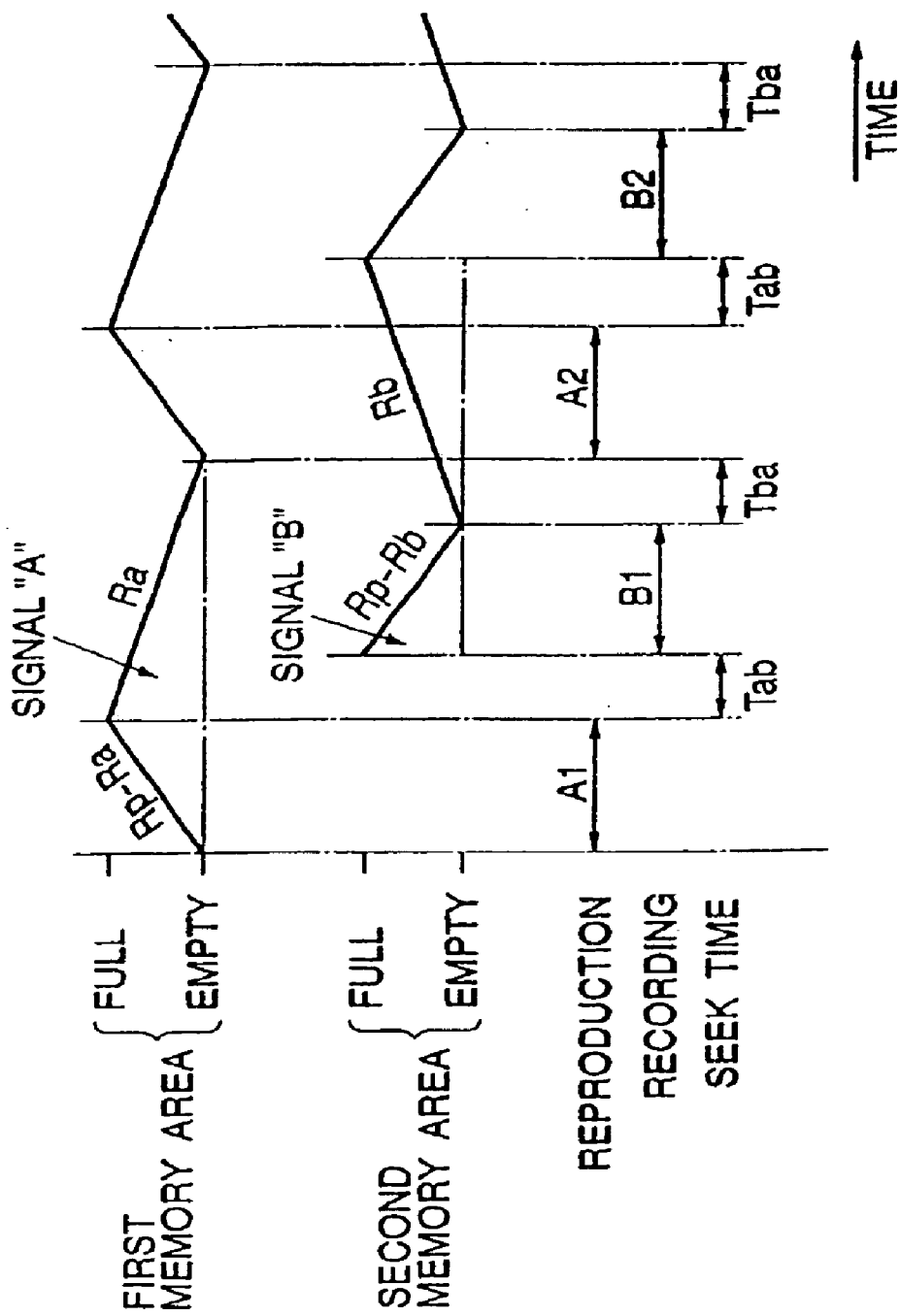
FIG. 13 is a time-domain diagram of the degrees of occupancy of the first and second areas in the track buffer memory in FIG. 1 which occur in the signal recording/playback mode of operation.

With reference to FIG. 13, after the degree of occupancy of the first area 19a in the track buffer memory 19 reaches the related empty value, the first information signal "A" is read out from the memory area 19a at the transfer rate Ra and the first information signal "A" is transmitted from the first area A1 in the optical disc 13 to the memory area 19a at the predetermined constant transfer rate Rp. Thus, during this stage, the degree of occupancy of the memory area 19a increases at a rate corresponding to "Rp−Ra".

When the degree of occupancy of the memory area 19a reaches the related full value, the transmission of the first information signal "A" from the first area A1 in the optical disc 13 to the memory area 19a is suspended. Then, the optical head 14 is moved to a position corresponding to the second area B1 in the optical disc 13. The seek time Tab related to this movement of the optical head 14 is equal to or shorter than 1.5 seconds. Even after the degree of occupancy of the memory area 19a reaches the related full value, the first information signal "A" continues to be read out from the memory area 19a at the transfer rate Ra. Thus, during this stage, the degree of occupancy of the memory area 19a decreases at a rate corresponding to "Ra". The read-out of the first information signal "A" from the memory area 19a is completed before the optical head 14 accesses the first area A2 in the optical disc 13.

The second information signal "B" is stored into the second area 19b of the track buffer memory 19 from the audio-video encoding and decoding unit 20 at the transfer rate Rb. After the degree of occupancy of the second area 19b in the track buffer memory 19 reaches the related full value, the second information signal "B" is transmitted from the memory area 19b to the second area B1 in the optical disc 13 at the predetermined constant transfer rate Rp and the second information signal "B" continues to be stored into the memory area 19b from the audio-video encoding and decoding unit 20 at the transfer rate Rb. Thus, during this stage, the degree of occupancy of the memory area 19b decreases at a rate corresponding to "Rp−Rb".

When the degree of occupancy of the memory area 19b reaches the related empty value, the transmission of the second information signal "B" from the memory area 19b to the second area B1 in the optical disc 13 is suspended. Then, the optical head 14 is moved to a position corresponding to the first area A2 in the optical disc 13. The seek time Tba related to this movement of the optical head 14 is equal to or shorter than 1.5 seconds. Even after the degree of occupancy of the memory area 19b reaches the related empty value, the second information signal "B" continues to be stored into the memory area 19b from the audio-video encoding and decoding unit 20 at the transfer rate Rb. Thus, during this stage, the degree of occupancy of the memory area 19b increases at a rate corresponding to "Rb". The degree of occupancy of the memory area 19b reaches the related full value before the optical head 14 accesses the second area B2 in the optical disc 13.

Preferably, the transfer rate Ra, the transfer rate Rb, the size Ya of each block of the first information signal "A" on one first area 13a in the optical disc 13, the size Yb of each block of the second information signal "B" on one second area 13b in the optical disc 13, the seek time Tab related to the movement of the optical head 14 from the first area 13a to the second area 13b of the optical disc 13, the seek time Tba related to the movement of the optical head 14 from the second area 13b to the first area 13a of the optical disc 13, and the minimum capacity Ym of the track buffer memory 19 are chosen to satisfy the previously-indicated relations (1)–(18).

In the case where a second information signal "B" is required to be recorded during the playback of a first information signal "A", the second information signal "B" is inputted into the apparatus 10A and the transfer rate Rb for the second information signal "B" is set in accordance with user's selection. At this time, the system controller 22 decides the size Yb of blocks of the second information signal "B" on the basis of the transfer rate Rb, the transfer rate Ra, the seek times, and information of usable areas in the optical disc 13 according to the previously-indicated relations (9), (10), and (11). If the sizes of all the usable areas in the optical disc 13 are smaller than the block size Yb of the second information signal "B", the transfer rate Rb is reduced from the designated value. Preferably, the user is informed of the reduction in the transfer rate Rb. The recording of the second information signal "B" is implemented while the reduced transfer rate Rb is used.

It should be noted that the optical disc 13 may be replaced by a magnetic disc or a plurality of magnetic discs. In this case, the optical-disc drive portion of the apparatus 10A in FIG. 1 is replaced by a magnetic-disc drive portion.

A first example of the magnetic-disc drive portion includes a plurality of magnetic heads for accessing magnetic discs each having a spiral track. The magnetic heads and the magnetic discs are periodically changed and selected to record and reproduce information signals on and from the magnetic discs. Each magnetic disc may have a plurality of concentric tracks.

Second Embodiment

Figure 14:
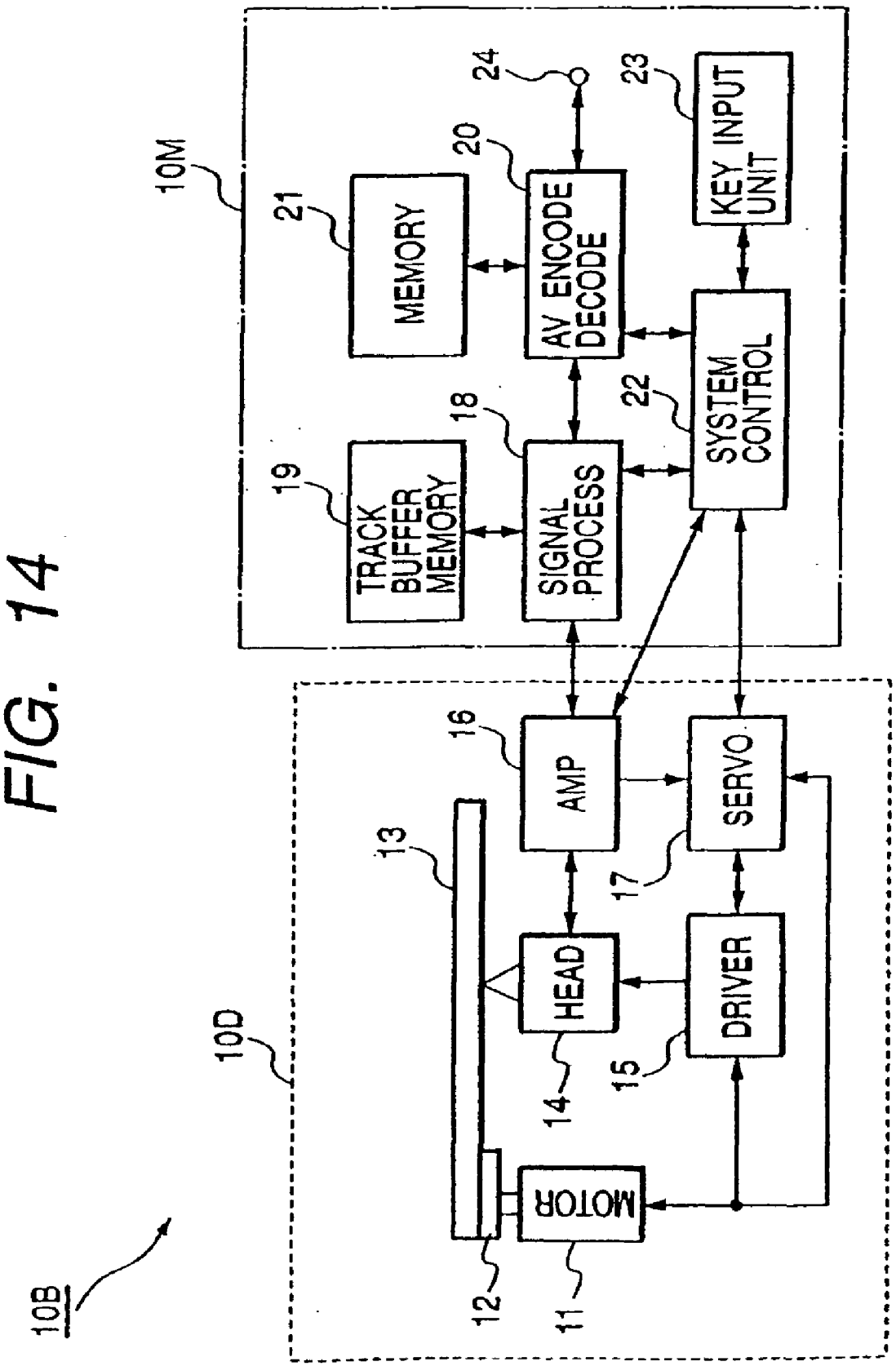
FIG. 14 is a block diagram of an information-signal recording and reproducing apparatus according to a second embodiment of this invention.

FIG. 14 shows an information-signal recording and reproducing apparatus 10B according to a second embodiment of this invention. The apparatus 10B in FIG. 14 is similar to the apparatus 10A in FIG. 1 except for the following design change.

The apparatus 10B in FIG. 14 includes an optical disc drive 10D and a solid-state memory unit 10M. The solid-state memory unit 10M is detachably connected with the optical disc drive 10D. Specifically, the solid-state memory unit 10M is connected with the optical disc drive 10D via a disconnectable connector.

The optical disc drive 10D includes a spindle motor 11, a turntable 12, an optical head (an optical pickup) 14, a driver 15, an amplifier unit 16, and a servo unit 17. The solid-state memory unit 10M includes a signal processor 18, a track buffer memory 19, an audio-video encoding and decoding unit 20, a memory 21, a system controller 22, a key input unit 23, and an input/output terminal 24.

When the solid-state memory unit 10M is connected with the optical disc drive 10D, the apparatus 10B in FIG. 14 operates similarly to the apparatus 10A in FIG. 1. On the other hand, when the solid-state memory unit 10M is disconnected from the optical disc drive 10D, at least one of first and second information signals "A" and "B" in the track buffer memory 19 or the memory 21 can be played back via the signal processor 18 and the audio-video encoding and decoding unit 20.

Third Embodiment

Figure 15:
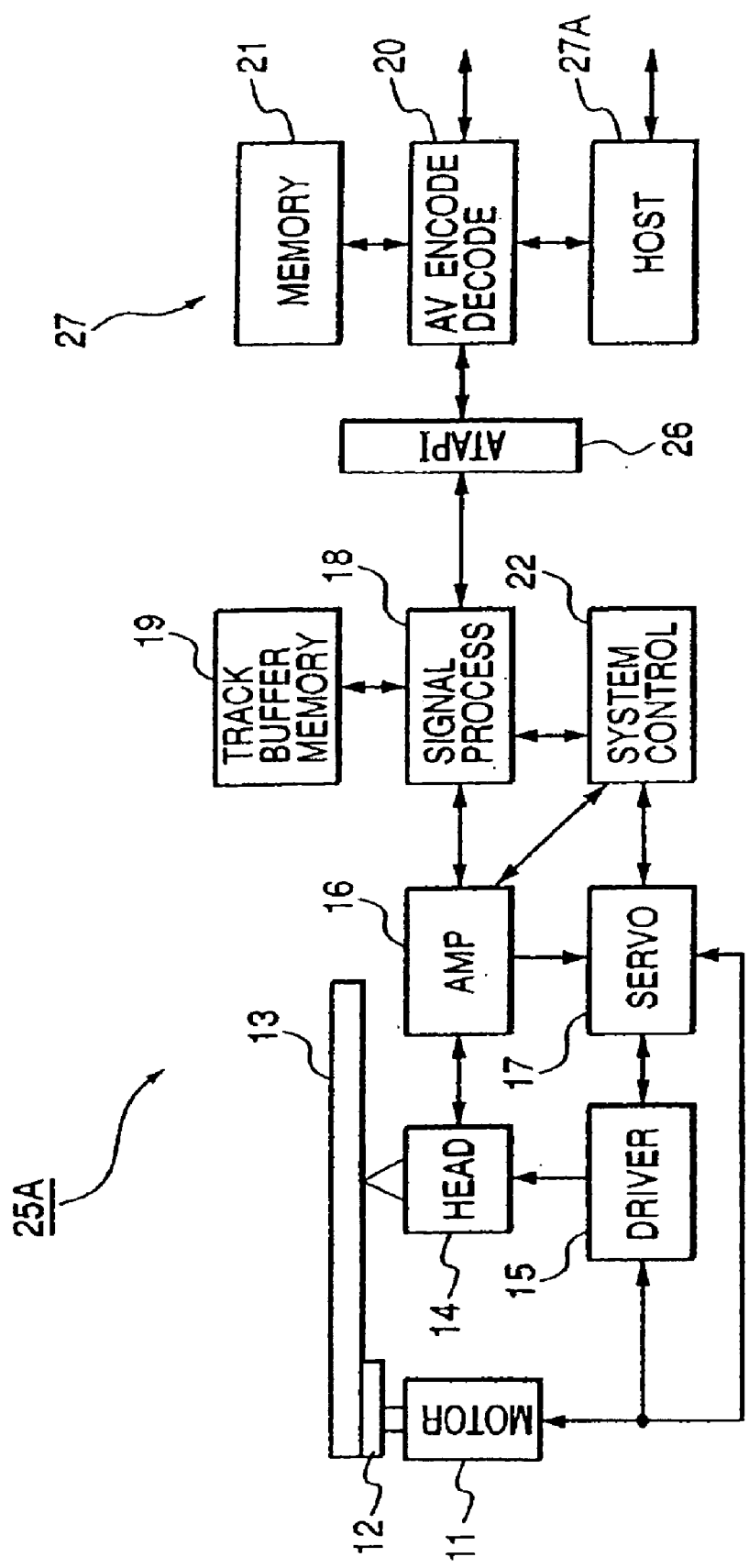
FIG. 15 is a block diagram of an information-signal communication apparatus according to a third embodiment of this invention.

FIG. 15 shows an information-signal communication apparatus 25A according to a third embodiment of this invention. The apparatus 25A in FIG. 15 is similar to the apparatus 10A in FIG. 1 except for design changes indicated hereinafter.

The apparatus 25A in FIG. 15 includes a spindle motor 11, a turntable 12, an optical head (an optical pickup) 14, a driver 15, an amplifier unit 16, a servo unit 17, a signal processor 18, a track buffer memory 19, and a system controller 22. The devices 11, 12, 14, 15, 16, 17, 18, 19, and 22 are connected in a manner similar to that in the apparatus 10A in FIG. 1. The apparatus 25A in FIG. 15 further includes an ATAPI (AT attachment packet interface) unit 26, that is, an interface 26 of an ATAPI type. The interface 26 is connected to the signal processor 18.

A host computer or an external apparatus 27 can be connected with the apparatus 25A in FIG. 15 via the interface 26. The external apparatus 27 includes an audio-video encoding and decoding unit 20, a memory 21, and a host computer unit 27A. The memory 21 and the host computer unit 27A are connected to the audio-video encoding and decoding unit 20. The audio-video encoding and decoding unit 20 can be connected with the signal processor 18 in the apparatus 25A via the interface 26.

In more detail, the ATAPI unit 26 includes an interface block. The audio-video encoding and decoding unit 20 includes an interface block which can be connected with the interface block in the ATAPI unit 26. The apparatus 27 can control the apparatus 25A while using control signals in the Mt. Fuji command system.

In the case where first and second information signals "A" and "B" are required to be recorded, the host computer unit 27A in the apparatus 27 transmits information of transfer rates Ra and Rb for the first and second information signals "A" and "B" (transfer-rate representing flags) to the apparatus 25A via the audio-video encoding and decoding unit 20 and the interface 26. The audio-video encoding and decoding unit 20 in the apparatus 27 transmits the first and second information signals "A" and "B" to the signal processor 18 in the apparatus 25A via the interface 26. In addition, the host computer unit 27A in the apparatus 27 transmits a recording start command signal and a recording start address signal to the apparatus 25A via the audio-video encoding and decoding unit 20 and the interface 26.

In the case where first and second information signals "A" and "B" are required to be reproduced from an optical disc 13, the host computer unit 27A in the apparatus 27 transmits a playback start command signal and a disc address signal to the apparatus 25A via the audio-video encoding and decoding unit 20 and the interface 26. The apparatus 25A reproduces a signal (for example, control data or management information) from a portion of the optical disc 13 whose position is designated by the disc address signal. The host computer unit 27A in the apparatus 27 receives the reproduced signal from the apparatus 25A via the interface 26 and the audio-video encoding and decoding unit 20, and calculates transfer rates Ra and Rb on the basis of the reproduced signal. The host computer unit 27A in the apparatus 27 transmits information of the calculated transfer rates Ra and Rb (transfer-rate representing flags) to the apparatus 25A via the audio-video encoding and decoding unit 20 and the interface 26. Then, the apparatus 25A reproduces the first and second information signals "A" and "B" while using the transfer rates Ra and Rb.

The interface 26 may be of an IEEE1394 type rather than the ATAPI type. The interface 26 may be of a wireless type using a radio signal or a light signal.

Fourth Embodiment

Figure 16:
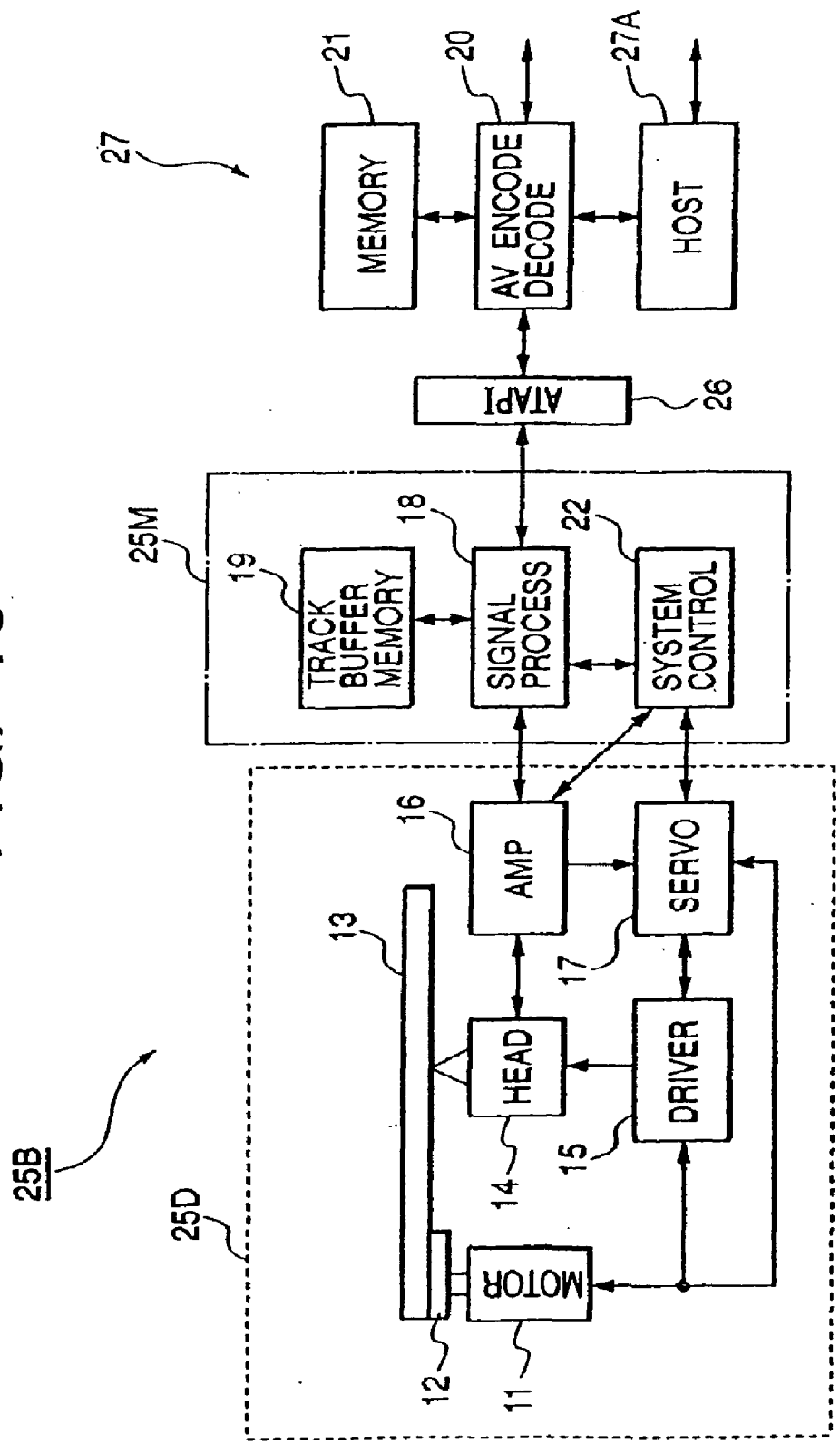
FIG. 16 is a block diagram of an information-signal communication apparatus according to a fourth embodiment of this invention.

FIG. 16 shows an information-signal communication apparatus 25B according to a fourth embodiment of this invention. The apparatus 25B in FIG. 16 is similar to the apparatus 25A in FIG. 15 except for the following design change.

The apparatus 25B in FIG. 16 includes an optical disc drive 25D and a solid-state memory unit 25M. The solid-state memory unit 25M is detachably connected with the optical disc drive 25D and an interface 26. Specifically, the solid-state memory unit 25M is connected with the optical disc drive 25D and the interface 26 via disconnectable connectors.

The optical disc drive 25D includes a spindle motor 11, a turntable 12, an optical head (an optical pickup) 14, a driver 15, an amplifier unit 16, and a servo unit 17. The solid-state memory unit 25M includes a signal processor 18, a track buffer memory 19, and a system controller 22. The signal processor 18 can be connected with the interface 26.

A host computer or an external apparatus 27 can be connected with the signal processor 18 in the solid-state memory unit 25M via the interface 26. The external apparatus 27 includes an audio-video encoding and decoding unit 20, a memory 21, and a host computer unit 27A. The memory 21 and the host computer unit 27A are connected to the audio-video encoding and decoding unit 20. The audio-video encoding and decoding unit 20 can be connected with the signal processor 18 in the apparatus 25A via the interface 26.

When the solid-state memory unit 25M is connected with the optical disc drive 25D and the interface 26, the apparatus 25B in FIG. 16 operates similarly to the apparatus 25A in FIG. 15. On the other hand, when the solid-state memory unit 25M is disconnected from the optical disc drive 25D and the interface 26, at least one of first and second information signals "A" and "B" in the track buffer memory 19 can be played back via the signal processor 18.

Fifth Embodiment

Figure 17:
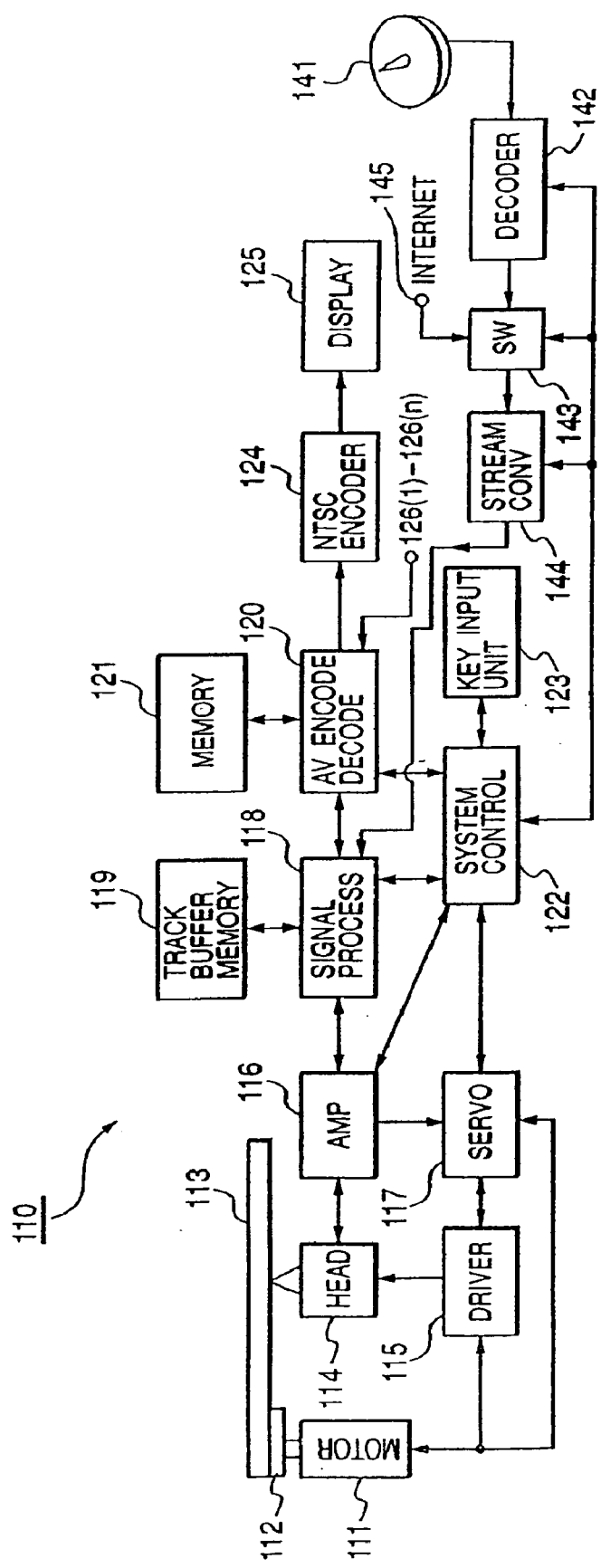
FIG. 17 is a block diagram of an information-signal recording and reproducing apparatus according to a fifth embodiment of this invention.

FIG. 17 shows an information-signal recording and reproducing apparatus 110 according to a fifth embodiment of this invention. The apparatus 110 operates on an information-signal recording medium including an optical disc. Examples of the optical disc are a DVD-ROM, a DVD-RAM, a DVD–RW, and a DVD+RW. Alternatively, the information recording medium may include a magnetic disc such as a hard disc or a floppy disc. The information recording medium may include a semiconductor memory.

As shown in FIG. 17, the apparatus 110 includes a spindle motor 111, and a turntable 112 connected to the shaft of the spindle motor 111. An optical disc (an information-signal recording medium) 113 can be placed on the turntable 112. The apparatus 110 further includes an optical head (an optical pickup) 114, a driver 115, an amplifier unit 116, a servo unit 117, a signal processor 118, a track buffer memory 119, an audio-video encoding and decoding unit 120, a memory 121, a system controller 122, a key input unit 123, an NTSC encoder 124, a display 125, and input terminals 126(1), 126(2), . . . , and 126(n). Here, "n" denotes a predetermined natural number equal to or greater than 2. In addition, the apparatus 110 includes a satellite digital broadcasting reception antenna 141, a satellite digital broadcasting decoder 142, a switch 143, a stream converter 144, and a terminal 145.

When the optical disc 113 is placed on the turntable 112, the spindle motor 111 rotates the turntable 112 and the optical disc 113. In the case where the optical disc 113 is of a rewritable type, the optical head 114 writes and reads information thereon and therefrom. In the case where the optical disc 113 is designed exclusively for playback, the optical head 114 only reads information therefrom. The spindle motor 111 is connected to the driver 115 and the servo unit 117. The optical head 114 is connected to the amplifier unit 116 and the driver 115. The amplifier unit 116 is connected to the servo unit 117 and the signal processor 118. The driver 115 is connected to the servo unit 117. The signal processor 118 is connected to the track buffer memory 119 and the audio-video encoding and decoding unit 120. The audio-video encoding and decoding unit 120 is connected to the memory 121 and the input terminals 126(1)–126(n). The system controller 122 is connected to the amplifier unit 116, the servo unit 117, the signal processor 118, the audio-video encoding and decoding unit 120, and the key input unit 123.

The NTSC encoder 124 is connected to the audio-video encoding and decoding unit 120. The display 125 is connected to the NTSC encoder 124. The satellite digital broadcasting reception antenna 141 is connected to the satellite digital broadcasting decoder 142. The satellite digital broadcasting decoder 142 is connected to the switch 143. The switch 143 is connected to the stream converter 144. The switch 143 is connected to the Internet via the terminal 145. The stream converter 144 is connected to the signal processor 118. The satellite digital broadcasting decoder 142, the switch 143, the stream converter 144, and the system controller 122 are connected to each other.

The spindle motor 111 is driven and controlled by the driver 115. The spindle motor 111 rotates the turntable 112 and the optical disc 113. The spindle motor 111 is provided with an FG generator and a rotational position sensor (an angular position sensor). The rotational position sensor includes, for example, a Hall element. The FG generator outputs an FG signal (a rotational speed signal). The Hall element outputs a rotational position signal. The FG signal and the rotational position signal are fed back to the driver 115 and the servo unit 117 as rotation servo signals.

The optical head 114 faces the optical disc 113 placed on the turntable 112. A feed motor (not shown) moves the optical head 114 radially with respect to the optical disc 113. The feed motor is driven by the driver 115. The optical head 114 includes a semiconductor laser, a collimator lens, and an objective lens. The semiconductor laser acts as a source for emitting a light beam (a laser beam). The emitted laser beam is focused into a laser spot on the optical disc 113 by the collimator lens and the objective lens. The optical head 114 includes a 2-axis actuator for driving the objective lens to implement focusing and tracking of the laser spot with respect to the optical disc 113. The semiconductor laser is driven by a laser drive circuit in the optical head 114. In the case where an information signal such as an audio signal or an audio-video signal is recorded, the information signal is subjected to waveform correction by a waveform correction circuit in the amplifier unit 116 before being fed to the laser drive circuit. The 2-axis actuator is driven by the driver 115.

The key input unit 123 includes a plurality of keys which can be operated by a user. The key input unit 123 generates command signals in accordance with its operation by the user. The command signals are transmitted from the key input unit 123 to the system controller 122. The command signals include a command signal for starting a recording mode of operation of the apparatus 110, and a command signal for starting a playback mode of operation of the apparatus 110. The key input unit 123 generates control data in accordance with its operation by the user. The control data are transmitted from the key input unit 123 to the system controller 122.

The system controller 122 includes, for example, a microcomputer or a similar device which operates in accordance with a program stored in its internal ROM. The system controller 122 controls the amplifier unit 116, the servo unit 117, the signal processor 118, and the audio-video encoding and decoding unit 120 in response to the command signals fed from the key input unit 123.

Control data can be fed to the system controller 122 via an input terminal (not shown). The control data fed to the system controller 122 via the input terminal, and the control data fed to the system controller 122 from the key input unit 123 include a signal for adjusting the resolution of pictures represented by contents information to be recorded, a signal for separating quickly-moving scenes such as car racing scenes represented by contents information, and a signal for giving priority to a recording time. The system controller 122 changes an actual recording time in accordance with the control data. The system controller 122 enables the setting of the actual recording time to be selected by the user.

When the apparatus 110 is required to start to operate in the playback mode, the key input unit 123 is actuated to generate the playback start command signal. The playback start command signal is transmitted from the key input unit 123 to the system controller 122. The system controller 122 controls the amplifier unit 116 and the servo unit 117 in response to the playback start command signal, thereby starting the playback mode of operation of the apparatus 110. The control of the servo unit 117 includes steps of controlling the driver 115. Firstly, the system controller 122 starts rotation of the optical disc 113 and application of a laser spot thereon through the control of the driver 115. The optical head 114 is controlled by the driver 115, thereby reading out address information from the optical disc 113. For example, the address information is contained in management information stored in a management area of the optical disc 113. The read-out address information is transmitted from the optical head 114 to the system controller 122 via the amplifier unit 116. The system controller 122 finds or decides a target sector (a target track portion) to be played back by referring to the address information. The system controller 122 controls the optical head 114 via the servo unit 117, the driver 115, and the feed motor, thereby moving the optical head 114 radially with respect to the optical disc 113 and hence moving the laser spot to the target sector on the optical disc 113. When the movement of the laser spot to the target sector is completed, the system controller 122 operates to start the reproduction of a signal from the target sector on the optical disc 113. In this way, the playback mode of operation of the apparatus 110 is started. During the playback mode of operation of the apparatus 110, the target sector is repetitively changed from one to another.

During the playback mode of operation of the apparatus 110, the optical head 114 scans the optical disc 113 and generates an RF signal containing information read out therefrom. A unit of generation of the RF signal corresponds to one correction block of the information recorded on the optical disc 113. The optical head 114 outputs the RF signal to the amplifier unit 116. The amplifier unit 116 enlarges the RF signal. In addition, the amplifier unit 116 generates a main reproduced signal, and tracking and focusing servo signals (tracking error and focusing error signals) from the enlarged RF signal. The amplifier unit 116 includes an equalizer for optimizing the frequency aspect of the main reproduced signal. Also, the amplifier unit 116 includes a PLL (phase locked loop) circuit for extracting a bit clock signal from the equalized main reproduced signal, and for generating a speed servo signal from the equalized main reproduced signal. Furthermore, the amplifier unit 116 includes a jitter generator for comparing the time bases of the bit clock signal and the equalized main reproduced signal, and for detecting jitter components from the results of the time-base comparison. A signal of the detected jitter components is transmitted from the amplifier unit 116 to the system controller 122. The tracking and focusing servo signals and the speed servo signal are transmitted from the amplifier unit 116 to the servo unit 117. The equalized main reproduced signal is transmitted from the amplifier unit 116 to the signal processor 118.

The servo unit 117 receives the speed servo signal and the tracking and focusing servo signals from the amplifier unit 116. The servo unit 117 receives the rotation servo signals from the spindle motor 111. In response to these servo signals, the servo unit 117 implements corresponding servo control processes.

Specifically, the servo unit 117 generates a rotation control signal on the basis of the speed servo signal and the rotation servo signals. The rotation control signal is transmitted from the servo unit 117 to the spindle motor 111 via the driver 115. The spindle motor 111 rotates at a speed depending on the rotation control signal. The rotation control signal is designed to rotate the optical disc 113 at a given constant linear velocity.

In addition, the servo unit 117 generates servo control signals on the basis of the focusing and tracking servo signals. The servo control signals are transmitted from the servo unit 117 to the 2-axis actuator in the optical head 114 via the driver 115. The 2-axis actuator controls the laser spot on the optical disc 113 in response to the servo control signals, and thereby implements focusing and tracking of the laser spot with respect to the optical disc 113.

During the playback mode of operation of the apparatus 110, the signal processor 118 receives the main reproduced signal from the amplifier unit 116. The signal processor 118 is controlled by the system controller 122, thereby converting the main reproduced signal into a corresponding reproduced digital signal. The signal processor 118 detects a sync signal from the reproduced digital signal. The signal processor 118 decodes an EFM+ signal (an 8–16 modulation signal) of the reproduced digital signal into NRZ data, that is, non-return-to-zero data. The signal processor 118 subjects the NRZ data to an error correction process for every correction block, thereby generating a sector address signal and a plurality of information signals ("n" information signals). Here, "n" denotes a predetermined natural number equal to or greater than 2. The "n" information signals include a first information signal, a second information signal, . . . , and an n-th information signal. The sector address signal represents the address of a currently-accessed sector on the optical disc 113. The sync signal and the sector address signal are fed from the signal processor 118 to the system controller 122. It should be noted that the "n" information signals generated by the signal processor 118 correspond to information signals resulting from compression at variable transfer rates (variable transmission rates) during a recording mode of operation.

During the playback mode of operation of the apparatus 110, the signal processor 118 temporarily stores the "n" information signals in the track buffer memory 119. Thus, the signal processor 118 writes the "n" information signals into the track buffer memory 119, and reads the "n" information signals therefrom. Writing and reading the "n" information signals into and from the track buffer memory 119 are controlled to absorb a time-domain change in the transfer rates of the "n" information signals. The track buffer memory 119 includes, for example, a D-RAM having a capacity of 64 Mbytes. The signal processor 118 outputs the read-out signal (the "n" information signals read out from the track buffer memory 119) to the audio-video encoding and decoding unit 120.

In the case where the "n" information signals fed from the track buffer memory 119 via the signal processor 118 are compressed MPEG2 data in which audio data and video data are multiplexed, the audio-video encoding and decoding unit 120 separates the "n" information signals into compressed audio data and compressed video data. The audio-video encoding and decoding unit 120 expands and decodes the compressed audio data into non-compressed audio data. In addition, the audio-vide encoding and decoding unit 120 expands and decodes the compressed video data into non-compressed video data. During the expansively decoding process, the audio-video encoding and decoding unit 120 temporarily stores signals and data in the memory 121. The memory 121 includes, for example, a D-RAM having a capacity of 64 Mbytes. The audio-video encoding and decoding unit 120 converts the non-compressed audio data into a corresponding analog audio signal through digital-to-analog conversion. Also, the audio-video encoding and decoding unit 120 converts the non-compressed video data into a corresponding analog video signal through digital-to-analog conversion. It should be noted that the conversion of the non-compressed audio and video data into the analog audio and video signals may be implemented by digital-to-analog converters provided externally of the audio-video encoding and decoding unit 120. The audio-video encoding and decoding unit 120 outputs the analog audio signal and the analog video signal to the NTSC converter 124. The analog audio signal passes through the NTSC converter 124 before being applied to loudspeakers provided in the body of the display 125. The NTSC converter 124 changes the analog video signal into a corresponding NTSC video signal. The NTSC converter 124 outputs the NTSC video signal to the display 125.

The data rate of the expansively decoding process by the audio-video encoding and decoding unit 120, that is, the data transfer rate (the data transmission rate) in the expansively decoding process, is equalized to an expansion data rate which is set in accordance with the type of the related recording mode of operation of the apparatus 110. Specifically, the audio-video encoding and decoding unit 120 can implement the expansively decoding process at a expansion data rate which can be changed among plural different expansion data rates. The audio-video encoding and decoding unit 120 selects one from among the plural different expansion data rates as a desired expansion data rate in accordance with the type of the related recording mode of operation of the apparatus 110. The audio-video encoding and decoding unit 120 executes the expansively encoding process at the desired expansion data rate. Information of the type of the recording mode of operation of the apparatus 110 is recorded on the optical disc 113 as control data which may be contained in the management information. During the playback of the optical disc 113, the control data are read out therefrom before being transmitted to the system controller 122. The system controller 122 sets the expansion data rate in the audio-video encoding and decoding unit 120 in accordance with the control data.

When the apparatus 110 is required to start to operate in the recording mode, the key input unit 123 is actuated to generate the recording start command signal. The recording start-command signal is transmitted from the key input unit 123 to the system controller 122. The system controller 122 controls the amplifier unit 116 and the servo unit 117 in response to the recording start command signal, thereby starting the recording mode of operation of the apparatus 110. The control of the servo unit 117 includes steps of controlling the driver 115. Firstly, the system controller 122 starts rotation of the optical disc 113 and application of a laser spot thereon through the control of the driver 115. The optical head 114 is controlled by the driver 115, thereby reading out address information from the optical disc 113. For example, the address information is contained in management information stored in the management area of the optical disc 113. The read-out address information is transmitted from the optical head 114 to the system controller 122 via the amplifier unit 116. The system controller 122 finds or decides a target sector (a target track portion), on which a signal is to be recorded, by referring to the address information. The system controller 122 controls the optical head 114 via the servo unit 117, the driver 115, and the feed motor, thereby moving the optical head 114 radially with respect to the optical disc 113 and hence moving the laser spot to the target sector on the optical disc 113. During the recording mode of operation of the apparatus 110, the target sector is repetitively changed from one to another.

During the recording mode of operation of the apparatus 110, "n" analog information signals to be recorded are fed to the audio-video encoding and decoding unit 120 via the input terminals 126(1)–126(n) respectively. The audio-video encoding and decoding unit 120 converts the "n" analog information signals into corresponding "n" digital information signals through analog-to-digital conversion. It should be noted that the conversion of the "n" analog information signals into the "n" digital information signals may be implemented by analog-to-digital converters provided externally of the audio-video encoding and decoding unit 120. The audio-video encoding and decoding unit 120 compressively encodes the "n" digital information signals into "n" MPEG2 information signals at rates depending on the type of the recording mode. The audio-video encoding and decoding unit 120 outputs the "n" MPEG2 information signals to the signal processor 118 on a time sharing basis. The data rates of the compressively encoding process by the audio-video encoding and decoding unit 120, that is, the data transfer rates (the data transmission rates) in the compressively encoding process, are equalized to compression data rates which are selected from among plural different rates in accordance with the type of the recording mode of operation of the apparatus 110. During the compressively encoding process, the audio-video encoding and decoding unit 120 temporarily stores data in the memory 121.

It should be noted that the "n" MPEG2 information signals may be replaced by still-picture data or computer data such as program file data. In this case, the still-picture data or the computer data are transmitted to the system controller 122 via an interface (not shown). The system controller 122 transfers the still-picture data or the computer data to the signal processor 118.

Alternatively, the "n" MPEG2 information signals may be replaced by "n" compression-resultant information signals composing a transport stream signal. In this case, radio signals containing "n" compression-resultant information signals are received by the satellite digital broadcasting reception antenna 141, and the received radio signals are fed from the antenna 141 to the satellite digital broadcasting decoder 142. The satellite digital broadcasting decoder 142 subjects the received radio signals to QPSK demodulation, an error correction process, and a stream generating process, thereby converting the received radio signals into a transport stream signal composed of 188-byte segments representative of the "n" compression-resultant information signals. The satellite digital broadcasting decoder 142 outputs the transport stream signal to the switch 143. In addition, "n" compression-resultant information signals composing a transport stream signal are fed from the Internet to the switch 143 via the terminal 145. The switch 143 selects one of a set of the "n" compression-resultant information signals (the transport stream signal) fed from the satellite digital broadcasting decoder 142 and a set of the "n" compression-resultant information signals (the transport stream signal) fed via the terminal 145, and outputs the selected signal set to the stream converter 144. The selection by the switch 143 responds to a switch control signal fed from the system controller 122. The switch control signal is generated in response to, for example, user's operation of the key input unit 123. The stream converter 144 changes the output signals of the switch 143 into a program stream composed of 2048-byte segments representative of the "n" selected compression-resultant information signals. The stream converter 144 may encrypt the "n" selected compression-resultant information signals in accordance with key information recorded on the optical disc 113. The stream converter 144 outputs the program stream to the signal processor 118.

During the recording mode of operation of the apparatus 110, the signal processor 118 adds error correction code signals (ECC signals) to the "n" MPEG2 information signals, the still-picture data, the computer data, or the "n" compression-resultant information signals. The signal processor 118 subjects the ECC-added data (the ECC-added signals) to NRZ and EFM+ encoding processes. The signal processor 118 adds a sync signal to the encoding-resultant data to form sync-added data. The sync signal is fed from the system controller 122. The sync-added data are temporarily stored in the track buffer memory 119. The sync-added data are read out from the track buffer memory 119 at a data rate corresponding to a data rate of signal recording on the optical disc 113. The signal processor 118 subjects the read-out data to given modulation for record. The signal processor 118 outputs the modulation-resultant signal to the amplifier unit 116. The amplifier unit 116 corrects the waveform of the output signal of the signal processor 118. The amplifier unit 116 outputs the waveform-correction-resultant signal to the laser drive circuit in the optical head 114. The optical head 114 records the output signal of the amplifier unit 116 on the target sector (the target track portion) on the optical disc 113.

The amplifier unit 116 informs the system controller 122 of detected jitter components. The system controller 122 subjects the detected jitter components to analog-to-digital conversion to generate a measured jitter value. During the recording mode of operation of the apparatus 110, the system controller 122 adjusts the degree or characteristic of the waveform correction by the amplifier unit 116 in response to the measured jitter value and an asymmetry value.

Operation of the apparatus 110 can be changed among various modes. During a first mode of operation, the apparatus 110 reproduces an audio signal or an audio-video signal from the optical disc 113. During a second mode of operation, the apparatus 10 records an audio signal or an audio-video signal on the optical disc 113. During a third mode of operation, the apparatus 110 records an audio signal or an audio-video signal on one area of the optical disc 113 while reproducing an audio signal or an audio-video signal from another area of the optical disc 113. During a fourth mode of operation, the apparatus 110 reproduces an audio signal or an audio-video signal from one area of the optical disc 113 while recording an audio signal or an audio-video signal on another area of the optical disc 113. During a fifth mode of operation, the apparatus 110 reproduces an audio signal or an audio-video signal from one area of the optical disc 113 while reproducing an audio signal or an audio-video signal from another area of the optical disc 113. During a sixth mode of operation, the apparatus 110 records an audio signal or an audio-video signal on one area of the optical disc 113 while recording an audio signal or an audio-video signal on another area of the optical disc 113. These various modes of operation of the apparatus 110 meet user's requests for the implementation of an after-recording process and a different-channel-program recording process.

The apparatus 110 can record "n" information signals on different areas of the optical disc 113, respectively, on a time sharing basis. The "n" information signals are "n" audio-video information signals respectively. Alternatively, the "n" information signals may be "n" audio information signals respectively. The apparatus 110 can record only one of the "n" information signals on the optical disc 113.

The apparatus 110 can reproduce "n" information signals from different areas of the optical disc 113, respectively, on a time sharing basis. The "n" information signals are "n" audio-video information signals respectively. Alternatively, the "n" information signals may be "n" audio information signals respectively. The apparatus 110 can reproduce only one of the "n" information signals from the optical disc 113.

Figure 18:
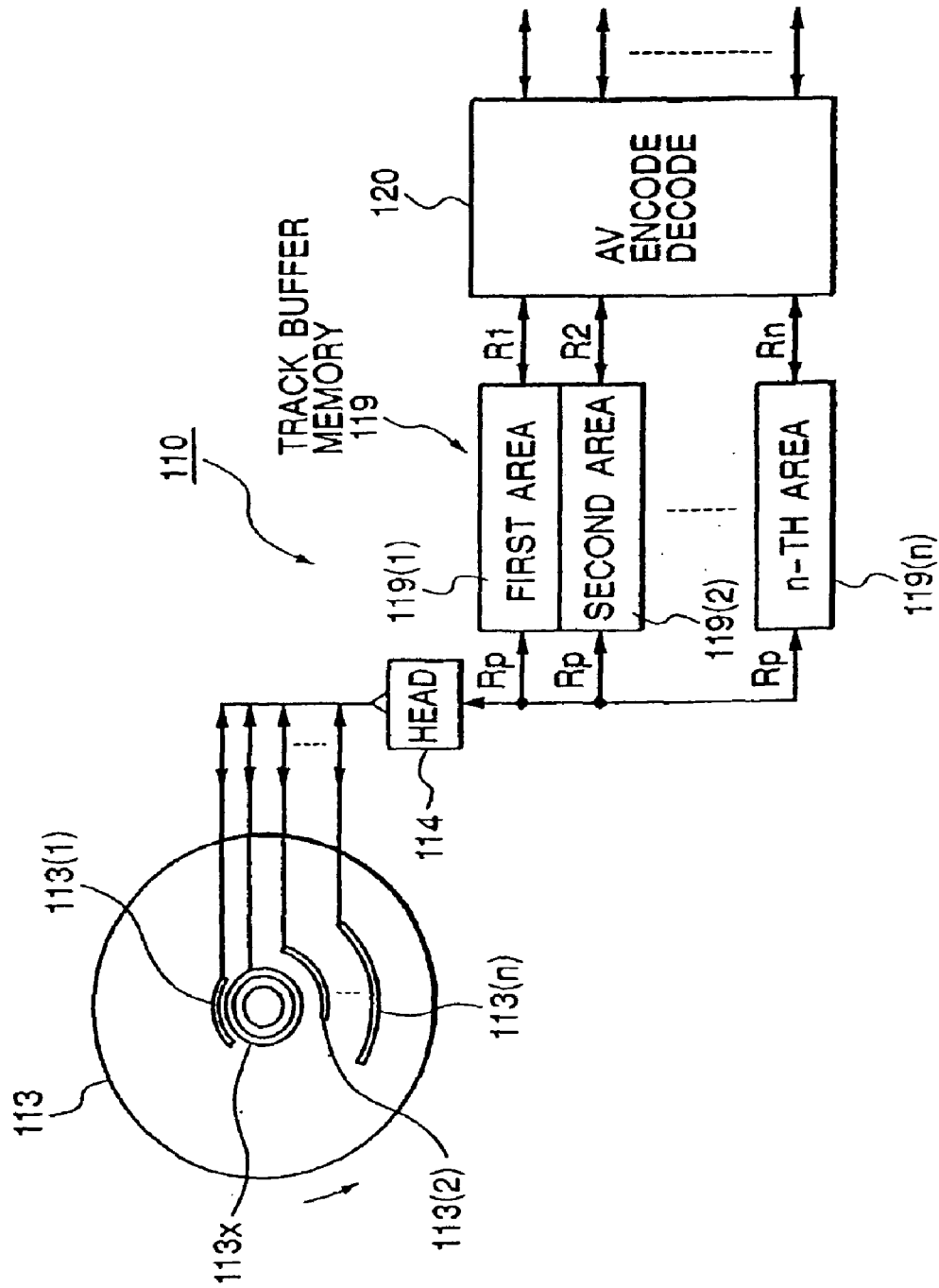
FIG. 18 is a diagram of a portion of the apparatus in FIG. 17.

FIG. 18 shows a portion of the apparatus 110. The amplifier unit 116 and the signal processor 118 are omitted from FIG. 18 for a better understanding. As shown in FIG. 18, the optical disc 113 has first, second, . . . , and n-th areas 113(1), 113(2), . . . , and 113(n) assigned to first, second, . . . , and n-th information signals respectively. The first, second, . . . , and n-th areas 113(1), 113(2), . . . , and 113(n) are separate from each other. Each of the first, second, . . . , and n-th areas 113(1), 113(2), . . . , and 113(n) is divided into separate equal-size sub-areas. The first information signal is divided into blocks each having a predetermined size (a predetermined total number of bits) Y1. The sub-areas of the first area 113(1) are allocated to the blocks of the first information signal, respectively. The second information signal is divided into blocks each having a predetermined size (a predetermined total number of bits) Y2. The sub-areas of the second area 113(2) are allocated to the blocks of the second information signal, respectively. The third and later information signals, and the third and later areas 113(3) . . . are similarly designed. The n-th information signal is divided into blocks each having a predetermined size (a predetermined total number of bits) Yn. The sub-areas of the n-th area 113(n) are allocated to the blocks of the n-th information signal, respectively. Each of the predetermined sizes Y1, Y2, . . . , and Yn is a unit (a unit capacity) for continuous reproduction (or continuous recording) of information, or a unit (a unit capacity) for reproduction (or recording) of continuous information. The first, second, . . . , and n-th information signals are related or unrelated to each other. Each of the first, second, . . . , and n-th information signals represents audio data, video data, audio-video data, or computer data.

As shown in FIG. 19, the sub-areas in the first area 113(1) of the optical disc 113 are given addresses A1, A2, A3, . . . , respectively. Thus, the sub-areas in the first area 113(1) are also referred to as the sub-areas A1, A2, A3, . . . . The blocks of the first information signal are assigned to the sub-areas A1, A2, A3, . . . , respectively. Preferably, the size Y1 of the blocks of the first information signal is equal to the size of the sub-areas A1, A2, A3, . . . . The placement of the sub-ares in the first area 113(1) is designed to meet requirements for a seek time. As shown in FIG. 20, the sub-areas in the second area 113(2) of the optical disc 113 are given addresses B1, B2, B3, . . . , respectively. Thus, the sub-areas in the second area 113(2) are also referred to as the sub-areas B1, B2, B3, . . . . The blocks of the second information signal are assigned to the sub-areas B1, B2, B3, . . . , respectively. Preferably, the size Y2 of the blocks of the second information signal is equal to the size of the sub-areas B1, B2, B3, . . . . The placement of the sub-areas in the second area 113(2) is designed to meet requirements for a seek time. The sub-areas in each of the third and later areas 113(3) . . . of the optical disc 113, and the blocks of each of the third and later information signals are similarly designed. As shown in FIG. 21, the sub-areas in the n-th area 113(n) of the optical disc 113 are given addresses N1, N2, N3, . . . , respectively. Thus, the sub-areas in the n-th area 113(n) are also referred to as the sub-areas N1, N2, N3, . . . . The blocks of the n-th information signal are assigned to the sub-areas N1, N2, N3, . . . , respectively. Preferably, the size Yn of the blocks of the n-th information signal is equal to the size of the sub-areas N1, N2, N3, . . . . The placement of the sub-areas in the n-th area 113(n) is designed to meet requirements for a seek time.

During an example of the recording or playback mode of operation of the apparatus 110, the optical head 114 accesses the sub-area A1 in the first area 113(1) of the optical disc 113 before accessing the sub-area B1 in the second area 113(2) of the optical disc 113. The sub-area A1 and the sub-area B1 are located relative to each other so that the optical head 114 can move therebetween in a predetermined time (equal to, for example, 1.5 seconds). Therefore, the maximum seek time during which the optical head 114 moves between the sub-area A1 and the sub-area B1 is equal to the predetermined time (for example, 1.5 seconds). Similarly, the maximum seek time during which the optical head 114 moves from one sub-area to a next sub-area is equal to the predetermined time (for example, 1.5 seconds).

As shown in FIG. 18, an innermost portion of the optical disc 113 has a management area 113x. As shown in FIG. 22, the management area 113x is divided into separate sub-areas which are given addresses X1, X2, X3, . . . , respectively. Thus, the sub-areas in the management area 113x are also referred to as the sub-areas X1, X2, X3, . . . . In the case where the first, second, . . . , and n-th areas 113(1), 113(2), . . . , and 113(n) of the optical disc 113 store the first, second, and n-th information signals respectively, the management area 113x is loaded with copyright information, title information, signals representative of the transfer rates R1, R2, . . . , and Rn, and signals representative of start addresses and end addresses for the first, second, and n-th information signals. In the case where the first, second, . . . , and n-th areas 113(1), 113(2), . . . , and 113(n) of the optical disc 113 are unoccupied and do not store the first, second, and n-th information signals respectively, the management area 113x is loaded with signals representative of the start addresses and the end addresses of the unoccupied regions (the unoccupied areas).

The track buffer memory 119 has first, second, . . . , and n-th areas 119(1), 119(2), . . . , and 119(n) which are assigned to the first, second, . . . , and n-th information signals respectively.

With reference to FIG. 18, the optical head 114 transfers the first, second, . . . , and n-th information signals between the optical disc 113 and the track buffer memory 119 on a time sharing basis and at a predetermined constant transfer rate Rp. The predetermined constant transfer rate Rp is equal to, for example, 25 Mbps.

The first information signal is transferred between the track buffer memory 119 and the audio-video encoding and decoding unit 120 at a transfer rate R1 selected from among predetermined values. All the predetermined values are lower than the predetermined constant transfer rate Rp related to the optical head 114. The second information signal is transferred between the track buffer memory 119 and the audio-video encoding and decoding unit 120 at a transfer rate R2 changeable among the predetermined values. Similarly, the third and later information signals are transferred between the track buffer memory 119 and the audio-video encoding and decoding unit 120. The n-th information signal is transferred between the track buffer memory 119 and the audio-video encoding and decoding unit 120 at a transfer rate Rn changeable among the predetermined values.

As will be mentioned later, the apparatus 110 can substantially continuously and simultaneously record or reproduce the contents of at least two of the "n" information signals.

In more detail, each of the transfer rates R1, R2, . . . , and Rn is selected from among a value of 8 Mbps which corresponds to a recording time of 2 hours and a high picture quality, a value of 4 Mbps which corresponds to a recording time of 4 hours and a slightly high picture quality, and a value of 2 Mbps which corresponds to a recording time of 8 hours and a normal picture quality. Ones of these values can be designated as desired values of the transfer rates R1, R2, . . . , and Rn according to user's operation of the key input unit 123 (see FIG. 17). A value of 17 Mbps may be added to the candidate values. During the recording of the "n" information signals on the optical disc 113, the transfer rates R1, R2, . . . , and Rn are set to the desired values designated by user's operation of the key input unit 123.

During the reproduction of the "n" information signals from the optical disc 113, information of recording compression rates is derived from control data in the "n" information signals, and the transfer rates R1, R2, . . . , and Rn are set in response to the recording compression rates. Alternatively, during the reproduction of the "n" information signals from the optical disc 113, control data (management information) representative of transfer rates R1, R2, . . . , and Rn are reproduced from the optical disc 113, and the actual transfer rates R1, R2, . . . , and Rn are set in accordance with the reproduced control data.

The system controller 122 (see FIG. 17) controls the track buffer memory 119 via the signal processor 118 (see FIG. 17). The system controller 122 virtually divides or partitions the track buffer memory 119 into the first, second, . . . , and n-th areas 119(1), 119(2), . . . , and 119(n). Specifically, the system controller 122 sets the first, second, . . . , and n-th areas 119(1), 119(2), . . . , and 119(n) in the track buffer memory 119 in response to the values of the transfer rates R1, R2, . . . , and Rn. The ratio in capacity among the first, second, . . . , and n-th areas 119(1), 119(2), . . . , and 119(n) depends on the ratio among the transfer rates R1, R2, . . . , and Rn. Regarding the first area 119(1) in the track buffer memory 119, the system controller 122 sets an empty value and a full value in response to the value of the transfer rate R1. The empty value corresponds to a slightly occupied state or a substantially empty state of the first area 119(1). The full value corresponds to a fully occupied state of the first area 119(1). Regarding the second area 119(2) in the track buffer memory 119, the system controller 122 sets an empty value and a full value in response to the value of the transfer rate R2. The empty value corresponds to a slightly occupied state or a substantially empty state of the second area 119(2). The full value corresponds to a fully occupied state of the second area 119(2). Similarly, regarding each of the third and later areas 119(3) . . . in the track buffer memory 119, the system controller 122 sets an empty value and a full value in response to the value of the related transfer rate. Regarding the n-th area 119(n) in the track buffer memory 119, the system controller 122 sets an empty value and a full value in response to the value of the transfer rate Rn. The empty value corresponds to a slightly occupied state or a substantially empty state of the n-th area 119(n). The full value corresponds to a fully occupied state of the n-th area 119(n). The system controller 122 always monitors the degree of occupancy of each of the first, second, . . . , and n-th areas 119(1), 119(2), . . . , and 119(n) which varies between the related empty value and the related full value under normal conditions.

Alternatively, the division of the track buffer memory 119 into the first, second, . . . , and n-th areas 119(1), 119(2), . . . , and 119(n) may be responsive to the type of the mode of operation of the apparatus 110. For example, in the case of the operation mode during which the apparatus 110 reproduces first one of the "n" information signals and records second one of the "n" information signals, greater one of the first, second, . . . , and n-th areas 119(1), 119(2), . . . , and 119(n) is assigned to the information signal to be recorded while smaller one is assigned to the reproduced information signal. This design reliably prevents the occurrence of an interruption of the continuously recording of the contents of the information signal. The system controller 122 implements the division of the track buffer memory 119 into the first, second, . . . , and n-th areas 119(1), 119(2), . . . , and 119(n) when receiving a recording start command signal or a playback start command signal. Preferably, the system controller 122 implements the division of the track buffer memory 119 after confirming the absence of data from the track buffer memory 119 which are being reproduced or recorded.

A first mode of operation of the apparatus 110 is executed in the case where the optical disc 113 is designed exclusively for playback. During the first mode of operation, the optical head 114 reproduces the first, second, . . . , and n-th information signals from the first, second, . . . , and n-th areas 113(1), 113(2), . . . , and 113(n) of the optical disc 113 on a time sharing basis. The first, second, . . . , and n-th information signals are transmitted from the optical head 114 to the track buffer memory 119. The first, second, . . . , and n-th information signals are stored into the first, second, . . . , and n-th areas 119(1), 119(2), . . . , and 119(n) of the track buffer memory 119 at the predetermined constant transfer rate Rp. The first, second, . . . , and n-th information signals are transmitted from the first, second, . . . , and n-th areas 119(1), 119(2), . . . , and 119(n) of the track buffer memory 119 at the respective transfer rates R1, R2, . . . , and Rn lower than the predetermined constant transfer rate Rp.

A second mode of operation of the apparatus 110 is executed in the case where the optical disc 113 is of the rewritable type. During the second mode of operation, the first, second, . . . , and n-th information signals are stored into the first, second, . . . , and n-th areas 119(1), 119(2), . . . , and 119(n) of the track buffer memory 119 at the respective transfer rates R1, R2, . . . , and Rn lower than the predetermined constant transfer rate Rp. The first, second, . . . , and n-th information signals are transmitted from the first, second, . . . , and n-th areas 119(1), 119(2), . . . , and 119(n) of the track buffer memory 119 to the optical head 114 at the predetermined constant transfer rate Rp. The optical head 114 records the first, second, . . . , and n-th information signals on the first, second, . . . , and n-th areas 113(1), 113(2), . . . , and 113(n) of the optical disc 113 on a time sharing basis.

A third mode of operation of the apparatus 110 is executed in the case where the optical disc 113 is of the rewritable type. During the third mode of operation, the optical head 114 reproduces at least one information signal from first one of the first, second, . . . , and n-th areas 113(1), 113(2), . . . , and 113(n) of the optical disc 113. The reproduced information signal is transmitted from the optical head 114 to the track buffer memory 119. The reproduced information signal is stored into the track buffer memory 119 at the predetermined constant transfer rate Rp. The reproduced information is transmitted from the track buffer memory 119 at the related transfer rate lower than the predetermined constant transfer rate Rp. During the third mode of operation, another information signal (an information signal to be recorded) is stored into the track buffer memory 119 at the related transfer rate lower than the predetermined constant transfer rate Rp. The recorded information signal is transmitted from the track buffer memory 119 to the optical head 114 at the predetermined constant transfer rate Rp. The optical head 114 records the transmitted information signal on second one of the first, second, . . . , and n-th areas 113(1), 113(2), . . . , and 113(n) of the optical disc 113. The signal reproduction by the optical head 114 and the signal recording by the optical head 114 alternate with each other on a time sharing basis.

As previously indicated, the rate of the transfer of the first, second, . . . , and n-th information signals by the optical head 114 is denoted by "Rp" (Mbps). Regarding the track buffer memory 119, the rate of the transfer of the first information signal is denoted by "R1" (Mbps). The rate of the transfer of the second information signal is denoted by "R2" (Mbps). Similarly, the rates of the transfer of the third and later information signals are denoted by "R3", . . . (Mbps). The rate of the transfer of the n-th information signal is denoted by "Rn" (Mbps). The minimum capacity of the track buffer memory 119 is denoted by "Ym" (Mbits). The size (the total number of bits) of the first information signal recorded on each of the sub-areas A1, A2, A3, in the first area 113(1) of the optical disc 113 is denoted by "Y1" (Mbits). The size (the total number of bits) of the second information signal recorded on each of the sub-areas B1, B2, B3, . . . in the second area 113(2) of the optical disc 113 is denoted by "Y2" (Mbits). Similarly, the sizes of the third and later information signals are denoted by "Y3", . . . . (Mbits). The size (the total number of bits) of the n-th information signal recorded on each of the sub-areas N1, N2, N3, . . . in the n-th area 113(n) of the optical disc 113 is denoted by "Yn" (Mbits). The seek time of movement of the optical head 114 from the first area 113(1) to the second area 113(2) in the optical disc 113 is denoted by "S1" (s). The seek time of movement of the optical head 114 from the second area 113(2) to the third area 113(3) in the optical disc 113 is denoted by "S2" (s). Similarly, the seek time of movement of the optical head 114 from present one to next one of the third and later areas is denoted by "Sk" (s) where k=3, 4, 5, . . . . The seek time of movement of the optical head 114 from the n-th area 113(n) to the first area 113(1) in the optical disc 113 is denoted by "Sn" (s).

Each of the seek times S1, S2, . . . , and Sn is equal to a first time interval plus a second time interval. The first time interval starts from the moment at which the optical head 114 reaches a reproduction end position and suspends the reproduction of an information signal from one area 113(1), 113(2), . . . , or 113(n) in the optical disc 113. The first time interval ends and the second time interval starts when the optical head 114 moves to a next area in the optical disc 113. The second time interval continues until the optical head 114 starts reproducing an information signal from the next area in the optical disc 113. During the second time interval, a target address of the next area in the optical disc 113 is found, and preparations for the reproduction of the information signal therefrom have been made.

The sum ΣRn of the transfer rates R1, R2, . . . , and Rn for the information signals written into and read out from the track buffer memory 119 is smaller than the predetermined constant transfer rate Rp related to the optical head 114. Thus, the transfer rates R1, R2, . . . , and Rn, and the predetermined constant transfer rate Rp are in the following relation.

$$Rp > R1 + R2 + \ldots + Rn \tag{31}$$

The recording or playback time T1 (S) for which the optical head 114 continuously records or reproduces the first information signal on or from the first area 113(1) of the optical disc 113 is given as follows.

$$T1 = Y1/Rp \tag{32}$$

The recording or playback time T2 (S) for which the optical head 114 continuously records or reproduces the second information signal on or from the second area 113(2) of the optical disc 113 is given as follows.

$$T2 = Y2/Rp \tag{33}$$

Similarly, the recording or playback time Tk (S) for which the optical head 114 continuously records or reproduces the k-th information signal on or from the k-th area 113(*k*) of the optical disc 113 is given as follows.

$$Tk = Yk/Rp \text{ where } k=3, 4, 5, \ldots$$

The recording or playback time Tn (S) for which the optical head 114 continuously records or reproduces the n-th information signal on or from the n-th area 113(2) of the optical disc 113 is given as follows.

$$Tn = Yn/Rp \qquad (34)$$

Regarding the transfer rates Rp, R1, R2, ..., and Rn, the following ratio is considered.

$$Rp/(Rp-R1-R2 \ldots -Rn) \qquad (35)$$

where "Rp" corresponds to a 1-cycle time during which the first, second, ..., and n-th information signals are sequentially recorded or reproduced once, and "(Rp−R1−R2 ... −Rn)" corresponds to a seek period in the 1-cycle time.

Regarding the times T1, T2, ..., and Tn, S1, S2, ..., and Sn, the following ratio is considered.

$$(T1+S1+T2+S2 \ldots +Tn+Sn)/(S1+S2 \ldots +Sn) \qquad (36)$$

where "(T1+S1+T2+S2 ... +Tn+Sn)" corresponds to a 1-cycle time during which the first, second, ..., and n-th information signals are sequentially recorded or reproduced once, and "(S1+S2 ... +Sn)" corresponds to a total seek period in the 1-cycle time.

The ratio in the relation (35) and the ratio in the relation (36) are equal to each other, and the following relation is available.

$$Rp/(Rp-R1-R2 \ldots -Rn) = (T1+S1+T2+S2 \ldots +Tn+Sn)/(S1+S2+Sn) \qquad (37)$$

The equation (37) is changed into the following version.

$$(T1+T2 \ldots +Tn) = (R1+R2 \ldots +Rn)\cdot(S1+S2 \ldots +Sn)/(Rp-R1-R2 \ldots -Rn) \qquad (38)$$

Combining the equations (32) and (33) with the equation (38) results in the following equation.

$$(Y1+Y2 \ldots +Yn) = Rp\cdot(R1+R2 \ldots +Rn)(S1+S2 \ldots +Sn)/(Rp-R1-R2 \ldots -Rn) \qquad (39)$$

The rate Rp of the transfer of the first, second, ..., and n-th information signals between the optical disc 113 and the track buffer memory 119 is equal to the predetermined constant value. The predetermined constant transfer rate Rp is higher than the transfer rates R1, R2, ..., and Rn for the first, second, ..., and n-th information signals in connection with the track buffer memory 119. During the recording of the first, second, ..., and n-th information signals, the transfer rates R1, R2, ..., and Rn are decided on the basis of the user's setting (the user's selection). During the playback of the first, second, ..., and n-th information signals, the transfer rates R1, R2, ..., and Rn are decided on the basis of the recording conditions stored in the optical disc 113 as control data. For example, the control data are contained in management information stored in the management area 113*x* of the optical disc 113. The seek times S1, S2, ..., and Sn are determined according to the specifications of the apparatus 110 and the addresses on the optical disc 113. To implement continuous recording or continuous playback of the information-signal contents, the sum ΣYn of the size (the total number of bits) Y1 of the first information signal on each of the sub-areas in the first area 113(1) of the optical disc 113, the size (the total number of bits) Y2 of the second information signal on each of the sub-areas in the second area 113(2) of the optical disc 113, ..., and the size (the total number of bits) Yn of the n-th information signal on each of the sub-areas in the n-th area 113(*n*) of the optical disc 113 is chosen to satisfy a relation (40) as follows.

$$(Y1+Y2 \ldots +Yn) \geq Rp\cdot(R1+R2 \ldots +Rn)\cdot(S1+S2 \ldots +Sn)/(Rp-R1-R2 \ldots -Rn) \qquad (40)$$

The relation (40) is rewritten as follows.

$$\Sigma Yn \geq Rp\cdot\Sigma Rn\cdot\Sigma Sn/(Rp-\Sigma Rn) \qquad (41)$$

where:

$$\Sigma Yn = Y1+Y2 \ldots +Yn$$

$$\Sigma Rn = R1+R2 \ldots +Rn$$

$$\Sigma Sn = S1+S2 \ldots +Sn$$

When each of the seek times S1, S2, ..., and Sn is set to an allowable seek time S equal to a fixed time taken by the optical head 114 to move between an innermost part and an outermost part of the optical disc 113, the following equation is satisfied.

$$\Sigma Sn = n\cdot S \qquad (42)$$

Combining the equation (42) with the relation (41) results in the following equation.

$$\Sigma Yn \geq Rp\cdot\Sigma Rn\cdot n\cdot S/(Rp-\Sigma Rn) \qquad (43)$$

In the case where the optical disc 113 is of the rewritable DVD type, the allowable seek time S is set to about 1.5 seconds.

The sizes Y1, Y2, ..., and Yn, and the transfer rates R1, R2, ..., and Rn are in the following relations.

$$Y1 > Rp\cdot R1\cdot(S1+S2 \ldots +Sn)/(Rp-R1-R2 \ldots -Rn) \qquad (44)$$

$$Y2 \geq Rp\cdot R2\cdot(S1+S2 \ldots +Sn)/(Rp-R1-R2 \ldots -Rn) \qquad (45)$$

. . .

. . .

$$Yn \geq Rp\cdot Rn\cdot(S1+S2 \ldots +Sn)/(Rp-R1-R2 \ldots -Rn) \qquad (46)$$

Thus, in the case where the transfer rates Rp, R1, R2, ..., and Rn and the seek times S1, S2, ..., and Sn are decided, continuous recording or continuous playback of the contents of the "n" information signals can be implemented when the sizes Y1, Y2, ..., and Yn are chosen to satisfy the above-indicated relations (40), (41), (43), (44), (45), and (46). The recording or playback times T1, T2, ..., and Tn are determined as the sizes Y1, Y2, ..., and Yn and the transfer rates Rp, R1, R2, ..., and Rn are decided.

In addition, the sum ΣYn of the sizes Y1, Y2, ..., and Yn, the maximum size of the track buffer memory 119, and the empty value and the full value related to each of the first, second, ..., and n-th areas 119(1), 119(2), ..., and 119(*n*) are decided according to the relations (40), (41), (43), (44), (45), and (46).

The minimum capacity Ym of the track buffer memory 119 satisfies the following relation (47).

$$Ym > Rp\cdot\Sigma Rn\cdot\Sigma Sn/(Rp-\Sigma Rn) \qquad (47)$$

When each of the seek times S1, S2, . . . , and Sn is set to the allowable seek time S, the relation (47) is rewritten as follows.

$$Ym > Rp \cdot \Sigma Rn \cdot n \cdot S / (Rp - \Sigma Rn) \qquad (48)$$

It should be noted that a portion of the buffer memory 121 connected to the audio-video encoding and decoding unit 120 may be used as a track buffer memory substituting for the track buffer memory 119.

In the case where the optical head 114 is required to record the "n" information signals on the optical disc 113 on a time sharing basis, conditions of unoccupied portions of the areas 113(1)–113(n) in the optical disc 113 are detected. Specifically, the management area 113x in the optical disc 113 is accessed. Start addresses and end addresses of unoccupied regions are calculated on the basis of the start addresses and the end addresses of data-loaded regions which are stored in the management area 113x. Then, the sizes and the positions of the unoccupied regions are calculated. For each of the 2-Mbps, 4-Mbps, and 8-Mbps transfer rates concerning the "n" information signals, a decision is made as to whether or not the size of each unoccupied region is sufficient to implement continuous recording. In addition, the seek time of the optical head 114 is calculated as follows. The difference between addresses is calculated. The movement-corresponding track number is computed on the basis of the address difference by referring to a seek table provided in the program ROM within the system controller 122. The computation of the movement-corresponding track number is also based on the fact that the rotation of the optical disc 113 undergoes CLV control. Given calculation using the movement-corresponding track number and a given coefficient provides a calculated seek time of the optical head 114. It should be noted that the seek time of the optical head 114 may be set to a given value depending on the type of the apparatus 110 or a standards-based allowable seek time.

Multiple-signal Playback Mode

A multiple-signal playback mode of operation of the apparatus 110 is executed in the case where the optical disc 113 is designed exclusively for playback. During the multiple-signal playback mode of operation, the optical head 114 reproduces the "n" information signals from the optical disc 113 on a time sharing basis while the contents of the "n" information signals are continuously played back.

The optical disc 113 has the first area 113(1) divided into the sub-areas on which the blocks of the first information signal are previously recorded respectively. In addition, the optical disc 113 has the second area 113(2) divided into the sub-areas on which the blocks of the second information signal are previously recorded respectively. Similarly, the optical disc 113 has the third and later areas 113(3) . . . on which the third and later information signals are previously recorded. Furthermore, the optical disc 113 has the n-th area 113(n) divided into the sub-areas on which the blocks of the n-th information signal are previously recorded respectively. Each of the blocks of the first information signal has a predetermined size (a predetermined total number of bits) Y1. Each of the blocks of the second information signal has a predetermined size (a predetermined total number of bits) Y2. Similarly, the blocks of the third and later information signals have predetermined sizes Y3 . . . . Each of the blocks of the n-th information signal has a predetermined size (a predetermined total number of bits) Yn.

When the multiple-signal playback mode of operation is started, the optical head 114 reproduces management information from the management area 113x in the optical disc 113. The reproduced management information is transmitted from the optical head 114 to the system controller 122. The system controller 122 detects the locations and conditions of the sub-areas in the areas 113(1)–113(n) from the management information. Generally, the system controller 122 also derives information of transfer rates R1, R2, . . . , and Rn from the management information. Then, the optical head 114 is moved to a position corresponding to the sub-area A1 in the first area 113(1) of the optical disc 113. The optical head 114 reproduces the first information signal from the sub-area A1 in the optical disc 113. The reproduced first information signal is transmitted from the optical head 114 to the track buffer memory 119, being stored into the first area 119(1) in the track buffer memory 119 at the predetermined constant transfer rate Rp.

Figure 23:
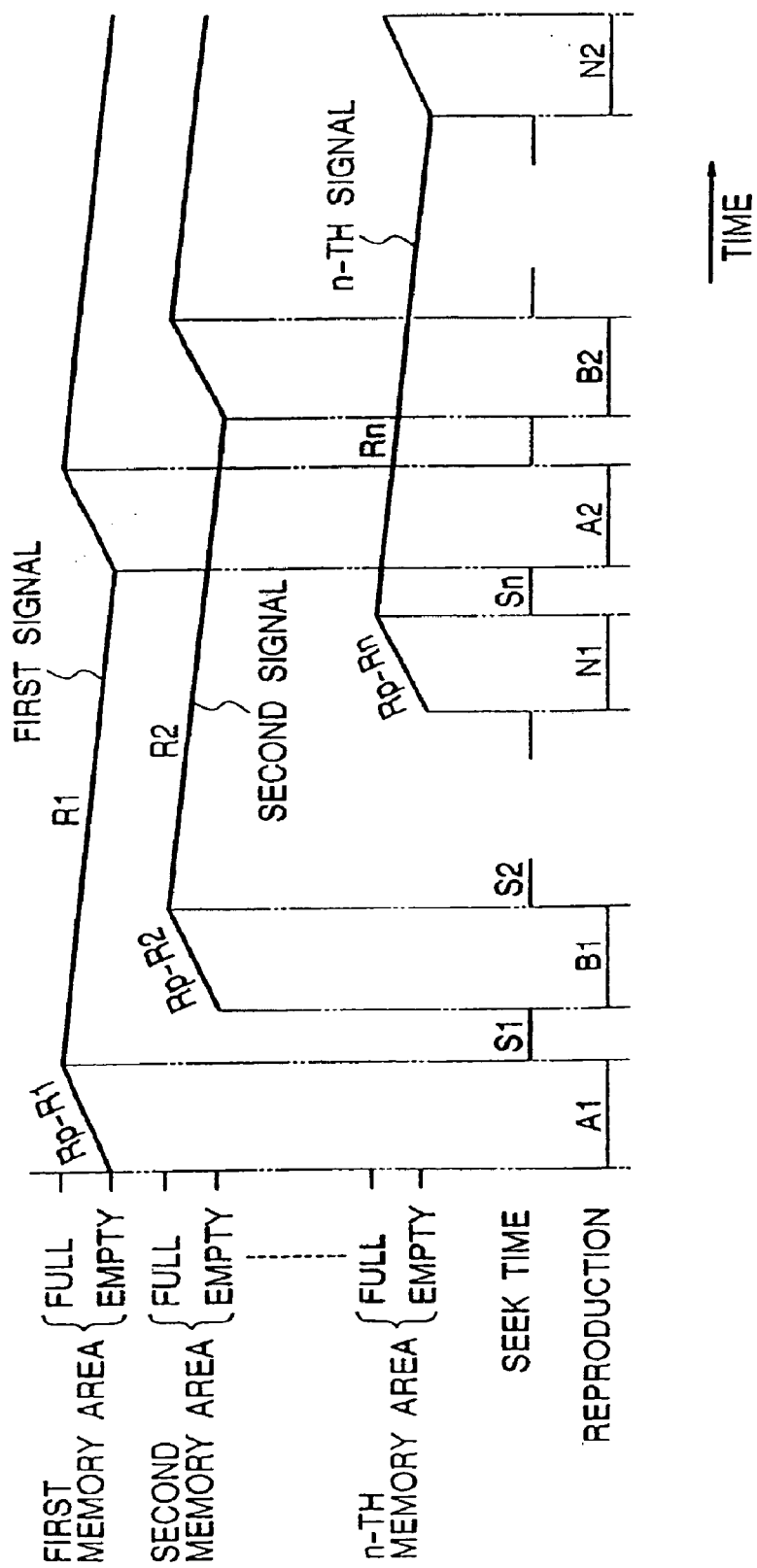
FIG. 23 is a time-domain diagram of the degrees of occupancy of areas in a track buffer memory in FIG. 17 which occur in a multiple-signal playback mode of operation.

As shown in FIG. 23, after the degree of occupancy of the first area 119(1) in the track buffer memory 119 reaches the related empty value, the first information signal is read out from the memory area 119(1) toward the audio-video encoding and decoding unit 120 at the transfer rate R1 and the first information signal is transmitted from the sub-area A1 in the optical disc 113 to the memory area 119(1) at the predetermined constant transfer rate Rp. Thus, during this stage, the degree of occupancy of the memory area 119(1) increases at a rate corresponding to "Rp–R1".

When the degree of occupancy of the memory area 119(1) reaches the related full value, the transmission of the first information signal from the sub-area A1 in the optical disc 113 to the memory area 119(1) is suspended. Then, the optical head 114 is moved to a position corresponding to the sub-area B1 in the second area 113(2) of the optical disc 113. The seek time S1 related to this movement of the optical head 114 is equal to or shorter than 1.5 seconds. The optical head 114 transmits the second information signal from the sub-area B1 in the optical disc 113 to the second area 119(2) of the track buffer memory 119 at the predetermined constant transfer rate Rp. Even after the degree of occupancy of the memory area 119(1) reaches the related full value, the first information signal continues to be read out from the memory area 119(1) at the transfer rate R1. Thus, during this stage, the degree of occupancy of the memory area 119(1) decreases at a rate corresponding to "R1". The read-out of the first information signal from the memory area 119(1) is completed before the optical head 114 accesses the sub-area A2 in the first area 113(1) of the optical disc 113.

After the degree of occupancy of the second area 119(2) in the track buffer memory 119 reaches the related empty value, the second information signal is read out from the memory area 119(2) toward the audio-video encoding and decoding unit 120 at the transfer rate R2 and the second information signal continues to be transmitted from the sub-area B1 in the optical disc 113 to the memory area 119(2) at the predetermined constant transfer rate Rp. Thus, during this stage, the degree of occupancy of the memory area 119(2) increases at a rate corresponding to "Rp–R2".

When the degree of occupancy of the memory area 119(2) reaches the related full value, the transmission of the second information signal from the sub-area B1 in the optical disc 113 to the memory area 119(2) is suspended. Then, the optical head 114 is moved to a position corresponding to the first sub-area in the third area 113(3) of the optical disc 113. The seek time S2 related to this movement of the optical head 114 is equal to or shorter than 1.5 seconds. Even after the degree of occupancy of the memory area 119(2) reaches the related full value, the second information signal continues to be read out from the memory area 119(2) at the transfer rate R2. Thus, during this stage, the degree of occupancy of the memory area 119(2) decreases at a rate corresponding to "R2". The read-out of the second information signal from the memory area 119(2) is completed before the optical head 114 accesses the sub-area B2 in the second area 113(2) of the optical disc 113.

The above-mentioned sequence of steps is iterated while the optical head 114 sequentially reproduces the third and later information signals from the first sub-areas in the third and later areas 113(3)–113(n) of the optical disc 113. After the reproduction of the n-th information signal from the sub-area N1 in the n-th area 113(n) of the optical disc 113 is completed, the optical head 114 is moved to a position corresponding to the sub-area A2 in the first area 113(1) of the optical disc 113. During a subsequent term, such processes are iterated. Thus, the contents of the "n" information signals are continuously played back while the optical head 114 sequentially accesses the sub-areas in the areas 113(1)–113(n) of the optical disc 113 in the order as "A1, B1, . . . , N1, A2, B2, . . . , N2, . . . ". During the multiple-signal playback mode of operation of the apparatus 110, the previously-indicated parameters satisfy the relations (31)–(48).

Multiple-signal Recording Mode

A multiple-signal recording mode of operation of the apparatus 110 is executed in the case where the optical disc 113 is of the rewritable type. During the multiple-signal recording mode of operation, the "n" information signals are written into the areas 119(1)–119(n) in the track buffer memory 119 at the transfer rates R1–Rn, respectively. The "n" information signals are transmitted from the areas 119(1)–119(n) in the track buffer memory 119 to the optical head 114 on a time sharing basis at the predetermined constant transfer rate Rp higher than the transfer rates R1–Rn. The optical head 114 records the "n" information signals on the areas 113(1)–113(n) in the optical disc 113 on a time sharing basis, respectively.

The optical disc 113 is previously provided with the first area 113(1) divided into the sub-areas for storing the respective blocks of the first information signal. The sub-areas in the first area 113(1) have the predetermined size Y1. In addition, the optical disc 113 is previously provided with the second area 113(2) divided into the sub-areas for storing the respective blocks of the second information signal. The sub-areas in the second area 113(2) have the predetermined size Y2. Similarly, the optical disc 113 is previously provided with the third and later areas 113(3) . . . for storing the third and later information signals. Furthermore, the optical disc 113 is previously provided with the n-th area 113(n) divided into the sub-areas for storing the respective blocks of the n-th information signal. The sub-areas in the n-th area 113(n) have the predetermined size Yn. In addition, the optical disc 113 has the management area 113x loaded with the management information representing the locations and conditions of the sub-areas in the areas 113(1)–113(n). Unoccupied regions in the optical disc 113 can be detected from the management information.

During the multiple-signal recording mode of operation of the apparatus 110, the audio-video encoding and decoding unit 120 encodes "n" original signals into the "n" information signals respectively. The "n" information signals are transferred from the audio-video encoding and decoding unit 120 to the track buffer memory 119 at the rates R1–Rn, respectively. The rates R1–Rn of the transfer of the "n" information signals from the audio-video encoding and decoding unit 120 to the track buffer memory 119 can be selected from among different values according to user's operation of the key input unit 123. The different values include a transfer rate of 8 Mbps which corresponds to a recording time of 2 hours and a high picture quality, a transfer rate of 4 Mbps which corresponds to a recording time of 4 hours and a slightly high picture quality, and a transfer rate of 2 Mbps which corresponds to a recording time of 8 hours and a normal picture quality. A transfer rate of 17 Mbps may be added to the candidate values. The "n" information signals are temporarily stored in the areas 119(1)–119(n) in the track buffer memory 119, respectively. At an initial stage, the optical head 114 is in a stand-by state or a kick wait state while being located at a position corresponding to a target track on the optical disc 113. The system controller 122 always monitors the degree of occupancy of each of the memory areas 119(1)–119(n) which varies between the related empty value and the related full value under normal conditions. When the degrees of occupancy of the memory areas 119(1)–119(n) reach the related full values, the "n" information signals start to be read out from the memory areas 119(1)–119(n) on a time sharing basis and at the predetermined constant transfer rate Rp higher than the transfer rates R1–Rn. The optical head 114 records the "n" read-out information signals on the areas 113(1)–113(n) of the optical disc 113 respectively on a time sharing basis and at the predetermined constant transfer rate Rp. In this way, the continuously recording of the original signals is implemented.

When the multiple-signal recording mode of operation is started, the optical head 114 reproduces management information from the management area 113x in the optical disc 113. The reproduced management information is transmitted from the optical head 114 to the system controller 122. The system controller 122 detects unoccupied regions in the areas 113(1)–113(n) of the optical disc 113 from the management information. Then, the optical head 114 is moved to a position corresponding to the sub-area A1 in the first area 113(1) of the optical disc 113 provided that the sub-area A1 is found to be unoccupied. On the other hand, the first information signal is transmitted from the audio-video encoding and decoding unit 120 to the track buffer memory 119, and is stored into the first area 119(1) of the track buffer memory at the transfer rate R1.

Figure 24:
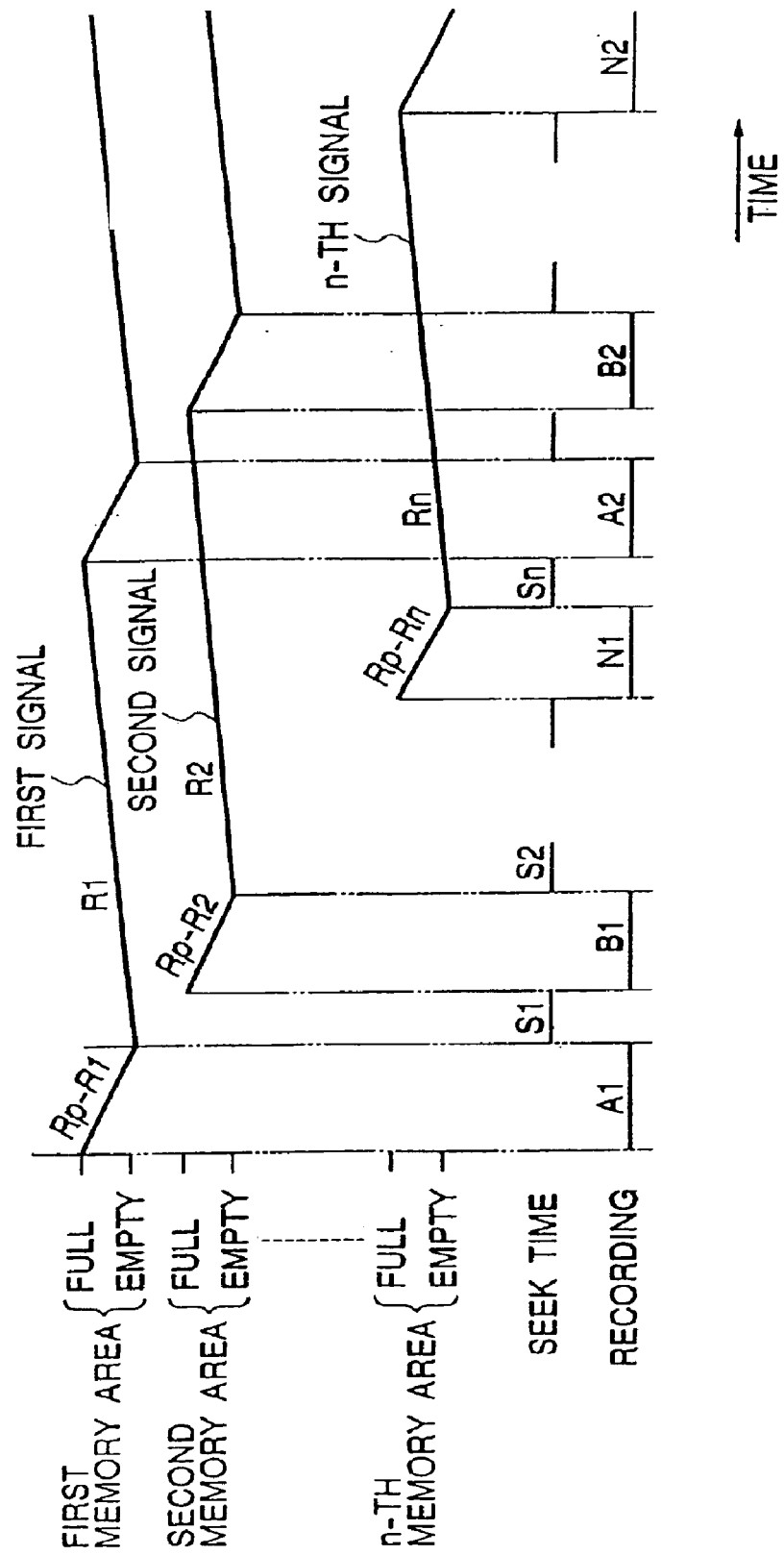
FIG. 24 is a time-domain diagram of the degrees of occupancy of the areas in the track buffer memory in FIG. 17 which occur in a multiple-signal recording mode of operation.

As shown in FIG. 24, after the degree of occupancy of the first area 119(1) in the track buffer memory 119 reaches the related full value, the first information signal is transmitted from the memory area 119(1) to the sub-area A1 in the optical disc 113 via the optical head 114 at the predetermined constant transfer rate Rp and the first information signal is stored into the memory area 119(1) from the audio-video encoding and decoding unit 120 at the transfer rate R1. Thus, during this stage, the degree of occupancy of the memory area 119(1) decreases at a rate corresponding to "Rp−R1".

When the degree of occupancy of the memory area 119(1) reaches the related empty value, the transmission of the first information signal from the memory area 119(1) to the sub-area A1 in the optical disc 113 is suspended. Then, the optical head 114 is moved to a position corresponding to the sub-area B1 in the second area 113(2) of the optical disc 113 provided that the sub-area B1 is found to be unoccupied. The seek time S1 related to this movement of the optical head 114 is equal to or shorter than 1.5 seconds. The second information signal is stored into the second area 119(2) of the track buffer memory 119 from the audio-video encoding and decoding unit 120 at the transfer rate R2. Even after the degree of occupancy of the memory area 119(1) reaches the related empty value, the first information signal continues to be stored into the memory area 119(1) from the audio-video encoding and decoding unit 120 at the transfer rate R1. Thus, during this stage, the degree of occupancy of the memory area 119(1) increases at a rate corresponding to "R1". The degree of occupancy of the memory area 119(1) reaches the related full value before the optical head 114 accesses the sub-area A2 in the first area 113(1) of the optical disc 113.

After the degree of occupancy of the second area 119(2) in the track buffer memory 119 reaches the related full value, the second information signal is transmitted from the memory area 119(2) to the sub-area B1 in the optical disc 113 via the optical head 114 at the predetermined constant transfer rate Rp and the second information signal continues to be stored into the memory area 119(2) from the audio-video encoding and decoding unit 120 at the transfer rate R2. Thus, during this stage, the degree of occupancy of the memory area 119(2) decreases at a rate corresponding to "Rp–R2".

When the degree of occupancy of the memory area 119(2) reaches the related empty value, the transmission of the second information signal from the memory area 119(2) to the sub-area B1 in the optical disc 113 is suspended. Then, the optical head 114 is moved to a position corresponding to the first sub-area in the third area 113(3) of the optical disc 113 provided that the first sub-area is found to be unoccupied. The seek time S2 related to this movement of the optical head 114 is equal to or shorter than 1.5 seconds. Even after the degree of occupancy of the memory area 119(2) reaches the related empty value, the second information signal continues to be stored into the memory area 119(2) from the audio-video encoding and decoding unit 120 at the transfer rate R2. Thus, during this stage, the degree of occupancy of the memory area 119(2) increases at a rate corresponding to "R2". The degree of occupancy of the memory area 119(2) reaches the related full value before the optical head 114 accesses the sub-area B2 in the second area 113(2) of the optical disc 113.

The above-mentioned sequence of steps is iterated while the third and later information signals are stored into the third and later areas 119(3)–119(n) of the track buffer memory 119 from the audio-video encoding and decoding unit 120 at the transfer rates R3–Rn. In addition, the third and later information signals are transmitted from the third and later areas 119(3)–119(n) of the track buffer memory 119 to the optical head 114 at the predetermined constant transfer rate Rp on a time sharing basis. The optical head 114 sequentially records the third and later information signals on the first sub-areas in the third and later areas 113(3)–113(n) of the optical disc 113. After the recording of the n-th information signal on the sub-area N1 in the n-th area 113(n) of the optical disc 113 is completed, the optical head 114 is moved to a position corresponding to the sub-area A2 in the first area 113(1) of the optical disc 113 provided that the sub-area A2 is found to be unoccupied. During a subsequent term, such processes are iterated. Thus, the "n" original signals inputted into the audio-video encoding and decoding unit 120 are continuously recorded while the optical head 114 sequentially accesses the sub-areas in the areas 113(1)–113(n) of the optical disc 113 in the order as "A1, B1, . . . , N1, A2, B2, . . . , N2, . . . ". During the multiple-signal recording mode of operation of the apparatus 110, the previously-indicated parameters satisfy the relations (31)–(48).

In general, after the recording of the "n" information signals on the optical disc 113 has been completed, information of the transfer rates R1–Rn is recorded on the management area 113x of the optical disc 113 via the optical head 114.

Signal Recording/Playback Mode

A signal recording/playback mode of operation of the apparatus 110 is executed in the case where the optical disc 113 is of the rewritable type. During the signal recording/playback mode of operation, the optical head 114 reproduces at least one information signal from first one of the areas 113(1)–113(n) in the optical disc 113 and records at least one information signal on second one of the areas 113(1)–113(n) in the optical disc 113 on a time sharing basis. The reproduced information signal is transmitted from the optical disc 114 to the track buffer memory 119. The reproduced information signal is written into corresponding one of the areas 119(1)–119(n) in the track buffer memory 119 at the predetermined constant transfer rate Rp. The reproduced information signal is transmitted from the track buffer memory 119 to the audio-video encoding and decoding unit 120 at corresponding one of the transfer rates R1–Rn. On the other hand, at least one information signal to be recorded is transmitted to the track buffer memory 119 from the audio-video encoding and decoding unit 120. The recorded information signal is written into corresponding one of the areas 119(1)–119(n) in the track buffer memory 119 at corresponding one of the transfer rates R1–Rn. The recorded information signal is transmitted from the track buffer memory 119 to the optical head 114 at the predetermined constant transfer rate Rp. The optical head 114 records the transmitted information signal on corresponding one of the areas 113(1)–113(n) in the optical disc 113.

During the signal recording/playback mode of operation, each of the seek times S1–Sn related to the optical head 114 is equal to or shorter than 1.5 seconds. In addition, the previously-indicated parameters satisfy the relations (31)–(48).

It should be noted that the "n" information signals to be recorded or reproduced may be ranked according to priority. In the case where a seek error occurs or the transfer rates R1–Rn are changed so that the relations (31)–(48) become unsatisfied, low-priority information signals may be discarded or disregarded to maintain continuous recording or continuous playback of the contents of high-priority information signals.

It should be noted that the apparatus 110 in FIG. 17 may be divided into an optical disc drive, a solid-state memory unit, and another unit. The solid-state memory unit is detachably connected with the optical disc drive. Specifically, the solid-state memory unit is connected with the optical disc drive via a disconnectable connector. The optical disc drive includes the spindle motor 111, the turntable 112, the optical head 114, the driver 115, the amplifier unit 116, and the servo unit 117. The solid-state memory unit includes the signal processor 118, the track buffer memory 119, and the system controller 122. When the solid-state memory unit is disconnected from the optical disc drive, at least one of "n" information signals in the track buffer memory 119 can be played back via the signal processor 118 and the audio-video encoding and decoding unit 120.

Sixth Embodiment

Figure 25:
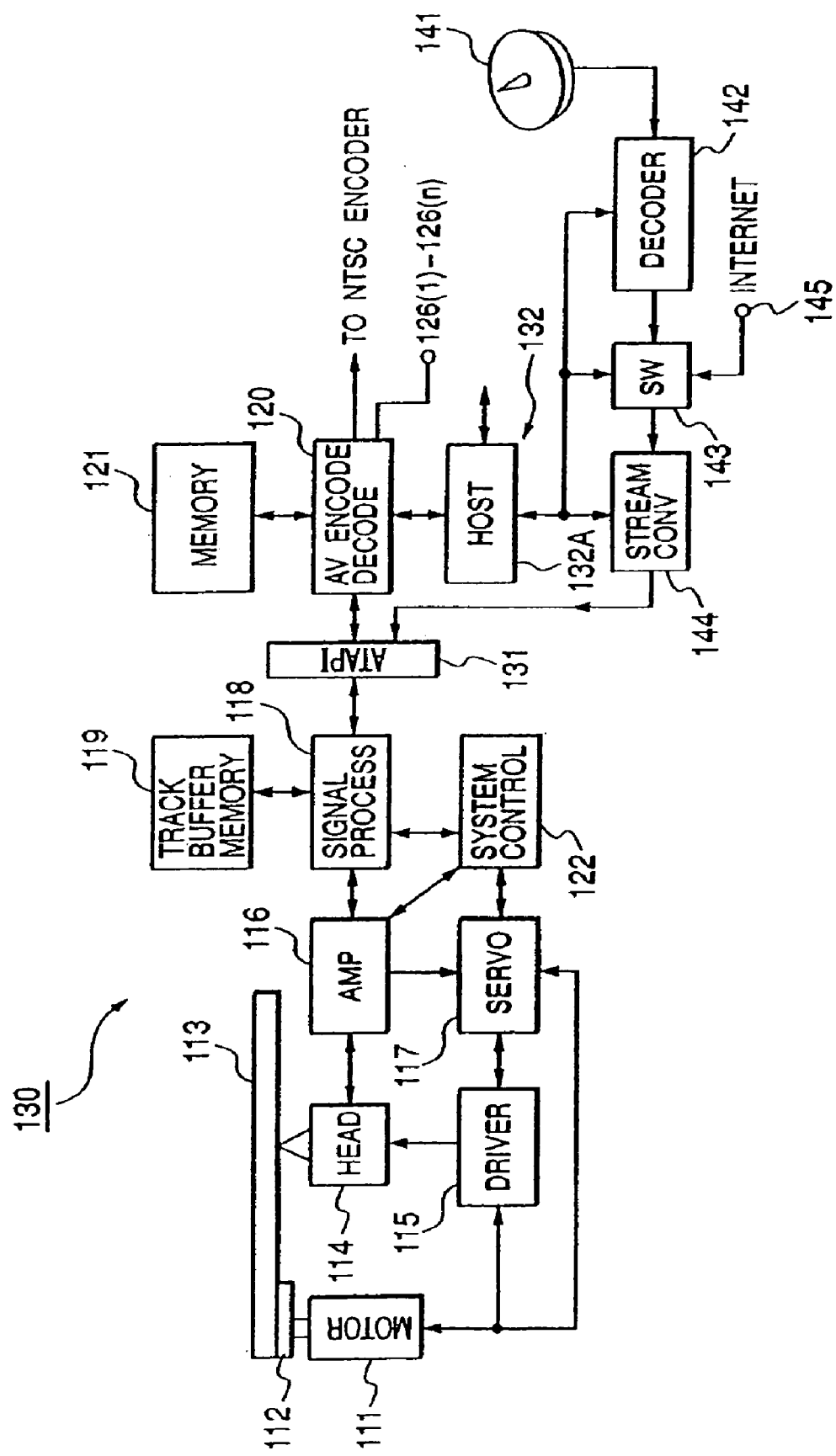
FIG. 25 is a block diagram of an information-signal communication apparatus according to a sixth embodiment of this invention.

FIG. 25 shows an information-signal communication apparatus 130 according to a sixth embodiment of this invention. The apparatus 130 in FIG. 25 is similar to the apparatus 110 in FIG. 17 except for design changes indicated hereinafter.

The apparatus 130 in FIG. 25 includes a spindle motor 111, a turntable 112, an optical head (an optical pickup) 114, a driver 115, an amplifier unit 116, a servo unit 117, a signal processor 118, a track buffer memory 119, and a system controller 122. The devices 111, 112, 114, 115, 116, 117, 118, 119, and 122 are connected in a manner similar to that in the apparatus 110 in FIG. 17. The apparatus 130 in FIG. 25 further includes an ATAPI (AT attachment packet interface) unit 131, that is, an interface 131 of an ATAPI type. The interface 131 is connected to the signal processor 118.

A host computer or an external apparatus 132 can be connected with the apparatus 130 in FIG. 25 via the interface 131. The external apparatus 132 includes an audio-video encoding and decoding unit 120, a memory 121, and a host computer unit 132A. The memory 121 and the host computer unit 132A are connected to the audio-video encoding and decoding unit 120. The audio-video encoding and decoding unit 120 can be connected with the signal processor 118 in the apparatus 130 via the interface 131.

A satellite digital broadcasting reception antenna 141 is connected to a satellite digital broadcasting decoder 142. The satellite digital broadcasting decoder 142 is connected to a switch 143. A switch 143 is connected to a stream converter 144. The switch 143 is connected to the Internet via a terminal 145. The stream converter 144 can be connected with the signal processor 118 in the apparatus 130 via the interface 131. The satellite digital broadcasting decoder 142, the switch 143, the stream converter 144, and the host computer unit 132A are connected to each other.

In more detail, the ATAPI unit 131 includes an interface block. The audio-video encoding and decoding unit 120 includes an interface block which can be connected with the interface block in the ATAPI unit 131. The stream converter 144 includes an interface block which can be connected with the interface block in the ATAPI unit 131. The apparatus 132 can control the apparatus 130 while using control signals in the Mt. Fuji command system. The host computer unit 132A can control the switch 143.

In the case where "n" information signals are required to be recorded, the host computer unit 132A in the apparatus 132 transmits information of transfer rates R1–Rn for the "n" information signals (transfer-rate representing flags) to the apparatus 130 via the audio-video encoding and decoding unit 120 and the interface 131. The audio-video encoding and decoding unit 120 in the apparatus 132 transmits the "n" information signals to the signal processor 118 in the apparatus 130 via the interface 131. In addition, the host computer unit 132A in the apparatus 132 transmits a recording start command signal and a recording start address signal to the apparatus 130 via the audio-video encoding and decoding unit 120 and the interface 131.

In the case where "n" information signals are required to be reproduced from an optical disc 113, the host computer unit 132A in the apparatus 132 transmits a playback start command signal and a disc address signal to the apparatus 130 via the audio-video encoding and decoding unit 120 and the interface 131. The apparatus 130 reproduces a signal (for example, control data or management information) from a portion of the optical disc 113 whose position is designated by the disc address signal. The host computer unit 132A in the apparatus 132 receives the reproduced signal from the apparatus 130 via the interface 131 and the audio-video encoding and decoding unit 120, and calculates transfer rates R1–Rn on the basis of the reproduced signal. The host computer unit 132A in the apparatus 132 transmits information of the calculated transfer rates R1–Rn (transfer-rate representing flags) to the apparatus 130 via the audio-video encoding and decoding unit 120 and the interface 131. Then, the apparatus 130 reproduces the "n" information signals while using the transfer rates R1–Rn.

The interface 131 may be of an IEEE1394 type rather than the ATAPI type. The interface 131 may be of a wireless type using a radio signal or a light signal.

It should be noted that the apparatus 130 in FIG. 25 may be divided into an optical disc drive, a solid-state memory unit, and a second unit. The solid-state memory unit is detachably connected with the optical disc drive and the interface 131 in the second unit. Specifically, the solid-state memory unit is connected with the optical disc drive and the interface 131 via disconnectable connectors. The optical disc drive includes the spindle motor 111, the turntable 112, the optical head 114, the driver 115, the amplifier unit 116, and the servo unit 117. The solid-state memory unit includes the signal processor 118, the track buffer memory 119, and the system controller 122. When the solid-state memory unit is disconnected from the optical disc drive, at least one of "n" information signals in the track buffer memory 119 can be played back via the signal processor 118 and the audio-video encoding and decoding unit 120.

Seventh Embodiment

A seventh embodiment of this invention is similar to the fifth embodiment or the sixth embodiment thereof except for design changes mentioned later.

During a recording mode of operation, the system controller 122 periodically checks whether or not the relation (41) is satisfied. When the system controller 122 finds that the relation (41) is not satisfied, the system controller 122 selects one of first, second, third, and fourth recording procedures and implements the selected recording procedure.

According to the first recording procedure, when the relation (41) is not satisfied, two or more information signals are selected from among "n" information signals. Non-selected information signals are discarded or disregarded. With respect to the selected information signals, a decision is made as to whether or not the relation (41) is satisfied. In the case where the relation (41) is satisfied, the selected information signals are stored into corresponding ones of the areas 119(1)–119(n) in the track buffer memory 119 respectively. The selected information signals are transferred from the track buffer memory 119 to the optical head 114 on a time sharing basis. The optical head 114 records the selected information signals on corresponding ones of the areas 113(1)–113(n) in the optical disc 113 respectively. When being recorded, the selected information signals may be weighted in response to the differences among the transfer rates for the selected information signals, the channel position, or the genres of the contents of the selected information signals on an automatic basis or a user's setting basis. The non-selected information signals are inhibited from being stored into the track buffer memory 119.

Figure 26:
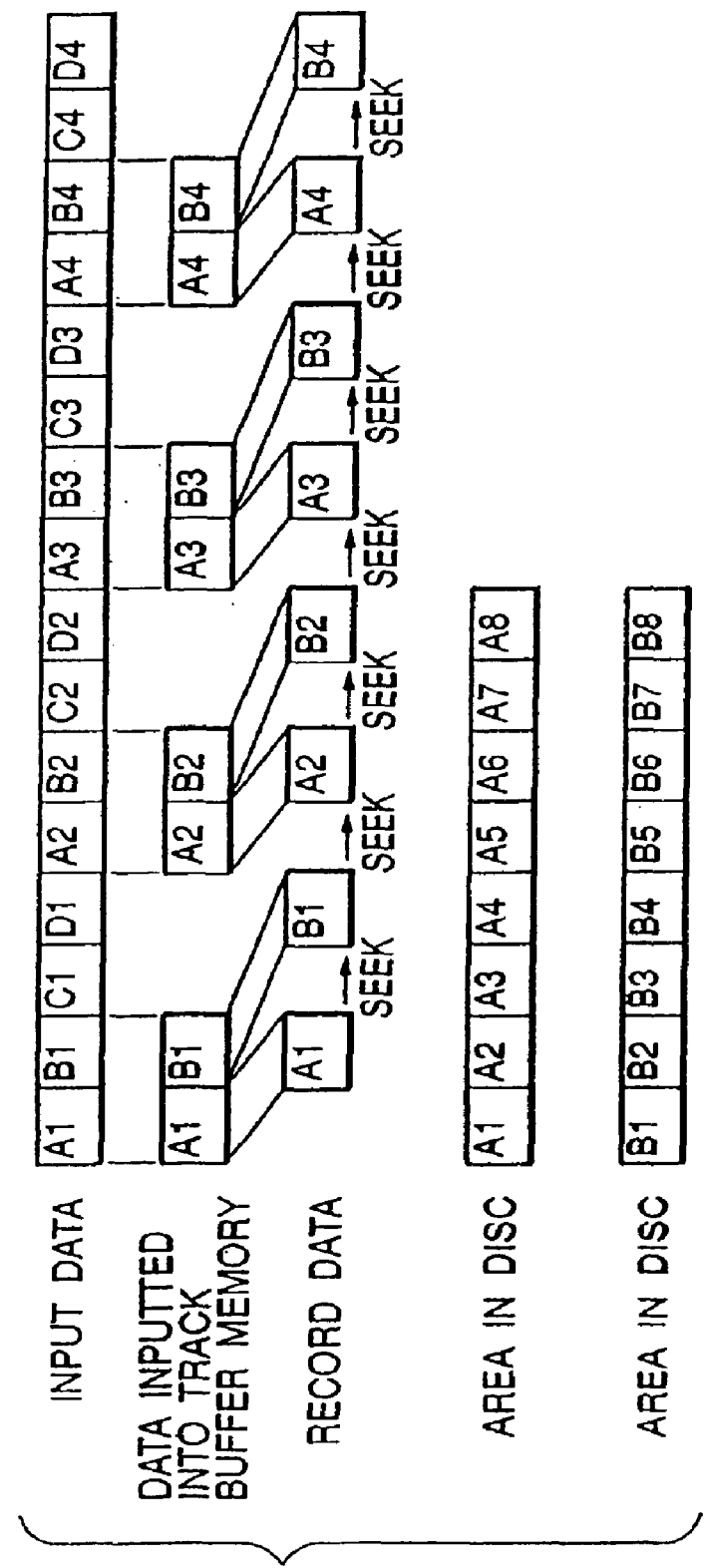
FIG. 26 is a time-domain diagram of conditions of information signals which occur during a first recording procedure in a seventh embodiment of this invention.

With reference to FIG. 26, four information signals "A", "B", "C", and "D" compose input data. The information signal "A" is divided into blocks A1, A2, . . . . The information signal "B" is divided into blocks B1, B2, . . . . The information signal "C" is divided into blocks C1, C2, . . . . The information signal "D" is divided into blocks D1, D2, . . . . The blocks of the four information signals are multiplexed into the input data in the order as "A1, B1, C1, D1, A2, B2, . . . ".

According to the first recording procedure, when the relation (41) is not satisfied, two information signals "A" and "B" are selected from among the four information signals. Regarding the selected information signals "A" and "B", a decision is made as to whether or not the relation (41)

is satisfied. In the case where the relation (41) is satisfied, the selected information signals are stored into corresponding ones of the areas 119(1)–119(n) in the track buffer memory 119 respectively. The non-selected information signals "C" and "D" are inhibited from being stored into the track buffer memory 119. The selected information signals "A" and "B" are alternately transferred from the track buffer memory 119 to the optical head 114 on a time sharing basis. The optical head 114 records the selected information signals "A" and "B" on corresponding ones of the areas 113(1)–113(n) in the optical disc 113 respectively. Specifically, the optical head 114 records the block A1 of the information signal "A" on first one of the disc areas 113(1)–113(n). Then, the optical head 114 executes seek and moves from first one to second one of the disc areas 113(1)–113(n). The optical head 114 records the block B1 of the information signal "B" on second one of the disc areas 113(1)–113(n). Then, the optical head 114 executes seek and moves from second one to first one of the disc areas 113(1)–113(n). The optical head 114 records the block A2 of the information signal "A" on first one of the disc areas 113(1)–113(n). Such steps are reiterated. Accordingly, the blocks A1, A2, ... of the information signal "A" are sequentially stored into first one of the disc areas 113(1)–113(n). The blocks B1, B2, ... of the information signal "B" are sequentially stored into second one of the disc areas 113(1)–113(n).

According to the second recording procedure, when the relation (41) is not satisfied, two or more information signals are selected from among "n" information signals. The selected information signals are referred to as the first selected information signals. Non-selected information signals are discarded or disregarded. Two of the first selected information signals are combined into one selected information signal. This selected information signal and the remaining first selected information signal or signals are referred to as the second selected information signals. With respect to the second selected information signals, a decision is made as to whether or not the relation (41) is satisfied. In the case where the relation (41) is satisfied, the first selected information signals are stored into corresponding ones of the areas 119(1)–119(n) in the track buffer memory 119 respectively. The first selected information signals are transferred from the track buffer memory 119 to the optical head 114 on a time sharing basis while two of the first selected information signals are combined into one selected information signal. Thus, the optical head 114 receives the second selected information signals from the track buffer memory 119. The optical head 114 records the second selected information signals on ones of the areas 113(1)–113(n) in the optical disc 113 respectively.

Figure 27:
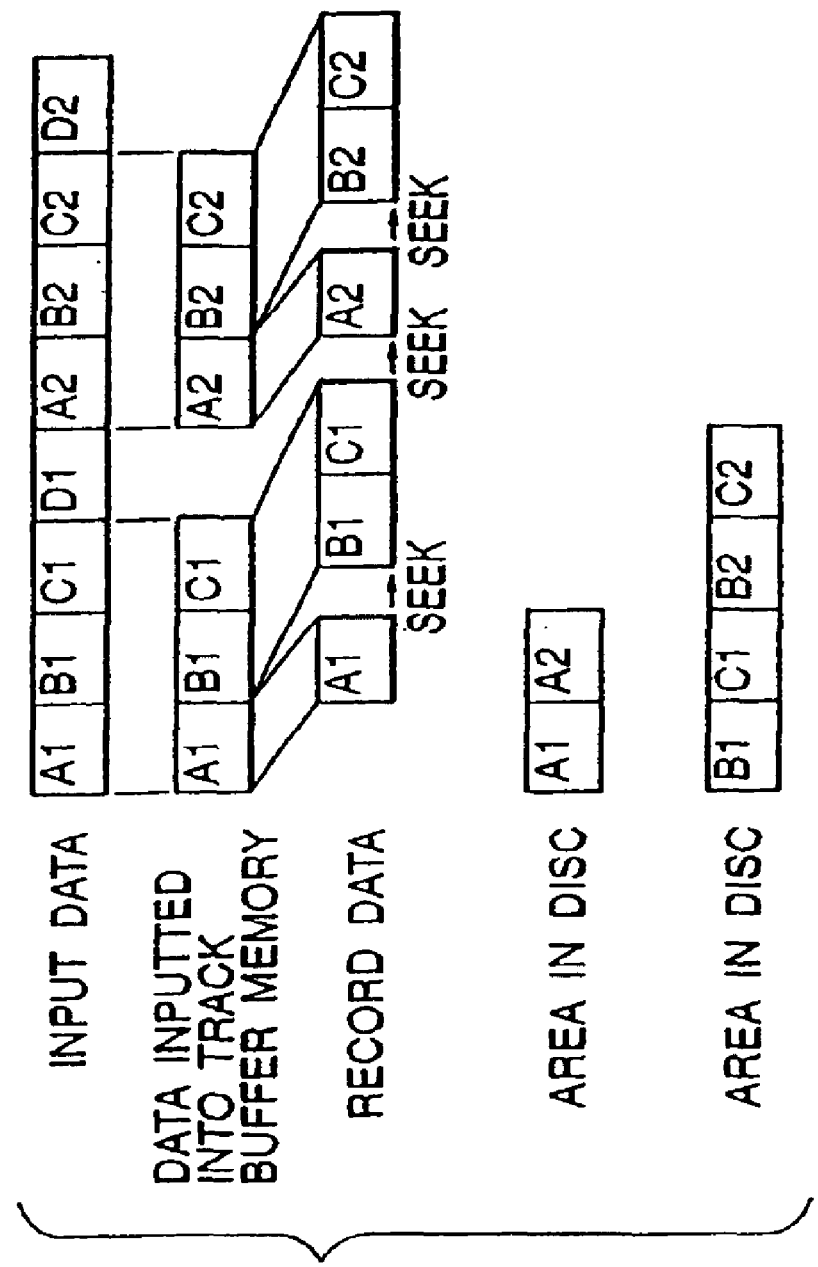
FIG. 27 is a time-domain diagram of conditions of information signals which occur during a second recording procedure in the seventh embodiment of this invention.

With reference to FIG. 27, four information signals "A", "B", "C", and "D" compose input data. The information signal "A" is divided into blocks A1, A2, . . . . The information signal "B" is divided into blocks B1, B2, . . . . The information signal "C" is divided into blocks C1, C2, . . . . The information signal "D" is divided into blocks D1, D2, . . . . The blocks of the four information signals are multiplexed into the input data in the order as "A1, B1, C1, D1, A2, B2, . . . ".

According to the second recording procedure, when the relation (41) is not satisfied, three information signals "A", "B", and "C" are selected from among the four information signals. The selected information signals "B" and "C" are combined into and handled as one selected information signal "B+C". Regarding the selected information signals "A" and "B+C", a decision is made as to whether or not the relation (41) is satisfied. In the case where the relation (41) is satisfied, the selected information signals "A", "B", and "C" (the selected information signals "A" and "B+C") are stored into corresponding ones of the areas 119(1)–119(n) in the track buffer memory 119 respectively. The non-selected information signal "D" is inhibited from being stored into the track buffer memory 119. The selected information signals "A" and "B+C" are alternately transferred from the track buffer memory 119 to the optical head 114 on a time sharing basis. The optical head 114 records the selected information signals "A" and "B+C" on ones of the areas 113(1)–113(n) in the optical disc 113. Specifically, the optical head 114 records the block A1 of the information signal "A" on first one of the disc areas 113(1)–113(n). Then, the optical head 114 executes seek and moves from first one to second one of the disc areas 113(1)–113(n). The optical head 114 records the blocks B1 and C1 of the information signals "B" and "C" on second one of the disc areas 113(1)–113(n). Then, the optical head 114 executes seek and moves from second one to first one of the disc areas 113(1)–113(n). The optical head 114 records the block A2 of the information signal "A" on first one of the disc areas 113(1)–113(n). Such steps are reiterated. Accordingly, the blocks A1, A2, ... of the information signal "A" are sequentially stored into first one of the disc areas 113(1)–113(n). The blocks B1, C1, B2, C2, . . . of the information signals "B" and "C" are sequentially stored into second one of the disc areas 113(1)–113(n). This design results in a reduction of the total seek time related to the optical head 114.

According to the third recording procedure, when the relation (41) is not satisfied, "n" information signals are stored into corresponding ones of the areas 119(1)–119(n) in the track buffer memory 119 respectively. The "n" information signals are transferred from the track buffer memory 119 to the optical head 114 on a time sharing basis. The optical head 114 records the "n" information signals on one common area (for example, one of the areas 113(1)–113(n)) in the optical disc 113. Since the optical head 114 does not move among the areas 113(1)–113(n) in the optical disc 113, the total seek time related to the optical head 114 can be reduced.

Figure 28:
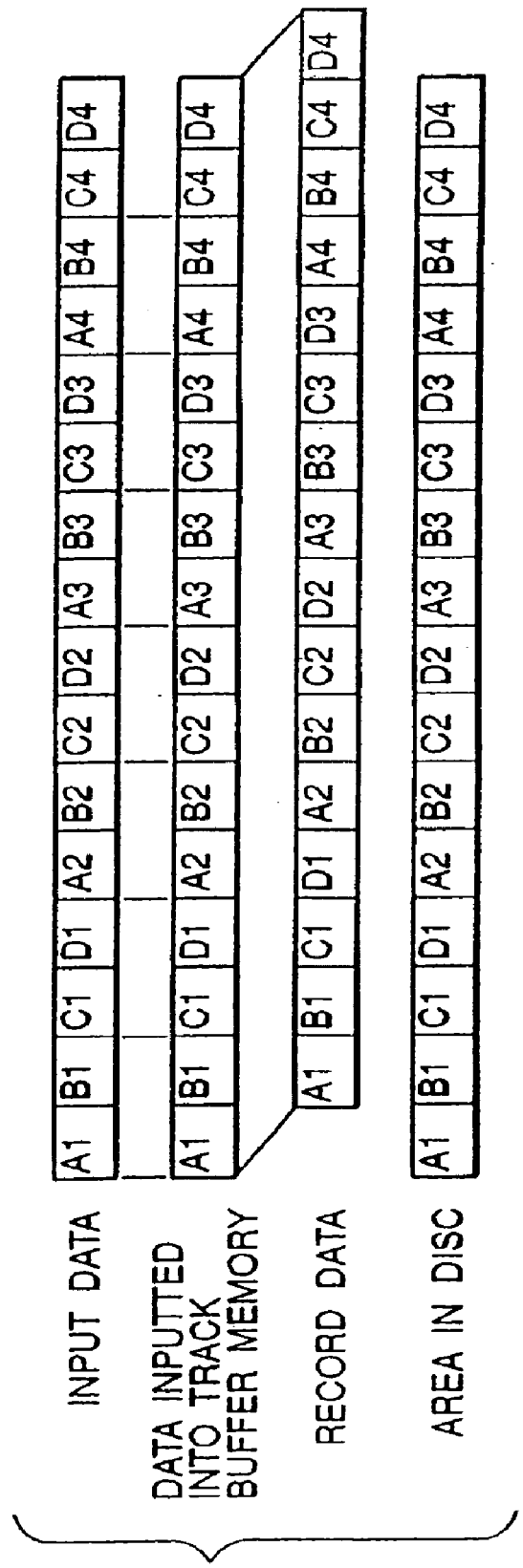
FIG. 28 is a time-domain diagram of conditions of information signals which occur during a third recording procedure in the seventh embodiment of this invention.

With reference to FIG. 28, four information signals "A", "B", "C", and "D" compose input data. The information signal "A" is divided into blocks A1, A2, . . . . The information signal "B" is divided into blocks B1, B2, . . . . The information signal "C" is divided into blocks C1, C2, . . . . The information signal "D" is divided into blocks D1, D2, . . . . The blocks of the four information signals are multiplexed into the input data in the order as "A1, B1, C1, D1, A2, B2, . . . ".

According to the third recording procedure, when the relation (41) is not satisfied, the four information signals "A", "B", "C", and "D" are stored into corresponding ones of the areas 119(1)–119(n) in the track buffer memory 119 respectively. The four information signals "A", "B", "C", and "D" are transferred from the track buffer memory 119 to the optical head 114 on a time sharing basis. The optical head 114 records the four information signals "A", "B", "C", and "D" on one common area (for example, one of the areas 113(1)–113(n)) in the optical disc 113. Specifically, the optical head 114 sequentially records the blocks of the information signals "A", "B", "C", and "D" on the common disc area in the order as "A1, B1, C1, D1, A2, B2, . . . ".

According to the fourth recording procedure, when the relation (41) is not satisfied, "n" information signals are stored into corresponding ones of the areas 119(1)–119(n) in the track buffer memory 119 respectively. Each of the memory areas 119(1)–119(n) can store two or more blocks of the related information signal. Plural block cycles of the "n" information signals are held in the track buffer memory 119. The "n" information signals are transferred from the track buffer memory 119 to the optical head 114 on a time sharing basis. The order in which the blocks of the "n" information signals are read out from the track buffer memory 119 differs from that occurring in the writing into the track buffer memory 119. In other words, the blocks of the "n" information signals are rearranged by the track buffer memory 119. The optical head 114 records the "n" information signals on one common area (for example, one of the areas 113(1)–113(n)) in the optical disc 113. Since the optical head 114 does not move among the areas 113(1)–113(n) in the optical disc 113, the total seek time related to the optical head 114 can be reduced.

Figure 29:
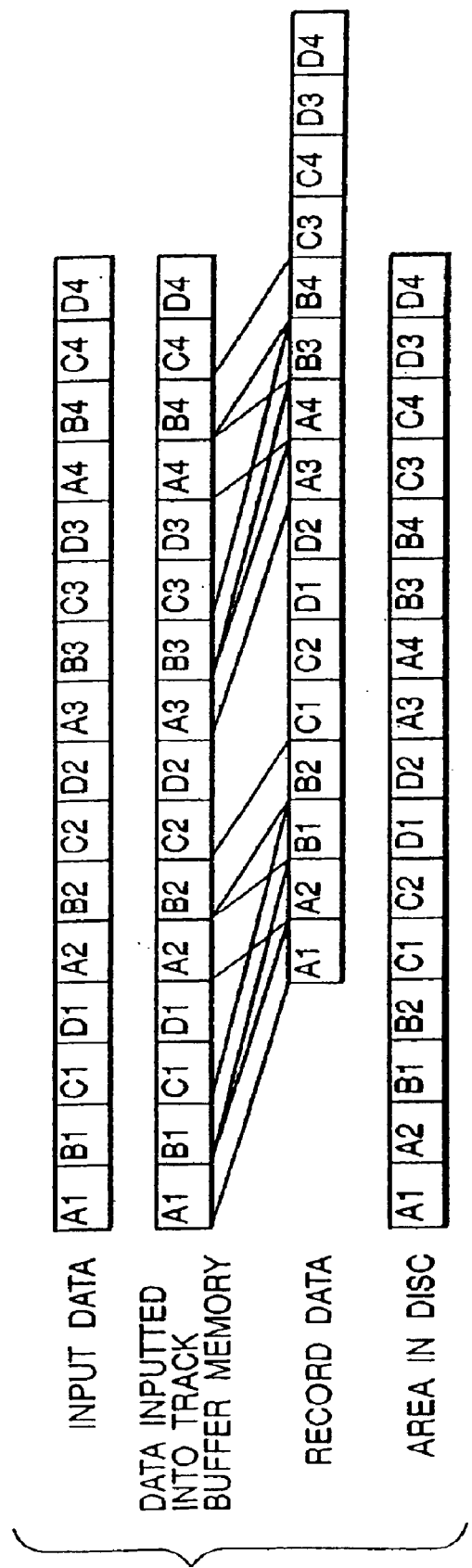
FIG. 29 is a time-domain diagram of conditions of information signals which occur during a fourth recording procedure in the seventh embodiment of this invention.

With reference to FIG. 29, four information signals "A", "B", "C", and "D" compose input data. The information signal "A" is divided into blocks A1, A2, . . . . The information signal "B" is divided into blocks B1, B2, . . . . The information signal "C" is divided into blocks C1, C2, . . . . The information signal "D" is divided into blocks D1, D2, . . . . The blocks of the four information signals are multiplexed into the input data in the order as "A1, B1, C1, D1, A2, B2, . . . ".

According to the fourth recording procedure, when the relation (41) is not satisfied, the four information signals "A", "B", "C", and "D" are stored into corresponding ones of the areas 119(1)–119(n) in the track buffer memory 119 respectively. The blocks of the four information signals "A", "B", "C", and "D" are sequentially written into the track buffer memory 119 in the order as "A1, B1, C1, D1, A2, B2, . . . ". Plural block cycles of the "n" information signals are held in the track buffer memory 119. The four information signals "A", "B", "C", and "D" are transferred from the track buffer memory 119 to the optical head 114 on a time sharing basis. The track buffer memory 119 rearranges the blocks of the four information signals "A", "B", "C", and "D". Specifically, the blocks of the four information signals "A", "B", "C", and "D" are sequentially read out from the track buffer memory 119 in the order as "A1, A2, B1, B2, C1, C2, D1, D2, A3, A4, . . . ". The optical head 114 records the four information signals "A", "B", "C", and "D" on one common area (for example, one of the areas 113(1)–113(n)) in the optical disc 113. Specifically, the optical head 114 sequentially records the blocks of the information signals "A", "B", "C", and "D" on the common disc area in the order as "A1, A2, B1, B2, C1, C2, D1, D2, A3, A4, . . . ".

One recording procedure is selected from among the first, second, third, and fourth recording procedures in response to the result of calculation concerning the relation (41) or in response to user's requirement. Conditions of the selection include the following conditions ①, ②, ③, ④, ⑤, and ⑥.

① Regarding the "n" information signals, a decision is made as to whether or not the relation (41) is satisfied. When it is decided that the relation (41) is not satisfied, at least two of the "n" information signals are selected. Regarding the selected information signals, a decision is made as to whether or not the relation (41) is satisfied. When it is decided that the relation (41) is satisfied, the first or second recording procedure is selected. On the other hand, when it is decided that the relation (41) is not satisfied, the third or fourth recording procedure is selected.

② At an initial stage, the user selects one from among the first, second, third, and fourth recording procedures by operating the key input unit 123. For example, in the case where the first recording procedure is initially selected, a decision is made as to whether or not the relation (41) is satisfied. When it is decided that the relation (41) is satisfied, the system controller 122 controls the display 125 via the audio-video encoding and decoding unit 120 and the NTSC encoder 124 to indicate that the first, second, third, and fourth recording procedures are selectable. Then, the user finally selects one from among the first, second, third, and fourth recording procedures. On the other hand, when it is decided that the relation (41) is not satisfied, the system controller 122 controls the display 125 via the audio-video encoding and decoding unit 120 and the NTSC encoder 124 to indicate that the third and fourth recording procedures are selectable. Then, the user finally selects one from among the third and fourth recording procedures.

③ One recording procedure is automatically selected from among the first, second, third, and fourth recording procedures in response to the types of the "n" information signals or the types of the signal sources. When the "n" information signals are fed from the audio-video encoding and decoding unit 120, the first or second recording procedure is selected. When the "n" information signals are "n" compression-resultant information signals composing a transport stream signal and transmitted from the satellite or the Internet, the third or fourth recording procedure is selected. The signal recording may be responsive to the differences among the transfer rates for the information signals, the channel position, or the genres of the contents of the information signals on a user's setting basis.

④ When the apparatus is driven by an AC power supply, the first or second recording procedure is selected. When the apparatus is driven by a battery, the third or fourth recording procedure is selected. The track buffer memory 119 may be replaceable. When the capacity of the track buffer memory 119 exceeds a reference value, the first or second recording procedure is selected. When the capacity of the track buffer memory 119 does not exceed the reference value, the third or fourth recording procedure is selected.

⑤ The system controller 122 detects the type of the optical disc 113. When the optical disc 113 is a DVD-RAM, the first or second recording procedure is selected. When the optical disc 113 is a DVD-RW, the third or fourth recording procedure is selected.

⑥ The management information is reproduced from the management area 113x in the optical disc 113. The system controller 122 decides the conditions of unoccupied regions in the optical disc 113 on the basis of the reproduced management information. In the presence of unoccupied regions greater in size than a reference value, the first or second recording procedure is selected. In the absence of such great unoccupied regions, the third or fourth recording procedure is selected.

Eighth Embodiment

Figure 30:
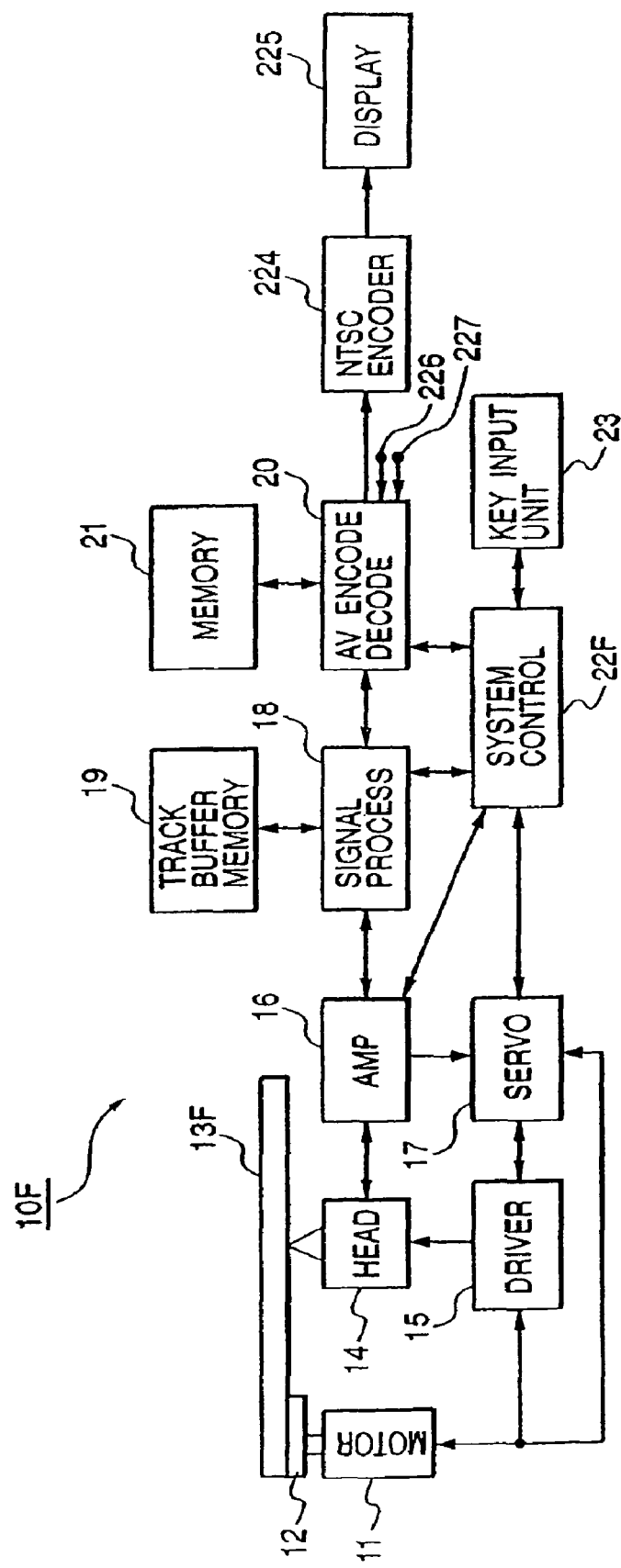
FIG. 30 is a block diagram of an information-signal recording and reproducing apparatus according to an eighth embodiment of this invention.

FIG. 30 shows an information-signal recording and reproducing apparatus 10F according to an eighth embodiment of this invention. The apparatus 10F in FIG. 30 is similar to the apparatus 10A in FIG. 1 except for design changes indicated hereinafter.

The apparatus 10F in FIG. 30 includes an NTSC encoder 224 and a display 225. The NTSC encoder 224 is connected to an audio-video encoding and decoding unit 20. The display 225 is connected to the NTSC encoder 224. The apparatus 10F in FIG. 30 includes a system controller 22F which replaces the system controller 22 (see FIG. 1). Original information signals for a first information signal "A" and a second information signal "B" can be fed to the audio-video encoding and decoding unit 20 via input terminals 226 and 227, respectively.

During a playback mode of operation of the apparatus 10F, the audio-video encoding and decoding unit 20 outputs an analog audio signal and an analog video signal to the NTSC converter 224. The analog audio signal passes through the NTSC converter 224 before being applied to loudspeakers provided in the body of the display 225. The NTSC converter 224 changes the analog video signal into a corresponding NTSC video signal. The NTSC converter 224 outputs the NTSC video signal to the display 225.

Figure 31:
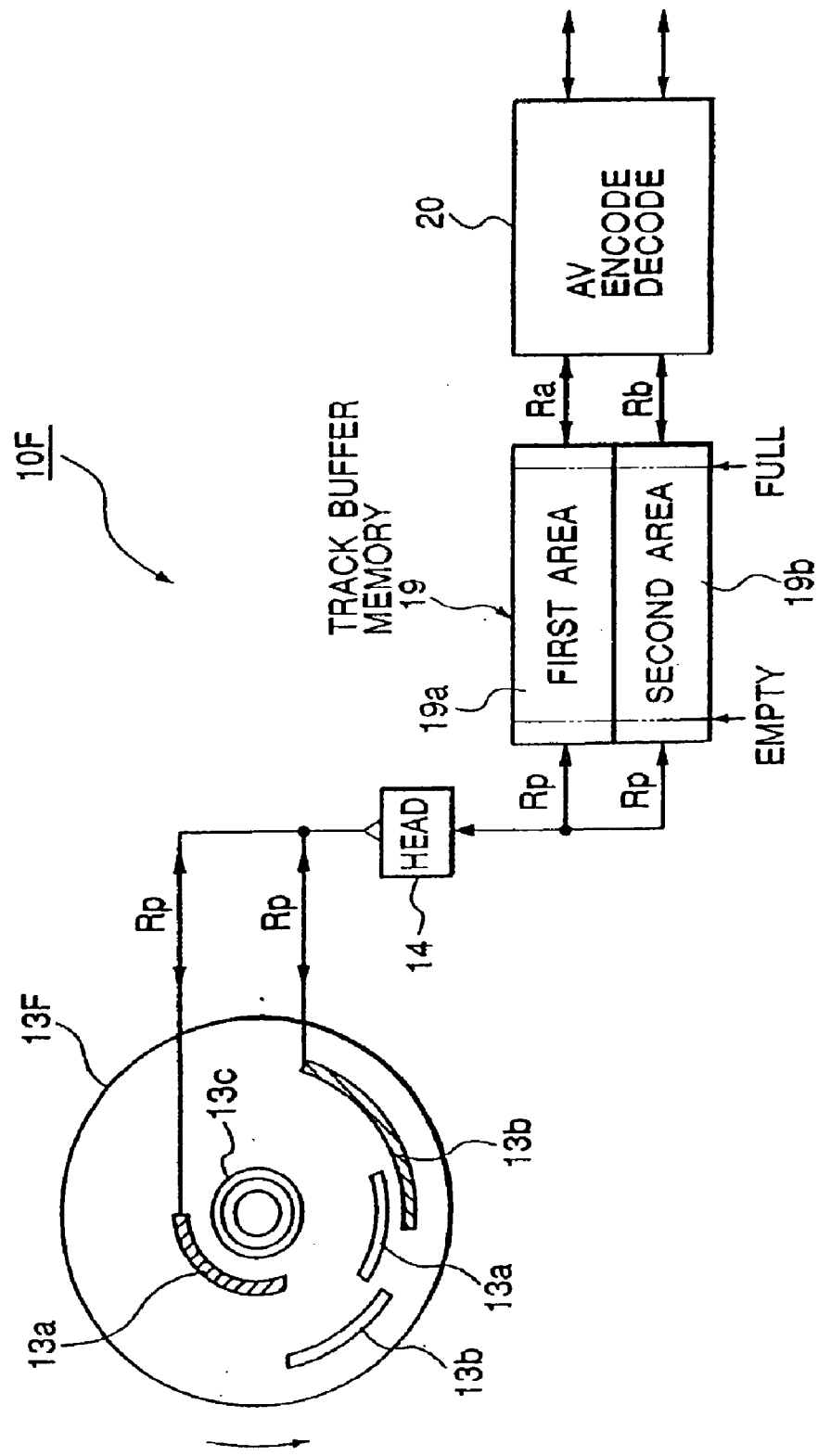
FIG. 31 is a diagram of a portion of the apparatus in FIG. 30.
Figures 32, 33:
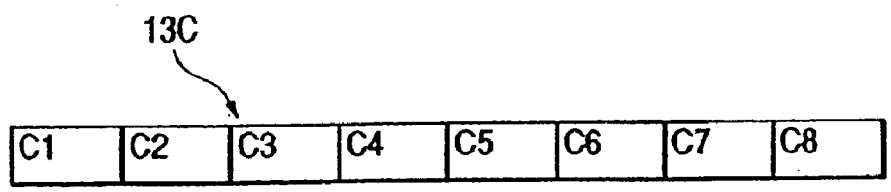
FIG. 32 is a diagram of sub-areas in a management area of an optical disc in FIG. 31.
FIG. 33 is a diagram of a first example of indication on a display in FIG. 30.

The apparatus 10F operates on an optical disc 13F. As shown in FIG. 31, an innermost portion or an inner portion of the optical disc 13F has a management area 13c for storing management information. As shown in FIG. 32, the management area 13c is divided into separate sub-areas which are given addresses C1, C2, C3, . . . , respectively. Thus, the sub-areas in the management area 13c are also referred to as the sub-areas C1, C2, C3, . . . . In the case where first areas 13a and second areas 13b of the optical disc 13F store a first information signal "A" and a second information signal "B", the management area 13c is loaded with management information including copyright information, title information, signals representative of transfer rates Ra and Rb, and signals representative of start addresses and end addresses for the first and second information signals "A" and "B". In the case where the first areas 13a and the second areas 13b are unoccupied and do not store the first and second information signals "A" and "B", the management area 13c is loaded with management information including signals representative of the start addresses and the end addresses of the unoccupied regions (the unoccupied areas).

In the case where the apparatus 10F is required to record the first and second information signals "A" and "B" on the optical disc 13F, the system controller 22F operates to read out management information from the management area 13c of the optical disc 13F. The system controller 22F detects conditions of unoccupied regions in the first and second areas 13a and 13b of the optical disc 13F by referring to the read-out management information.

Also, in the case where the apparatus 10F is required to record one of the first and second information signals "A" and "B" on the optical disc 13F and to reproduce the other information signal from the optical disc 13F, the system controller 22F operates to read out management information from the management area 13c of the optical disc 13F. The system controller 22F detects conditions of unoccupied regions in ones of the first and second areas 13a and 13b of the optical disc 13F by referring to the read-out management information.

Specifically, the system controller 22F detects the start addresses and the end addresses of unoccupied regions from the start addresses and the end addresses of data-loaded regions which are stored in the management area 13c. The system controller 22F calculates the sizes of the unoccupied regions from the intervals between the start addresses and the end addresses of the data-loaded regions. The system controller 22F stores data representative of the detected positions (the detected start addresses and the detected end addresses) and the calculated sizes of the unoccupied regions into an internal memory. For each of the 2-Mbps, 4-Mbps, and 8-Mbps transfer rates concerning the first and second information signals "A" and "B", the system controller 22F decides whether or not the size of each unoccupied region is sufficient to implement continuous recording or continuous recording/playback. In addition, the system controller 22F calculates the seek time of an optical head 14 as follows. The difference between addresses is calculated. The movement-corresponding track number is computed on the basis of the address difference by referring to a seek table provided in the program ROM within the system controller 22F. The computation of the movement-corresponding track number is also based on the fact that the rotation of the optical disc 13F undergoes CLV control. Given calculation using the movement-corresponding track number and a given coefficient provides a calculated seek time of the optical head 14. It should be noted that the seek time of the optical head 14 may be set to a given value depending on the type of the apparatus 10F or a standards-based allowable seek time.

When the recording of only the information signal "A" is considered and hence the terms related to the information signal "B" are nullified, the previously-indicated relations (9) and (19) are changed into the following relations.

$$Ya \geq Rp \cdot Ra \cdot (Tab+Tba)/(Rp-Ra) \qquad (51)$$

$$Ya \geq 2 \cdot Rp \cdot Ra \cdot T\max/(Rp-Ra) \qquad (52)$$

Preferably, the relations (51) and (52) are satisfied to provide the continuity of the contents of the information signal "A" recorded on the unoccupied regions in the optical disc 13F. The program ROM in the system controller 22F may store a table of the results of previously-executed calculations of the relations (51) and (52). In this case, the table is accessed when the conditions determined by the relations (51) and (52) are required to be detected.

Regarding the recording of only the information signal "A" (only one of the information signals "A" and "B"), the system controller 22F calculates the total size of the unoccupied regions in the optical disc 13F. For each of the 2-Mbps, 4-Mbps, and 8-Mbps transfer rates, the system controller 22F calculates the recording time (or the recording capacity). For each of the 2-Mbps, 4-Mbps, and 8-Mbps transfer rates, the system controller 22F calculates the total size of usable portions of the unoccupied regions in the optical disc 13F. For each of the 2-Mbps, 4-Mbps, and 8-Mbps transfer rates, the system controller 22F calculates the region use efficiency (%) which is equal to the ratio between the total size of the unoccupied regions and the total size of usable portions of the unoccupied regions in the optical disc 13F. The system controller 22F controls the display 225 via the audio-video encoding and decoding unit 20 and the NTSC encoder 224 to indicate the calculated total size of the unoccupied regions in the optical disc 13F, the calculated recording times, the total sizes of usable portions of the unoccupied regions in the optical disc 13F, and the calculated region use efficiencies as shown in FIG. 33.

During a recording mode of operation of the apparatus 10F, a first information signal "A" is inputted into a first area 19a in a track buffer memory 19 at a transfer rate Ra while a second information signal "B" is inputted into a second area 19b in the track buffer memory 19 at a transfer rate Rb. The first and second information signals "A" and "B" are transmitted from the track buffer memory 19 to the optical head 14 on a time sharing basis and at a predetermined constant transfer rate Rp higher than the transfer rates Ra and Rb. The optical head 14 records the first and second information signals "A" and "B" on unoccupied regions in the first and second areas 13a and 13b of the optical disc 13F.

At an initial stage of the recording mode of operation, the system controller 22F enables the optical head 14 to reproduce management information from the management area 13c of the optical disc 13F. The system controller 22F detects the conditions of the unoccupied regions in the first and second areas 13a and 13b of the optical disc 13F by referring to the reproduced management information. The system controller 22F decides whether or not the continuously and simultaneously recording of the contents of the first and second information signals "A" and "B" can be implemented on the basis of the detected conditions of the unoccupied regions and the previously-indicated relation (9) or (19). When the system controller 22F decides that the continuously and simultaneously recording of the contents of the first and second information signals "A" and "B" can be implemented, the actually recording of the information signals "A" and "B" on the optical disc 13F is started.

During a recording/playback mode of operation of the apparatus 10F, the optical head 14 reproduces a first information signal "A" from the first areas 13a in the optical disc 13F. The first information signal "A" is stored into the first area 19a in the track buffer memory 19 from the optical head 14 at the predetermined constant transfer rate Rp. The first information signal "A" is transmitted from the track buffer memory 19 to the audio-video encoding and decoding unit 20 at the transfer rate Ra. On the other hand, a second information signal "B" is inputted into the second area 19b in the track buffer memory 19 at the transfer rate Rb. The second information signal "B" is transmitted from the track buffer memory 19 to the optical head 14 at the predetermined constant transfer rate Rp. The optical head 14 records the second information signal "B" on unoccupied regions in the second areas 13b of the optical disc 13F. The optical head 14 implements the reproduction of the first information signal "A" and the recording of the second information signal "B" on a time sharing basis. At an initial stage of the recording/playback mode of operation, the system controller 22F enables the optical head 14 to reproduce management information from the management area 13c of the optical disc 13F. The system controller 22F detects the conditions of the unoccupied regions in the second areas 13b of the optical disc 13F by referring to the reproduced management information. The system controller 22F decides whether or not the playback of the contents of the first information signal "A" and the recording of the contents of the second information signal "B" can be continuously and simultaneously implemented on the basis of the detected conditions of the unoccupied regions and the previously-indicated relation (9) or (19). When the system controller 22F decides that the playback of the contents of the first information signal "A" and the recording of the contents of the second information signal "B" can be continuously and simultaneously implemented, the actually playback of the first information signal "A" and the actually recording of the second information signal "B" are started.

For example, the system controller 22F executes the calculations and the decisions regarding the relation (9) or (19) each time the recording mode of operation or the recording/playback mode of operation is implemented. The program ROM in the system controller 22F may store a table of the results of previously-executed calculations of the relation (9) or (19). In this case, the table is accessed when the conditions determined by the relation (9) or (19) are required to be detected.

When the sum of the transfer rates Ra and Rb for the first and second information signals "A" and "B" is greater than the predetermined constant transfer rate Rp in the relation (9) or (19), it is difficult to implement the continuously and simultaneously recording of the contents of the first and second information signals "A" and "B". In addition, it is difficult to continuously and simultaneously implement the playback of the contents of the first information signal "A" and the recording of the contents of the second information signal "B". In these cases, the system controller 22F controls the display 225 via the audio-video encoding and decoding unit 20 and the NTSC encoder 224 to indicate the related difficulty.

Regarding the recording of the first and second information signals "A" and "B", the system controller 22F executes the following calculations for each of the first and second information signals "A" and "B". Specifically, the system controller 22F calculates the total size of the unoccupied regions in the optical disc 13F. For each of the 2-Mbps, 4-Mbps, 8-Mbps, and 17-Mbps transfer rates, the system controller 22F calculates the recording time (or the recording capacity). For each of the 2-Mbps, 4-Mbps, 8-Mbps, and 17-Mbps transfer rates, the system controller 22F calculates the total size of usable portions of the unoccupied regions in the optical disc 13F. For each of the 2-Mbps, 4-Mbps, 8-Mbps, and 17-Mbps transfer rates, the system controller 22F calculates the region use efficiency (%) which is equal to the ratio between the total size of the unoccupied regions and the total size of usable portions of the unoccupied regions in the optical disc 13F. The system controller 22F controls the display 225 via the audio-video encoding and decoding unit 20 and the NTSC encoder 224 to indicate the calculated total size of the unoccupied regions in the optical disc 13F, the calculated recording times, the calculated total sizes of usable portions of the unoccupied regions in the optical disc 13F, and the calculated region use efficiencies. An example of this indication is shown in FIG. 34 where only the calculated items available at a transfer rate Ra of 8 Mbps are displayed. In the case where Ra=8 Mbps and Rb=17 Mbps, neither the relation (9) nor the relation (19) is satisfied so that the continuously and simultaneously recording of the contents of the first and second information signals "A" and "B" is difficult or impossible. In this case, the system controller 22F controls the display 225 via the audio-video encoding and decoding unit 20 and the NTSC encoder 224 to indicate "recording impossible" as shown in FIG. 34.

Regarding the playback of the first information signal "A" and the recording of the second information signal "B", the system controller 22F calculates the total size of the unoccupied regions in the second areas 13b of the optical disc 13F. For each of the 2-Mbps, 4-Mbps, 8-Mbps, and 17-Mbps transfer rates, the system controller 22F calculates the recording time (or the recording capacity). For each of the 2-Mbps, 4-Mbps, 8-Mbps, and 17-Mbps transfer rates, the system controller 22F calculates the total size of usable portions of the unoccupied regions in the second areas 13b of the optical disc 13F. For each of the 2-Mbps, 4-Mbps, 8-Mbps, and 17-Mbps transfer rates, the system controller 22F calculates the region use efficiency (%) which is equal to the ratio between the total size of the unoccupied regions and the total size of usable portions of the unoccupied regions in the optical disc 13F. The system controller 22F controls the display 225 via the audio-video encoding and decoding unit 20 and the NTSC encoder 224 to indicate the calculated total size of the, unoccupied regions in the optical disc 13F, the calculated recording times, the calculated total sizes of usable portions of the unoccupied regions in the optical disc 13F, and the calculated region use efficiencies. An example of this indication is shown in FIG. 35 where only the calculated items available at a transfer rate Ra of 8 Mbps are displayed. In the case where Ra=8 Mbps and Rb=17 Mbps, neither the relation (9) nor the relation (19) is satisfied so that it is difficult to continuously and simultaneously implement the playback of the contents of the first information signal "A" and the recording of the contents of the second information signal "B". In this case, the system controller 22F controls the display 225 via the audio-video encoding and decoding unit 20 and the NTSC encoder 224 to indicate "recording impossible" as shown in FIG. 35.

The on-display indications in FIGS. 33, 34, and 35 may be modified as follows. The calculated total sizes of usable portions of the unoccupied regions in the optical disc 13F may be omitted from the indications. The transfer rates may be replaced by "high picture quality", "slightly high picture quality", and "normal picture quality". The transfer rates may be replaced by "2-hour recording mode", "4-hour recording mode", and "8-hour recording mode".

Generally, the user operates a key input unit 23 and thereby selects the desired values of the transfer rates Ra and Rb in consideration of the items indicated on the display 225. During a later stage of operation of the apparatus 10F, the actual values of the transfer rates Ra and Rb are equalized to the desired values thereof. In the absence of user's selection of the transfer rates Ra and Rb, the highest values of the transfer rates Ra and Rb are automatically set as the desired values thereof.

Two-signal Recording Mode

Figure 36:
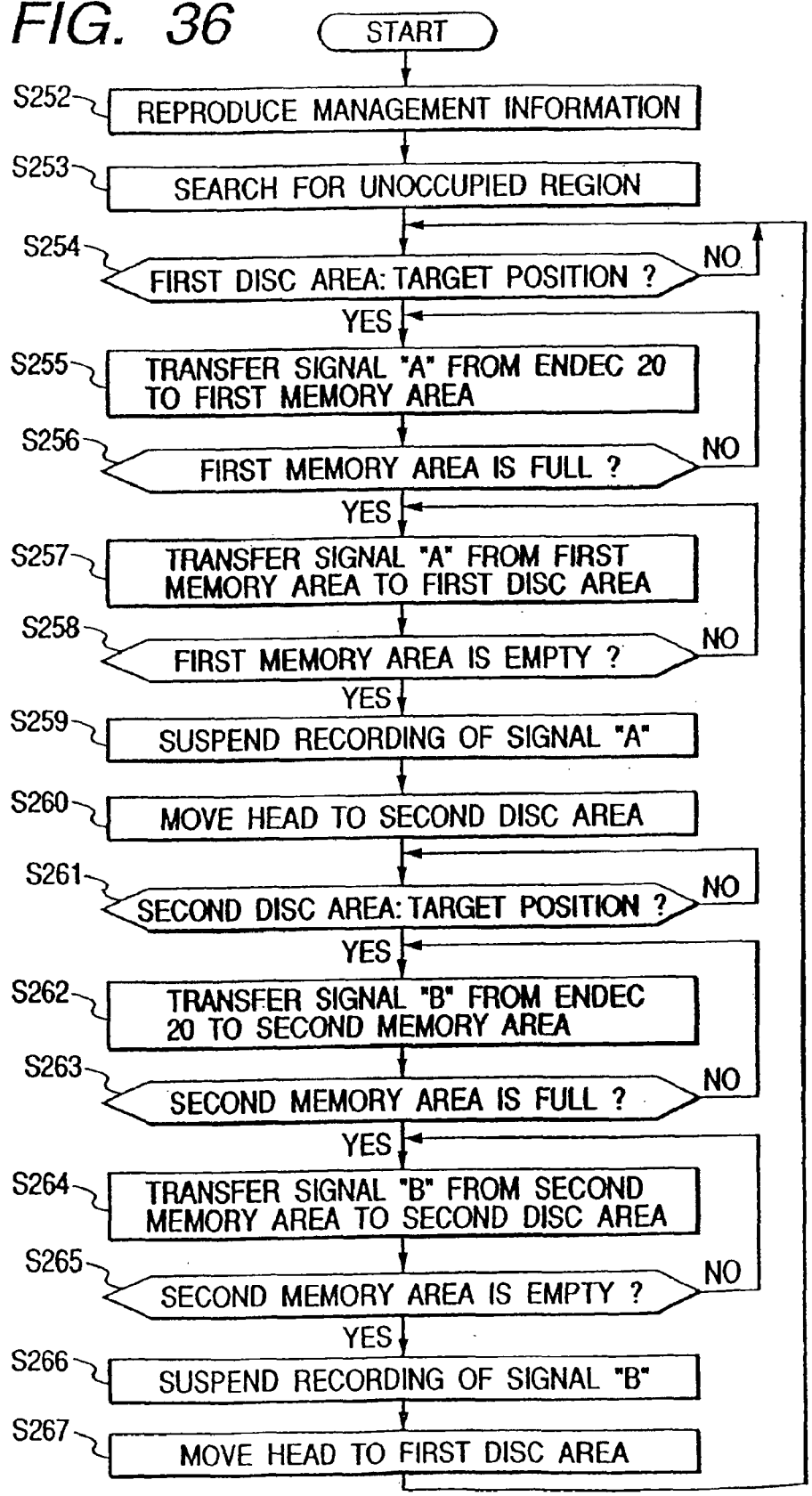
FIG. 36 is a flowchart of a segment of a program for a system controller in FIG. 30 which relates to a two-signal recording mode of operation.

The system controller 22F operates in accordance with a program stored in its internal ROM. FIG. 36 is a flowchart of a segment of the program which relates to a two-signal recording mode of operation of the apparatus 10F. The program segment in FIG. 36 is started in response to a two-signal-recording start command signal fed from the key input unit 23. In this case, the optical disc 13F is of the rewritable type.

With reference to FIG. 36, a first step S252 of the program segment controls the optical head 14 to reproduce management information from the management area 13c in the optical disc 13F.

A step S253 following the step S252 searches for unoccupied regions in the first and second areas 13a and 13b of the optical disc 13F by referring to address information contained in the reproduced management information. The step S253 decides whether or not the continuously and simultaneously recording of the contents of first and second information signals "A" and "B" can be implemented on the basis of the conditions of the unoccupied regions and the previously-indicated relation (9) or (19). The step S253 indicates the result of the decision on the display 225. When it is decided that the continuously and simultaneously recording of the contents of the first and second information signals "A" and "B" can be implemented, the program advances from the step S253 to a step S254.

The step S254 decides whether or not the optical head 14 has reached a target position on the optical disc 13F. Initially, the target position corresponds to first one A1 of the first areas 13a in the optical disc 13F. When the optical head 14 has not reached the target position yet, the step S254 is repeated. When the optical head 14 has reached the target position, the program advances from the step S254 to a step S255.

The step S255 stores the first information signal "A", which is outputted from the audio-video encoding and decoding unit 20, into the first area 19a in the track buffer memory 19 at the transfer rate A step S256 following the step S255 decides whether or not the degree of occupancy of the first area 19a in the track buffer memory 19 has reached the related full value. When the degree of occupancy of the first area 19a in the track buffer memory 19 has not reached the related full value yet, the program returns from the step S256 to the step S255. When the degree of occupancy of the first area 19a in the track buffer memory 19 has reached the related full value, the program advances from the step S256 to a step S257.

The step S257 transfers the first information signal "A" from the first area 19a in the track buffer memory 19 to the optical head 14 at the predetermined constant transfer rate Rp. The step S257 enables the optical head 14 to record the first information signal "A" on the present first area 13a in the optical disc 13F at the predetermined constant transfer rate Rp.

A step S258 following the step S257 decides whether or not the degree of occupancy of the first area 19a in the track buffer memory 19 has reached the related empty value. When the degree of occupancy of the first area 19a in the track buffer memory 19 has not reached the related empty value yet, the program returns from the step S258 to the step S257. When the degree of occupancy of the first area 19a in the track buffer memory 19 has reached the related empty value, the program advances from the step S258 to a step S259.

The step S259 forces the optical head 14 to suspend the recording of the first information signal "A" on the present first area 13a in the optical disc 13F.

A step S260 subsequent to the step S259 moves the optical head 14 toward a next target position. The next target position corresponds to, for example, first one B1 of the second areas 13b in the optical disc 13F. After the step S260, the program advances to a step S261.

The step S261 decides whether or not the optical head 14 has reached the target position on the optical disc 13F. When the optical head 14 has not reached the target position yet, the step S261 is repeated. When the optical head 14 has reached the target position, the program advances from the step S261 to a step S262.

In this way, the optical head 14 moves from the first area 13a to the second area 13b in the optical disc 13F. The seek time Tab related to this movement of the optical head 14 is equal to 1.5 seconds or shorter.

The step S262 stores the second information signal "B", which is outputted from the audio-video encoding and decoding unit 20, into the second area 19b in the track buffer memory 19 at the transfer rate Rb.

A step S263 following the step S262 decides whether or not the degree of occupancy of the second area 19b in the track buffer memory 19 has reached the related full value. When the degree of occupancy of the second area 19b in the track buffer memory 19 has not reached the related full value yet, the program returns from the step S263 to the step S262. When the degree of occupancy of the second area 19b in the track buffer memory 19 has reached the related full value, the program advances from the step S263 to a step S264.

The step S264 transfers the second information signal "B" from the second area 19b in the track buffer memory 19 to the optical head 14 at the predetermined constant transfer rate Rp. The step S264 enables the optical head 14 to record the second information signal "B" on the present second area 13b in the optical disc 13F at the predetermined constant transfer rate Rp.

A step S265 following the step S264 decides whether or not the degree of occupancy of the second area 19b in the track buffer memory 19 has reached the related empty value. When the degree of occupancy of the second area 19b in the track buffer memory 19 has not reached the related empty value yet, the program returns from the step S265 to the step S264. When the degree of occupancy of the second area 19b in the track buffer memory 19 has reached the related empty value, the program advances from the step S265 to a step S266.

The step S266 forces the optical head 14 to suspend the recording of the second information signal "B" on the present second area 13b in the optical disc 13F.

A step S267 subsequent to the step 8266 moves the optical head 14 toward a next target position. The next target position corresponds to, for example, second one A2 of the first areas 13a in the optical disc 13F. After the step S267, the program returns to the step S254.

Thus, the optical head 14 moves from the second area 13b to the first area 13a in the optical disc 13F. The seek time Tba related to this movement of the optical head 14 is equal to 1.5 seconds or shorter.

During the repetitive execution of the program segment in FIG. 36, the target position of the optical head 14 is sequentially set into correspondence with the first and second areas A1, B1, A2, B2, A3, B3, ... in the optical disc 13F. Therefore, the optical head 14 alternately records the first information signal "A" and the second information signal "B" on the first and second areas 13a and 13b of the optical disc 13 in the order as "A1, B1, A2, B2, A3, B3, ...".

Preferably, the step S259 or the step S266 is followed by a step which decides whether or not both the recording of the first information signal "A" on the optical disc 13F and the recording of the second information signal "B" thereon are required to be suspended. In this case, when both the recording of the first information signal "A" on the optical disc 13F and the recording of the second information signal "B" thereon are required to be suspended, the optical head 14 is controlled to implement the required suspension of recording.

After the recording of the first and second information signals "A" and "B" on the optical disc 13F has been completed, information representing the addresses of the first and second information signals "A" and "B" on the optical disc 13F is recorded on the management area 13c of the optical disc 13F. In addition, information representing the transfer rates Ra and Rb for the first and second information signals "A" and "B" may be recorded on the management area 13c of the optical disc 13F.

Signal Recording/Playback Mode

Figure 37:
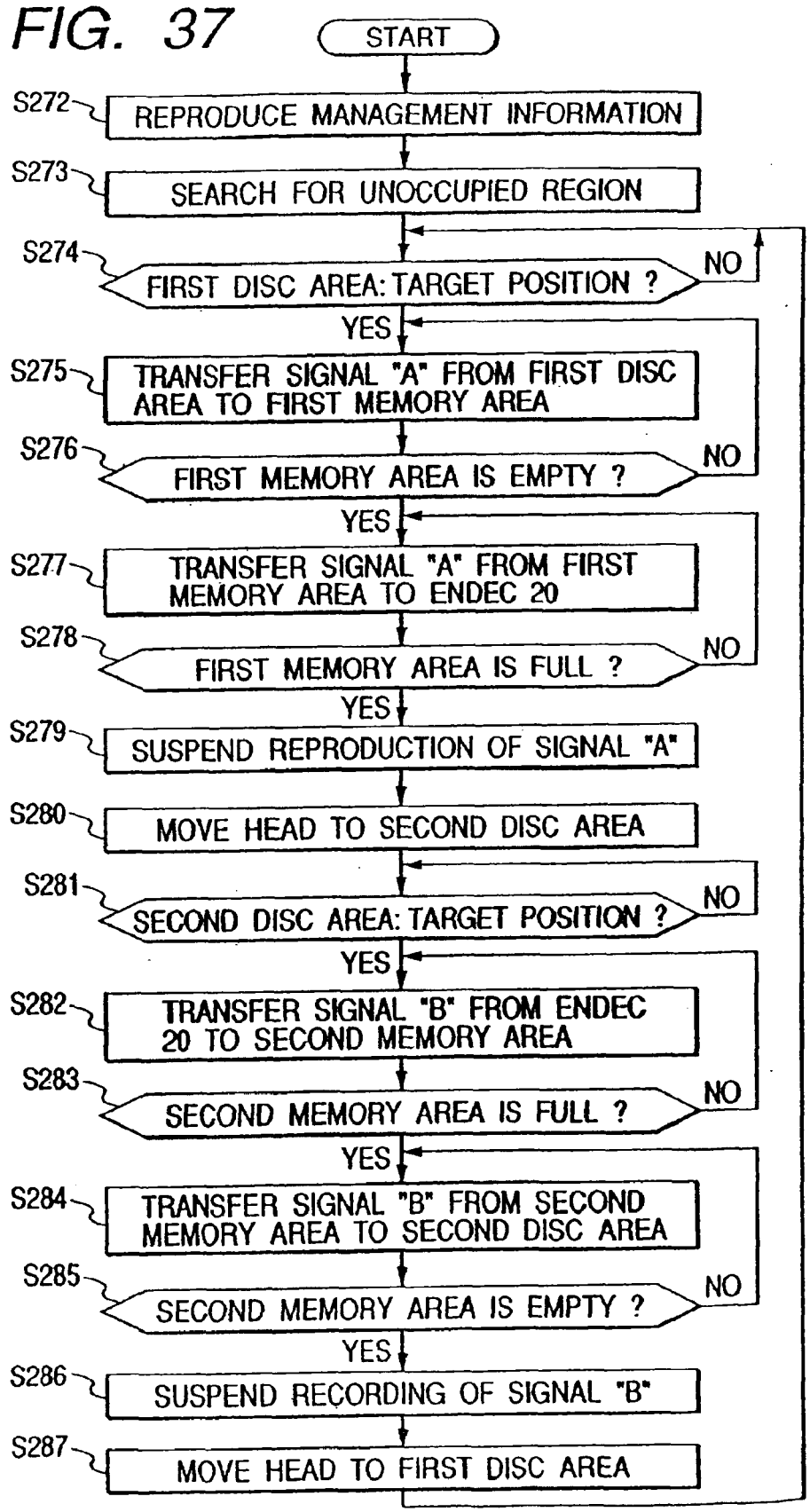
FIG. 37 is a flowchart of a segment of the program for the system controller in FIG. 30 which relates to a signal recording/playback mode of operation.

The system controller 22F operates in accordance with the program stored in its internal ROM. FIG. 37 is a flowchart of a segment of the program which relates to a signal recording/playback mode of operation of the apparatus 10F. The program segment in FIG. 37 is started in response to a signal-recording/playback start command signal fed from the key input unit 23. In this case, the optical disc 13F is of the rewritable type.

With reference to FIG. 37, a first step S272 of the program segment controls the optical head 14 to reproduce management information from the management area 13c in the optical disc 13F.

A step S273 extracts the positional information and the playback information related to a first information signal "A" from the reproduced management information. The playback information contains information representing the transfer rate Ra for the first information signal "A". In addition, the step S273 searches for unoccupied regions in the second areas 13b of the optical disc 13F by referring to address information contained in the reproduced management information. The step S273 decides whether or not the playback of the contents of the first information signal "A" and the recording of the contents of a second information signal "B" can be continuously and simultaneously implemented on the basis of the conditions of the unoccupied regions and the previously-indicated relation (9) or (19). The step S273 indicates the result of the decision on the display 225. When it is decided that the playback of the contents of the first information signal "A" and the recording of the contents of the second information signal "B" can be continuously and simultaneously implemented, the program advances from the step S273 to a step S274.

The step S274 decides whether or not the optical head 14 has reached a target position on the optical disc 13F. Initially, the target position corresponds to first one A1 of the first areas 13a in the optical disc 13F. When the optical head 14 has not reached the target position yet, the step S274 is repeated. When the optical head 14 has reached the target position, the program advances from the step S274 to a step S275.

The step S275 enables the optical head 14 to reproduce the first information signal "A" from the present first area 13a in the optical disc 13F. The step S275 stores the reproduced first information signal "A" into the first area 19a in the track buffer memory 19 at the predetermined constant transfer rate Rp.

A step S276 following the step S275 decides whether or not the degree of occupancy of the first area 19a in the track buffer memory 19 has reached the related empty value. When the degree of occupancy of the first area 19a in the track buffer memory 19 has not reached the related empty value yet, the program returns from the step S276 to the step S275. When the degree of occupancy of the first area 19a in the track buffer memory 19 has reached the related empty value, the program advances from the step S276 to a step S277.

The step S277 transfers the first information signal "A" from the first area 19a in the track buffer memory 19 to the audio-video encoding and decoding unit 20 at the transfer rate Ra.

A step S278 following the step S277 decides whether or not the degree of occupancy of the first area 19a in the track buffer memory 19 has reached the related full value. When the degree of occupancy of the first area 19a in the track buffer memory 19 has not reached the related full value yet, the program returns from the step S278 to the step S277. When the degree of occupancy of the first area 19a in the track buffer memory 19 has reached the related full value, the program advances from the step 8278 to a step S279.

The step S279 forces the optical head 14 to suspend the reproduction of the first information signal "A" from the present first area 13a in the optical disc 13F.

A step S280 subsequent to the step S279 moves the optical head 14 toward a next target position. The next target position corresponds to, for example, first one B1 of the second areas 13b in the optical disc 13F. After the step S280, the program advances to a step S281.

The step S281 decides whether or not the optical head 14 has reached the target position on the optical disc 13F. When the optical head 14 has not reached the target position yet, the step S281 is repeated. When the optical head 14 has reached the target position, the program advances from the step S281 to a step S282.

In this way, the optical head 14 moves from the first area 13a to the second area 13b. The seek time Tab related to this movement of the optical head 14 is equal to 1.5 seconds or shorter.

The step S282 stores the second information signal "B", which is outputted from the audio-video encoding and decoding unit 20, into the second area 19b in the track buffer memory 19 at the transfer rate Rb.

A step S283 following the step S282 decides whether or not the degree of occupancy of the second area 19b in the track buffer memory 19 has reached the related full value. When the degree of occupancy of the second area 19b in the track buffer memory 19 has not reached the related full value yet, the program returns from the step S283 to the step S282. When the degree of occupancy of the second area 19b in the track buffer memory 19 has reached the related full value, the program advances from the step S283 to a step S284.

The step S284 transfers the second information signal "B" from the second area 19b in the track buffer memory 19 to the optical head 14 at the predetermined constant transfer rate Rp. The step S284 enables the optical head 14 to record the second information signal "B" on the present second area 13b in the optical disc 13 at the predetermined constant transfer rate Rp.

A step S285 following the step S284 decides whether or not the degree of occupancy of the second area 19b in the track buffer memory 19 has reached the related empty value. When the degree of occupancy of the second area 19b in the track buffer memory 19 has not reached the related empty value yet, the program returns from the step S285 to the step S284. When the degree of occupancy of the second area 19b in the track buffer memory 19 has reached the related empty value, the program advances from the step S285 to a step S286.

The step S286 forces the optical head 14 to suspend the recording of the second information signal "B" on the present second area 13b in the optical disc 13F.

A step S287 subsequent to the step S286 moves the optical head 14 toward a next target position. The next target position corresponds to, for example, second one A2 of the first areas 13a in the optical disc 13F. After the step S287, the program returns to the step S274.

Thus, the optical head 14 moves from the second area 13b to the first area 13a. The seek time Tba related to this movement of the optical head 14 is equal to 1.5 seconds or shorter.

During the repetitive execution of the program segment in FIG. 37, the target position of the optical head 14 is sequentially set into correspondence with the first and second areas A1, B1, A2, B2, A3, B3, . . . in the optical disc 13F. Therefore, the optical head 14 alternately reproduces the first information signal "A" and records the second information signal "B" while accessing the first and second areas 13a and 13b of the optical disc 13 in the order as "A1, B1, A2, B2, A3, B3, . . . ".

Preferably, the step S279 or the step S286 is followed by a step which decides whether or not both the reproduction of the first information signal "A" from the optical disc 13F and the recording of the second information signal "B" thereon are required to be suspended. In this case, when both the reproduction of the first information signal "A" from the optical disc 13F and the recording of the second information signal "B" thereon are required to be suspended, the optical head 14 is controlled to implement the required suspension of reproduction and recording.

After the playback of the first information signal "A" from the optical disc 13F and the recording of the second information signal "B" thereon have been completed, information representing the addresses of the second information signal "B" on the optical disc 13F is recorded on the management area 13c of the optical disc 13F. In addition, information representing the transfer rate Rb for the second information signal "B" may be recorded on the management area 13c of the optical disc 13F.

Other Features and Aspects of Embodiments

According to the basic aspects of the previously-mentioned embodiments of this invention, the signal transfer rate related to the recording and reproduction of information on and from a recording medium is fixed to the predetermined constant transfer rate Rp.

Generally, the previously-mentioned embodiments of this invention can operate on a recording medium such as a DVD-ROM, a DVD-RW, a DVD-RAM, a DVD+RW, and an HDD magnetic disc.

A DVD-ROM or a DVD-RW is subjected to CLV (constant linear velocity) control by a disc drive. Thus, the signal transfer rate is fixed throughout the whole area of the DVD-ROM or the DVD-RW.

A DVD-RAM is divided into zones. The DVD-RAM is subjected to zone. CLV by a disc drive. The signal transfer rate varies from zone to zone by only several percent. The previously-mentioned embodiments of this invention are adaptable to such a slightly-varying signal transfer rate.

Regarding a DVD+RW or an HDD magnetic disc, the signal transfer rate sometimes depends on a disc radial position. The previously-mentioned embodiments of this invention can be applied to a disc area in which the signal transfer rate varies by several percent to several tens of percent.

In these case, it is preferable to calculate the signal transfer rate (Rp) regarding a recording medium as a minimum signal transfer rate which occurs when recording or reproduction is performed.

According to the previously-mentioned embodiments of this invention, information is recorded on and reproduced from two or more areas of a recording medium. The two or more areas of the recording medium may be a common area. In this case, the previously-mentioned embodiments of this invention are designed to operate in one of the following modes. During a first mode of operation, first data are reproduced from an area of a recording medium and a portion of the reproduced first data is changed to form second data, and the second data are recorded on the same area of the recording medium. During a second mode of operation, data are recorded on an area of a recording medium, and then the data are reproduced therefrom and the reproduced data are analyzed to verify whether the data have been correctly recorded on the area of the recording medium.

In the previous description of the embodiments of this invention, "seek time" taken by the optical head to move from a first disc position to a second disc position is generally equal to a time for radial head movement from a first track (a first track portion) having the first disc position to a second track (a second track portion) having the second disc position plus a rotation waiting time for which the optical head remains on or above the second track (the second track portion) until meeting the second disc position. In the case where the first and second tracks (the first and second track portions) neighbor each other, "seek time" is equal to only a rotation waiting time.

What is claimed is:

1. A method of recording information signals on an information-signal recording medium having first and second areas, comprising the steps of:

storing into a first buffer memory a first information signal inputted at a first transfer rate;

storing into a second buffer memory a second information signal inputted at a second transfer rate;

reading out the first and second information signals from the first and second buffer memories on a time sharing basis;

recording via a head the first and second information signals, which have been read out from the first and second buffer memories, on the first and second areas of the information-signal recording medium respectively on a time sharing basis at a third transfer rate higher than the first and second transfer rates, the head being movable relative to the information-signal recording medium; and deciding amounts of the first and second information signals read out from the first and second buffer memories for every read-out on the basis of (1) a time taken by the head to move from a point on the information-signal recording medium to a next point thereon, (2) the first transfer rate, (3) the second transfer rate, and (4) the third transfer rate to control a continuity in the time-sharing-based recording between the information-signal recording medium and the first and second buffer memories via the head.

2. A method of recording and reproducing information signals on and from an information-signal recording medium having first and second areas, comprising the steps of:

storing into a first buffer memory a first information signal inputted at a first transfer rate;

reading out the first information signal from the first buffer memory;

recording via a head the first information signal, which has been read out from the first buffer memory, on the first area of the information-signal recording medium at a second transfer rate higher than the first transfer rate and reproducing via the head a second information signal from the second area of the information-signal recording medium at the second transfer rate on a time sharing basis, the head being movable relative to the information-signal recording medium;

storing into a second buffer memory the second information signal which has been reproduced;

outputting the second information signal from the second buffer memory at a third transfer rate lower than the second transfer rate; and deciding an amount of the first information signal read out from the first buffer memory for every read-out and an amount of the second information signal stored into the second buffer memory for every storing stroke on the basis of (1) a time taken by the head to move from a point on the information-signal recording medium to a next point thereon, (2) the first transfer rate, (3) the second transfer rate, and (4) the third transfer rate to control a continuity in the time-sharing-based recording and reproduction between the information-signal recording medium and the first and second buffer memories via the head.

3. A method of reproducing information signals from an information-signal recording medium having first and second areas, comprising the steps of:

reproducing via a head first and second information signals from the first and second areas of the information-signal recording medium respectively on a time sharing basis at a first transfer rate, the head being movable relative to the information-signal recording medium;

storing into a first buffer memory the first information signal which has been reproduced;

storing into a second buffer memory the second information signal which has been reproduced;

outputting the first information signal from the first buffer memory at a second transfer rate lower than the first transfer rate;

outputting the second information signal from the second buffer memory at a third transfer rate lower than the first transfer rate; and deciding amounts of the first and second information signals stored into the first and second buffer memories for every storing stroke on the basis of (1) a time taken by the head to move from a point on the information-signal recording medium to a next point thereon, (2) the first transfer rate, (3) the second transfer rate, and (4) the third transfer rate to control a continuity in the time-sharing-based reproduction between the information-signal recording medium and the first and second buffer memories via the head.

* * * * *